United States Patent [19]

Nakamura et al.

[11] Patent Number: 5,408,411
[45] Date of Patent: Apr. 18, 1995

[54] SYSTEM FOR PREDICTING BEHAVIOR OF AUTOMOTIVE VEHICLE AND FOR CONTROLLING VEHICULAR BEHAVIOR BASED THEREON

[75] Inventors: Mitsuru Nakamura, Katsuta; Makoto Yamakado, Ibaraki, both of Japan

[73] Assignee: Hitachi, Ltd., Tokyo, Japan

[21] Appl. No.: 822,323

[22] Filed: Jan. 17, 1992

[30] Foreign Application Priority Data

Jan. 18, 1991 [JP] Japan ................................. 3-004242
Feb. 20, 1991 [JP] Japan ................................. 3-026455

[51] Int. Cl.$^6$ ............................................. B62D 6/00
[52] U.S. Cl. ........................... 364/424.01; 364/424.05; 280/707; 180/142
[58] Field of Search ...................... 364/424.01, 424.05, 364/426.01, 426.02, 426.03, 424.1

[56] References Cited

U.S. PATENT DOCUMENTS

| | | | |
|---|---|---|---|
| 4,706,771 | 11/1987 | Kawabe et al. | 364/424.05 |
| 4,840,389 | 6/1989 | Kawabe et al. | 364/424.05 |
| 4,939,656 | 7/1990 | Hoashi et al. | 364/426.02 |
| 4,975,850 | 12/1990 | Diller | 364/424.05 |
| 5,066,041 | 11/1991 | Kindermann et al. | 364/424.05 |
| 5,087,068 | 2/1992 | Fukanaga et al. | 364/424.05 |
| 5,092,435 | 3/1992 | Sone et al. | 364/424.1 |
| 5,103,397 | 4/1992 | Ikemoto et al. | 364/424.05 |
| 5,103,398 | 4/1992 | Akiyama | 364/424.1 |
| 5,122,961 | 6/1992 | Toyama et al. | 364/424.01 |
| 5,177,681 | 1/1993 | Sato | 364/424.05 |
| 5,208,749 | 5/1993 | Adachi et al. | 364/426.01 |
| 5,247,466 | 9/1993 | Shimada et al. | 364/424.01 |

FOREIGN PATENT DOCUMENTS

2947863A1 6/1980 Germany.
3700409A1 7/1987 Germany.

OTHER PUBLICATIONS

Manfred Mitschke, Dynamik der Kraftfahrzeuge, vol. C, "Fahrverhalten", Springer-Verlag, 1990.

Primary Examiner—Kevin J. Teska
Assistant Examiner—Tyrone V. Walker
Attorney, Agent, or Firm—Antonelli, Terry, Stout & Kraus

[57] ABSTRACT

A system for detecting a physical amount of behavior of a vehicle includes, acceleration sensors arranged on at least two longitudinal axes of the vehicle, the vertical axis Of the vehicle and the lateral axis of the vehicle, a plurality of the acceleration sensors being disposed on each of the axes. A unit is provided for establishing a conversion equation for determining acceleration values of linear motion at an arbitrary point of the vehicle in the direction of each axis of an arbitrary coordinate system and acceleration values of rotational motion with respect to the each axis of the coordinate system while simultaneously using acceleration values detected by the acceleration sensors disposed on at least two of the vehicular longitudinal axes, the vertical axis and the lateral axis. There is also provided a unit for calculating the conversion equation to obtain the acceleration values of linear motion at an arbitrary point of the vehicle in the direction of each axis of the arbitrary coordinate system and acceleration values of rotational motion with respect to each axis of the coordinate system, a unit for establishing a motion equation expressing a plurality of freedom motions, and a unit for calculating the motion equation with the acceleration values of linear motion at an arbitrary point of the vehicle in the direction of each axis of the arbitrary axis of the arbitrary coordinate system and acceleration values of rotational motion with respect to the each axis of the coordinate system to obtain the physical amount associated with the behavior of the vehicle.

14 Claims, 34 Drawing Sheets

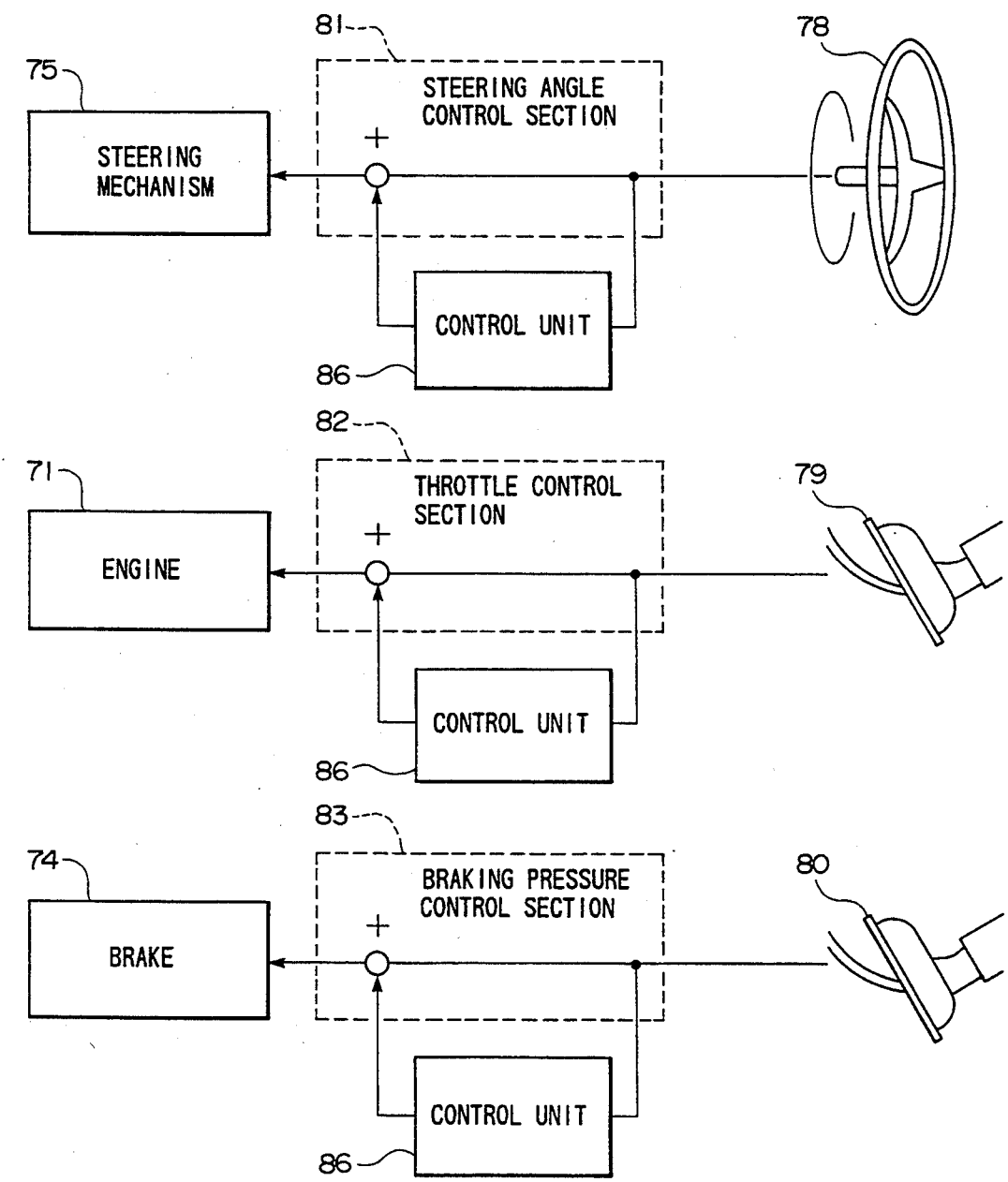

POSITION VECTOR
$R_s(\overrightarrow{OS})$
$R_s(\overrightarrow{OG})$
$a_s(\overrightarrow{GS})$ DYNAMIC COORDINATE SYSTEM
  $S-X_1 X_2 X_3$ (AT SENSORS)
  $G-x\ y\ z$ (AT GRAVITY CENTER)

STATIC COORDINATE SYSTEM
  $O-X\ Y\ Z$ (REFERENCE SYSTEM)

ROTATIONAL COORDINATE SYSTEM
  $E-X_1 X_2 X_3$ (WITHOUT LINEAR
                MOTION COMPONENT)

ON : SECTIONAL LINE CROSSING OF X-Y PLANE AND $X_1$-$X_2$ PLANE
O-X Y Z  REFERENCE COORDINATE SYSTEM
E-$X_1$ $X_2$ $X_3$ ROTATIONAL COORDINATE SYSTEM

FIG.19

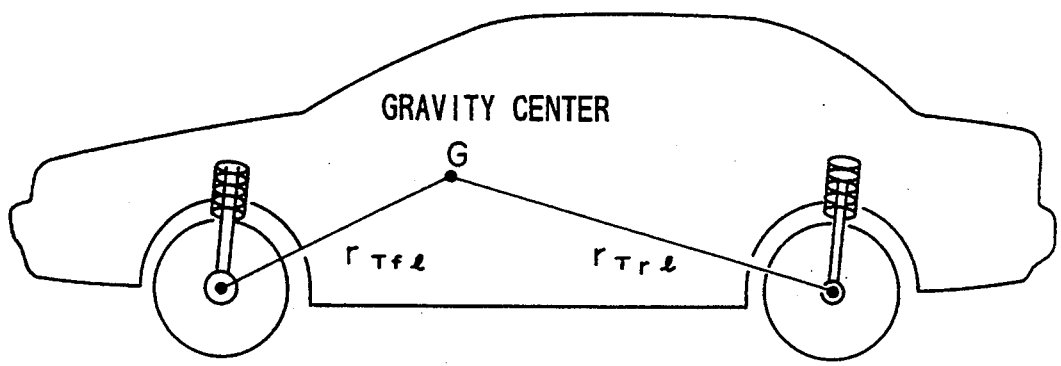

FRONT LEFT WHEEL  $r_{Tfl} = (x_{Tfl}, y_{Tfl}, y_{Tfl} - h_{fl})$
REAR LEFT WHEEL  $r_{Trl} = (x_{Trl}, y_{Trl}, y_{Trl} - h_{rl})$ $$V_{Tfl} = (V_{Txfl}, V_{Tyfl}, V_{Tzfl} - \frac{dh_{fl}}{dt})$$

$$V_{Trl} = (V_{Txrl}, V_{Tyrl}, V_{Tzrl} - \frac{dh_{rl}}{dt})$$

$h_{fl}, h_{rl} \; \frac{dh_{fl}}{dt} \; \frac{dh_{rl}}{dt}$ MEASURED VALUE OF VEHICLER HIGHT SENSOR $\left. \begin{array}{l} (x_{Tfl}, y_{Tfl}, z_{Tfl}) \\ (x_{Trl}, y_{Trl}, z_{Trl}) \end{array} \right\}$ INITIAL SETTING SIMILAR IN FRONT RIGHT WHEEL ( $r_{Tfr}$ )) AND
REAR RIGHT WHEEL ( $r_{Trr}$ )

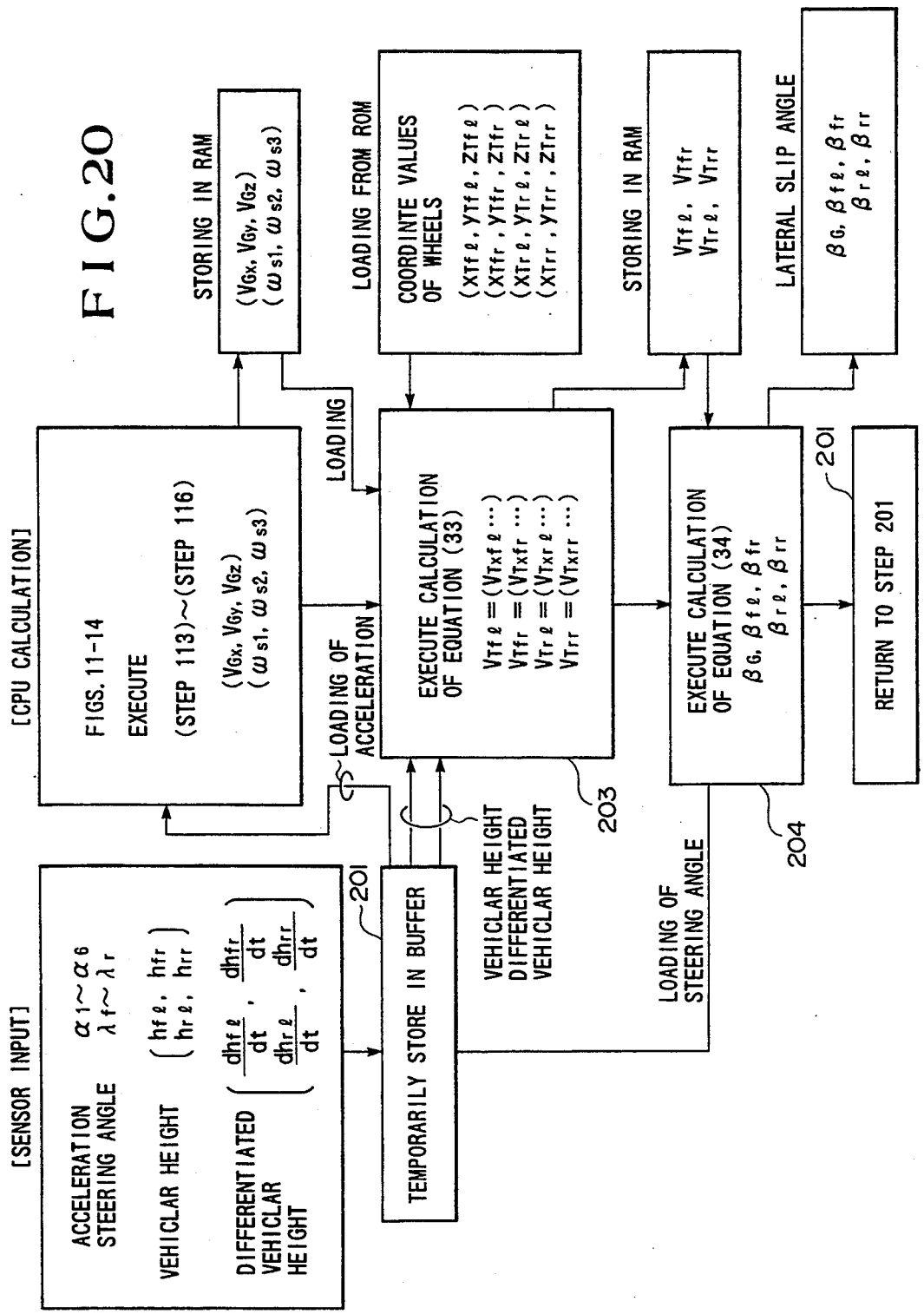

FIG. 40

234 — STANDARD VEHICLE MODEL (SIX FREEDOM MOTION EQUATION)

X : LINEAR MOTION
$Axem = Fcx/Mm + Vys \cdot \omega zs + Vzs \cdot \omega ys$
$Vxem = Vxs + Axem \cdot \Delta t$
$Xxem = Xxs + Vxem \cdot \Delta t$

Y : LINEAR MOTION
$Ayem = Fcy/Mm + Vzs \cdot \omega xs + Vxs \cdot \omega zs$
$Vyem = Vys + Ayem \cdot \Delta t$
$Xyem = Xys + Vyem \cdot \Delta t$

Z : LINEAR MOTION
$Azem = Fcz/Mm + Vxs \cdot \omega ys + Vys \cdot \omega xs$
$Vzem = Vzs + Azem \cdot \Delta t$
$Xzem = Xzs + Vzem \cdot \Delta t$

X : ROLLING (ROTATION MOTION)
$\alpha xem = Tcx/Ixm$
$\omega xem = \omega xs + \alpha xem \cdot \Delta t$
$\theta xem = \theta xs + \omega xem \cdot \Delta t$

Y : PITCHING (ROTATION MOTION)
$\alpha yem = Tcy/Iym$
$\omega yem = \omega ys + \alpha yem \cdot \Delta t$
$\theta yem = \theta ys + \omega yem \cdot \Delta t$

Z : YAWING (ROTATION MOTION)
$\alpha zem = Tcz/Izm$
$\omega zem = \omega zs + \alpha zem \cdot \Delta t$
$\theta zem = \theta zs + \omega zem \cdot \Delta t$ ↑ Fcx, Fcy, Fcz, Tcx, Tcy, Tcz

235 — VEHICLE MODEL FOR CONTROLLED VEHICLE (SIX FREEDOM MOTION EQUATION)

X : LINEAR MOTION
$Axs = Fcx/Mt + Vys \cdot \omega zs + Vzs \cdot \omega ys$
$Vxet = Vxs + Axs \cdot \Delta t$
$Xxet = Xxs + Vxet \cdot \Delta t$

Y : LINEAR MOTION
$Ays = Fcy/Mt + Vzs \cdot \omega xs + Vxs \cdot \omega zs$
$Vyet = Vys + Ays \cdot \Delta t$
$Xyet = Xys + Vyet \cdot \Delta t$

Z : LINEAR MOTION
$Azs = Fcz/Mt + Vxs \cdot \omega ys + Vys \cdot \omega xs$
$Vzet = Vzs + Azs \cdot \Delta t$
$Xzet = Xzs + Vzet \cdot \Delta t$

X : ROLLING (ROTATION MOTION)
$\alpha xs = Tcx/Ixt$
$\omega xet = \omega xs + \alpha xs \cdot \Delta t$
$\theta xet = \theta xs + \omega xet \cdot \Delta t$

Y : PITCHING (ROTATION MOTION)
$\alpha ys = Tcy/Iyt$
$\omega yet = \omega ys + \alpha yet \cdot \Delta t$
$\theta yet = \theta ys + \omega yet \cdot \Delta t$

Z : YAWING (ROTATION MOTION)
$\alpha zs = Tcz/Izt$
$\omega zet = \omega zs + \alpha zet \cdot \Delta t$
$\theta zet = \theta zs + \omega zet \cdot \Delta t$

SYSTEM FOR PREDICTING BEHAVIOR OF AUTOMOTIVE VEHICLE AND FOR CONTROLLING VEHICULAR BEHAVIOR BASED THEREON

BACKGROUND OF THE INVENTION

The present invention relates to a system for detecting a physical amount associated with the behavior or motion of an automotive vehicle, and a system for controlling vehicular behavior or motion on the basis of the detected physical amount associated with the vehicular behavior. More particularly, the invention relates to a system for detecting physical data, such as acceleration, speed, angular acceleration, force, torque and so forth at a selected point on the vehicle, and for controlling the physical amounts in order to realize a desired vehicular behavior or motion. Furthermore, the invention relates to a system which includes a reference model with predetermined response characteristics for controlling vehicular behavior to achieve the response characteristics of the reference model with monitoring of the physical amounts associated with the vehicular behavior.

As a typical model of behavior, the vehicular behavior of a vehicle body having steerable front wheels and rear wheels to be regarded as rigid, can be considered. Now, as shown in FIG. 1, a three dimensional coordinate system having x, y and z axes originated at the gravity center G of the vehicle body 1, is established. Regarding the vehicular behavior about the gravity center as rigid body motion within a three dimensional space, the vehicular behavior can be classified as six freedom motions, which include: (1) linear motion along the x axis - longitudinal motion, (2) motion along the y axis - lateral motion, (3) motion along the z axis - vertical motion, (4) rotational motion about the x axis - rolling motion, (5) rotational motion about the y axis - pitching motion, and (6) rotational motion about the z axis - yawing motion.

These motions are closely associated with vehicular driving characteristics. For example, yawing or rolling are important factors for determining vehicular driving stability. On the other hand, pitching and the vertical motion are caused by undulation of the road surface and/or acceleration and deceleration of the vehicle and are motions which affect the riding comfort of the vehicle.

In advanced automotive technology in recent years, active control technologies, such as anti-lock brakes, traction control, four wheel driving, four wheel steering, active suspension and so forth, for controlling vehicular characteristics as desired, have been developed and incorporated in modern vehicles. In such automotive control technologies, it is necessary to monitor vehicular behavior, particularly acceleration (angular acceleration), from time to time. For this purpose, a plurality of accelerations are often employed.

As a manner of monitoring vehicular behavior, JP-U-2-30780 (Japanese Unexamined Utility Model Publication) discloses a method for detecting a vehicular lateral acceleration and a yawing angular acceleration by employing two acceleration sensors mounted respectively at front and rear portions of the vehicle, and arithmetically processing the outputs from the sensors. In addition, for vehicular behavior control, the position of the gravity center of the vehicle, lateral slip angle at each wheel and wheel slippage are considered as important factors. The lateral slip angle is an angle derived on the basis of a ratio between longitudinal speed and lateral speed of the vehicle and influences the vehicular steering characteristics. On the other hand, the wheel slippage is a value derived by dividing a difference between the vehicular body speed and the rotational speed of a wheel by the vehicular body speed. It has been known that there is an optimal range of wheel slippage for most effectively transmitting engine driving force and braking force to a road surface. Among the active control technologies, there are some systems which optimally distribute engine driving force to four wheels in order to reduce the lateral slip angle toward zero, and some systems which control engine outputs and/or braking forces.

However, the vehicular behavior while traveling is typically a composite behavior of the above-mentioned six freedom motions. Therefore, for enabling monitoring of the vehicular behavior satisfactorily, at least six acceleration sensors become necessary. In addition, since the sensors per se are mounted on the vehicular body, which is in acceleration, the detected values have to be processed with respect to an acceleration coordinate system. Furthermore, the detecting direction of the sensor can rotate according to rotation of the vehicle with respect to the coordinate system of the road surface (static coordinate system). Therefore, correction by conversion of the coordinate system (for example, Eular's angular conversion) becomes necessary.

However, there is no prior art teaching which results in a solution for the above-mentioned problem and thus there is a limit to the precision of detection of the vehicular behavior. This can be an impediment to implementation for further advanced vehicle control technologies.

U.S. Pat. No. 4,829,434, issued on May 9, 1989, for "Adaptive Vehicle" discloses a system which detects "driving behavior" of the driver, "environmental conditions", such as weather, distances from adjacent vehicles, and "vehicle driving conditions", such as vehicular speed, acceleration by means of sensors, and performs total feedback control for the vehicle by establishing an intelligent base with respect to three basic conditions, i.e. the driving behavior, the environmental condition and the vehicle driving condition, by deriving an optimum condition based thereon.

The control as proposed in the above-mentioned United States Patent is intended to provide improved cornering criterion for the vehicle. Therefore, once lateral slip or spinning of the vehicle is initiated, this system will have no effect.

Here, in the theory of vehicular behavior, when a vehicle undergoes lateral slip or spinning exceeding a cornering criterion, the magnitude of the lateral slip and spinning can be reduced by reversing the steering toward the neutral position or beyond the neutral position (counter steering). On the other hand, when a substantial under-steering is caused to make it difficult to pass the corner, applying side braking for causing locking of the rear wheels (spin-turn) will assist in reducing the cornering radius. Such a counter steering technique and spin-turning technique are both highly advanced skills which are difficult to perform for the average driver. Namely, in the case of counter steering, it requires a lot of experience to exactly measure the required angle of steering in the reverse direction. Also, a spin-turn is a very difficult driving technique which can be done only by drivers who have advanced skill.

SUMMARY OF THE INVENTION

It is a first object of the present invention to provide a system which predicts forthcoming vehicular behavior by detecting a physical amount of motion in all directions at a selected point on a vehicle.

A second objection of the present invention is to provide a control system which places the vehicle in a condition for desired behavior on the basis of a detected physical amount associated with the vehicular behavior.

A third object of the invention is to provide a control system which performs control according to behavior characteristics of a reference model different from the natural behavior characteristics of the vehicle.

In order to accomplish the first object of the invention, there is provided a system for detecting a physical amount associated with the behavior of an automotive vehicle using acceleration sensors for detecting rotational motion and linear motion of the vehicle about at least two of the vehicular longitudinal axes, the vertical axis extending through the gravity center of the vehicle and the lateral axis of the vehicle, for establishing motion equations with respect to each of the axes at selected points on the vehicle while simultaneously using acceleration values of at least two rotational motion detected by the acceleration sensors, and for deriving the physical amount associated with the behavior through calculation of the motion equations.

In order to accomplish the second object of the invention, there is provided a system for controlling behavior of an automotive vehicle using acceleration sensors for detecting acceleration values of rotational motion and linear motion of the vehicle about the longitudinal axis of the vehicle, the vertical axis extending through the gravity center of the vehicle and the lateral axis of the vehicle, for detection the rotational speed of wheel of the vehicle, for detecting geometry of suspension of the vehicle and thus detecting vehicular height, for detecting steering angle through a steering wheel, and for controlling behavior of the vehicle on the basis of detected acceleration, wheel speed, vehicular height and steering angle.

In order to accomplish the third object of the invention, there is provided a system for controlling behavior of an automotive vehicle by detecting an operational magnitude for controlling the steering system, the engine, the power train and the suspension system, detecting a control magnitude of actuation of the steering system, the engine, the power train and the suspension system, detecting an amount associated with behavior in each of three dimensional directions of the vehicle, storing a standard behavior model while taking into consideration the operational magnitude in a standard vehicle having predetermined reference response characteristics and amounts associated with the current behavior of the vehicle and outputting amounts associated with forthcoming behavior of the standard vehicle, predicting an amount associated with behavior of the standard vehicle using the standard behavior model with respect to input data of a detected current operational magnitude and the amounts associated with the current behavior of the vehicle, storing a behavior predicting model of the vehicle to be actually controlled, taking the operational magnitude and amounts associated with the behavior of the vehicle to be actually controlled as input data, and outputting an amount associated with a forthcoming behavior of the vehicle in response to the input data, predicting an amount associated with the behavior of the vehicle to be actually controlled using the behavior predicting model of the vehicle to be actually controlled based on the detected current operational magnitude and the amounts associated with the behavior, comparing the predicted values of the amount associated with the behavior of the standard vehicle predicted and the predicted values of the amounts associated with the behavior of the vehicle to be actually controlled for detecting a difference of the predicted amounts, comparing the values of amounts associated with the behavior of the vehicle to be actually controlled and the value of the predicted amount of the behavior of the standard vehicle to derive the difference therebetween, and responding to the difference of the predicted values of the behavior of the standard vehicle exceeding a predetermined value by adjusting a control magnitude of the vehicle in a direction for reducing the difference.

In the preferred embodiment, various physical amounts, such as forces along the axes (longitudinal, lateral, vertical) of the vehicle, accelerations, speeds or velocities, torques around respective axes (pitching, rolling, yawing), angular accelerations, and angular velocity, associated with the vehicular behavior can be derived by arithmetically processing outputs of six acceleration detecting devices mounted on selected positions of a sprung mass (vehicular body) of the vehicle.

On the other hand, by enabling exact detection of the vehicular body behavior from time to time as well as the data associated with vehicular behavior from the sensors, such as a wheel speed sensor, a steering angle sensor and so forth, further advanced vehicular control can be realized.

Furthermore, in another embodiment of the present invention, it is possible to achieve control equivalent to that of experienced drivers upon occurrence of spinning, drifting, substantial under-steering in excess of criteria of motions of the vehicle to recover the vehicular behavior within the criteria. This contributes to safety and avoidance of dangers.

BRIEF DESCRIPTION OF THE DRAWINGS

FIG. 3 is a block diagram showing steering, throttle and brake control section according to the invention;

FIG. 19 is an illustration showing coordinate values at wheel positions relative to the gravity center of the vehicle;

FIG. 20 is an illustration showing process for prediction of lateral slip angle;

FIG. 40 is an illustration showing motion equation of the reference model and motion model of the vehicle to be controlled.

DESCRIPTION OF THE PREFERRED EMBODIMENTS

The present invention will be discussed herebelow in terms of preferred embodiments relating an automotive vehicle.

Figure 1:
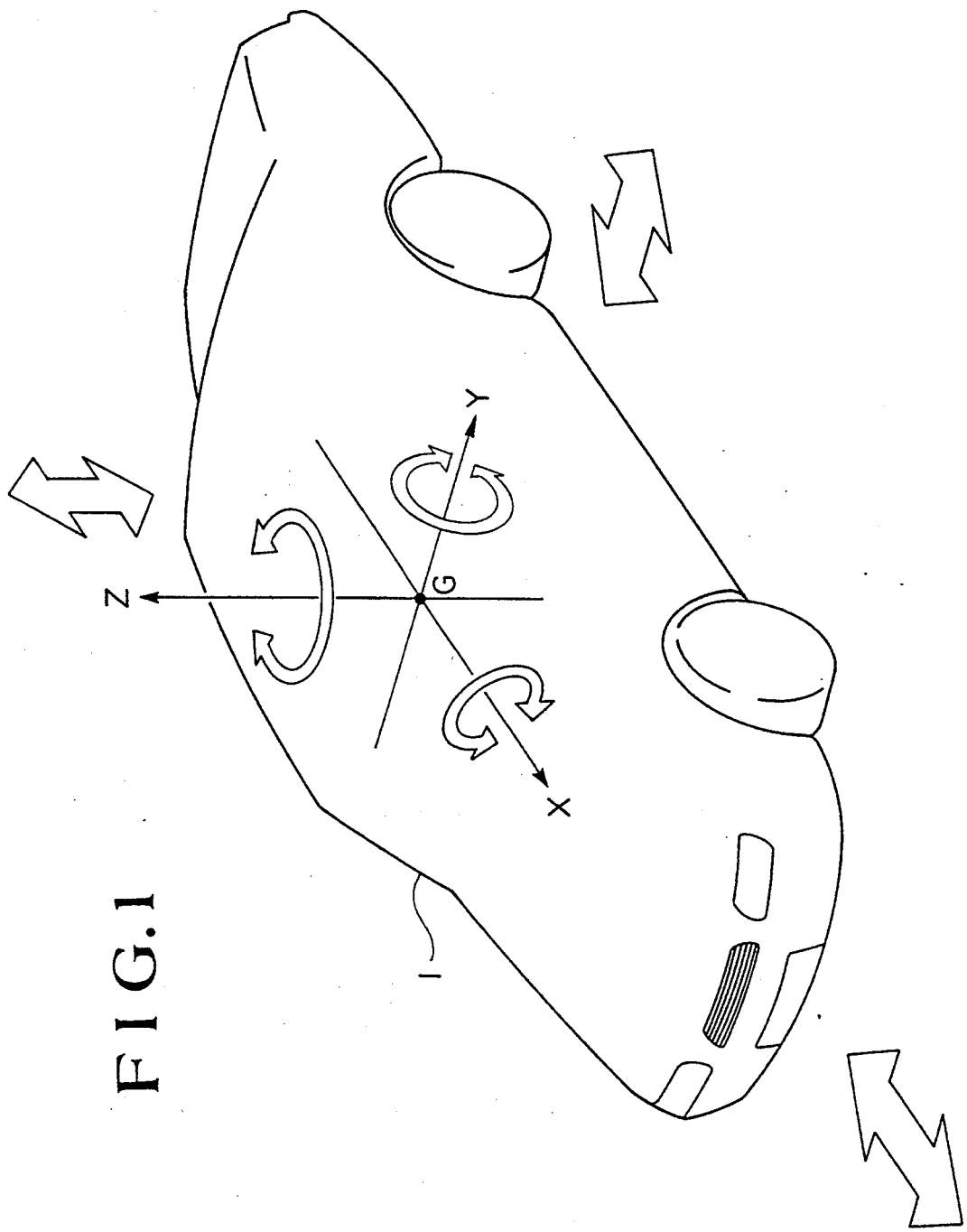
FIG. 1 is an illustration showing directions of amounts associated with motions potentially caused on an automotive vehicle.
Figure 2:
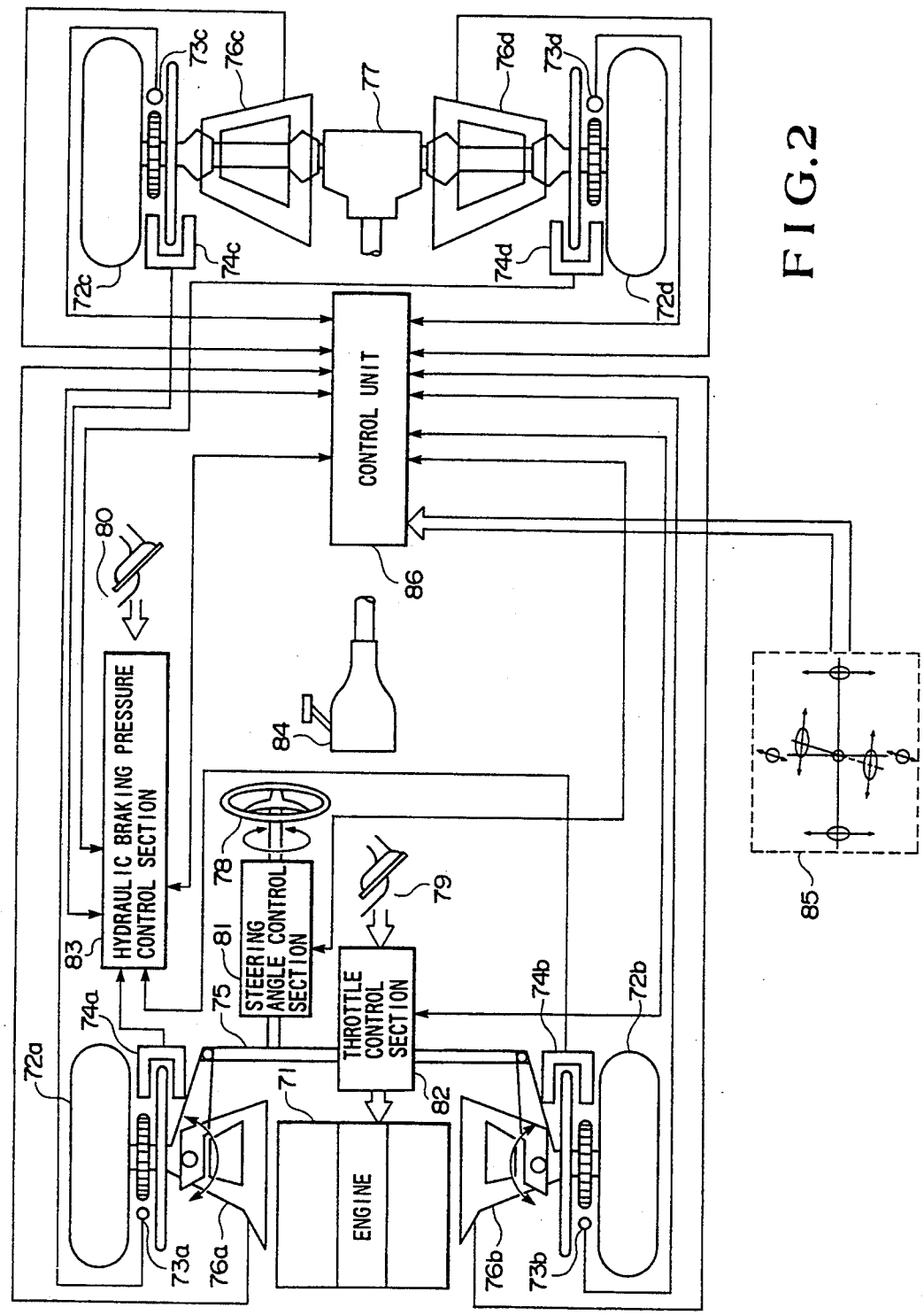
FIG. 2 is a block diagram of one embodiment of a control system according to the invention.

FIG. 2 shows one embodiment of a system according to the present invention which includes an internal combustion engine 71, a front-right wheel 72a, a front-left wheel 72b, a rear-right wheel 72c, a rear-left wheel 72d, wheel speed sensors 73a, 73b, 73c and 73d for the respective wheels, brake mechanisms 74a, 74b, 74c and 74d for the respective wheels, suspension mechanisms 76a, 76b, 76c and 76d for the respective wheels, a controlled differential gear unit 77, a steering wheel 78, an accelerator pedal 79. a brake pedal 80, a steering control section 81, a throttle control section 82, a hydraulic braking pressure control section 83, a power transmission control section 84, six freedom motion sensor 85 and a control unit 86.

Each of the wheel speed sensors 73a, 73b, 73c and 73d comprises a detection gear for rotation with the associated wheel, and a magnetic pick-up. The magnetic pick-up outputs a pulse train corresponding to a rotational angle of the associated wheel. By measuring the interval of the individual pulses in the pulse train, the wheel speed at each angular position can be detected.

Each of the brake mechanism 74a, 74b, 74c and 74d applies braking force for the corresponding wheel for deceleration. The brake mechanisms 74a, 74b, 74c and 74d are provided with sensors for detecting brake line pressure during application of the brake.

The suspension mechanism 76a includes a damper (not shown) with a stroke sensor 61a (not shown in FIG. 2) which may monitor the stroke of the suspension mechanism 76a during vehicular travel. Other suspension mechanisms 76b, 76c and 76d also include similar or the same stroke sensors. The suspension mechanisms thus detect rolling and pitching angles of the vehicle. At the same time, the suspension mechanisms may also detect variation of suspension alignment, such as the camber angle, toe angle and so forth.

The controlled differential gear unit 77 in the shown embodiment, comprises a limited slip differential gear unit which includes a hydraulic wet multi-plate clutch which can control the maximum differential torque limit. By this, torque distribution for driving wheels can be freely adjusted between a normal unlimited state to a lock-up state, in which the driving wheels are rigidly connected to each other.

In FIG. 3, operations of the steering angle control section 81, the throttle control section 82, and the hydraulic braking pressure control section 83 are illustrated. Each control section receives a demand from the driver through the steering wheel 78, the accelerator pedal 79 and the brake pedal 80. The control sections derive the operational magnitudes of the steering angle, the throttle valve open angle and the brake line pressure as operated by the driver to output such information to the control unit 86. Simultaneously, the control sections receive control commands from the control unit 86 for controlling the steering mechanism 75, the engine 71 and respective brake mechanisms 74.

In the absence of the control command from the control unit 85, the steering mechanism 75, the engine and respective brakes 74 are controlled directly by the demands from the driver.

Figure 4:
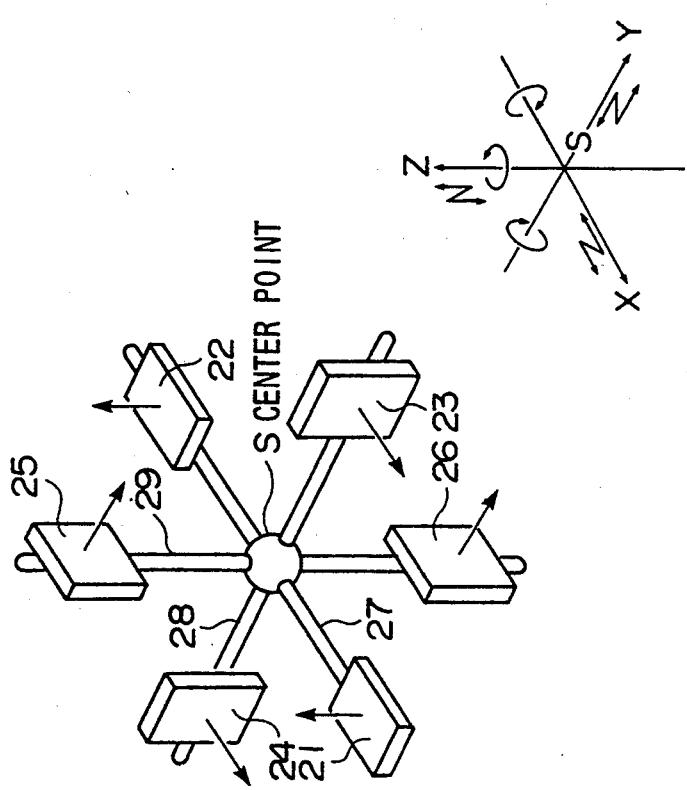
FIG. 4 is an explanatory illustration showing the first embodiment of layout of acceleration sensors on the vehicle.

FIG. 4 shows a proposed arrangement of the acceleration sensors in the six freedom motion sensor 85. As shown in FIG. 4, acceleration sensors 21 to 26 are arranged on three perpendicularly joined mounting stays 27 to 29 intersecting at a point S as an origin, in such a manner that two of the acceleration sensors are provided on each stay. When the xyz coordinate axes are established as shown, the acceleration sensors 21 and 22 on the mounting stay 27 (extending along x axis) detect acceleration in the z axis direction, the acceleration sensors 23, 24 on the mounting stay 28 (extending along y axis) detect acceleration in the x axis direction and the acceleration sensors 25, 26 on the mounting stay 29 (extending along z axis) detect acceleration in the y axis direction. Here, the directions of the accelerations to be detected by the acceleration sensors, 21, 22: 23, 24: 25, 26 are not limited to the shown directions, but they can be arranged with the acceleration sensors 21, 22 detecting the acceleration in the y axis direction, the acceleration sensors 23, 24 detecting the acceleration in the z axis direction and the acceleration sensors 25, 26 detecting the acceleration in the z axis direction, or, in the alternative in respective opposite directions (negative directions). Therefore, four possible ways of mounting of the acceleration are available.

Figure 5:
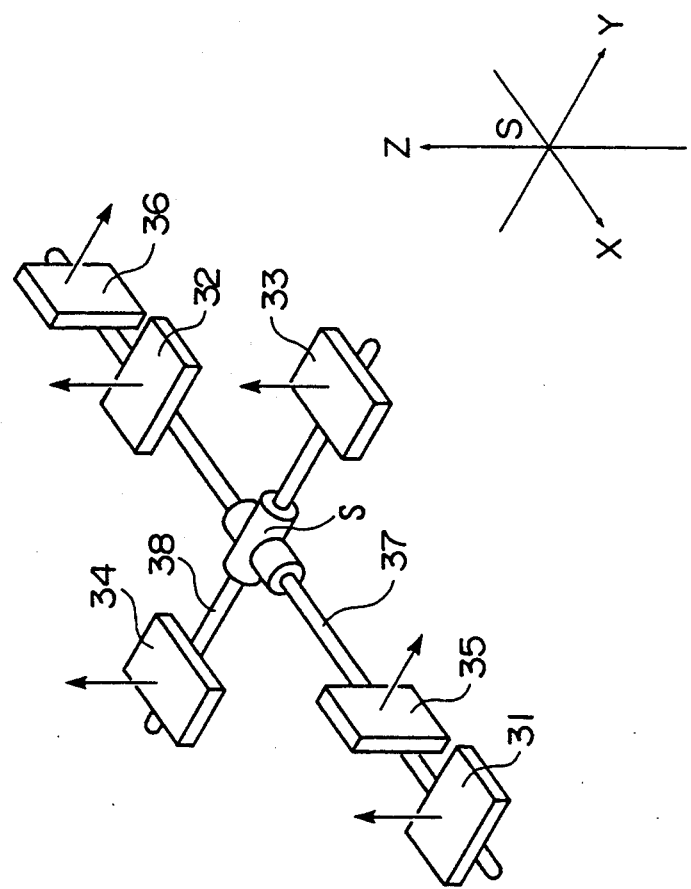
FIG. 5 is an explanatory illustration showing the second embodiment of layout of the acceleration sensors on the vehicle.

FIG. 5 shows another arrangement of the layout of the acceleration sensors. In the shown arrangement, the accelerations sensors 31 to 26 are mounted on two perpendicularly joined mounting stays 37, 38 extending along a selected one of two of three axes of the coordinate system (x and y axes directions in the shown embodiment). In the shown case, the mounting stay 37 is oriented along the x axis. The acceleration sensors 35 and 36 for detecting acceleration in the y axis direction and the acceleration sensors 31 and 32 for detecting acceleration in the z axis direction are mounted on the mounting stay 37. Even in this case, there are three ways of selection of axes for orienting the mounting stays 37 and 38, such as alternating the y axis and the z axis. Also, there are two ways for mounting the acceleration sensors on the mounting stays, such as mounting the acceleration sensors for the z axis and the x axis on the mounting stay oriented in the y axis direction.

Figure 6:
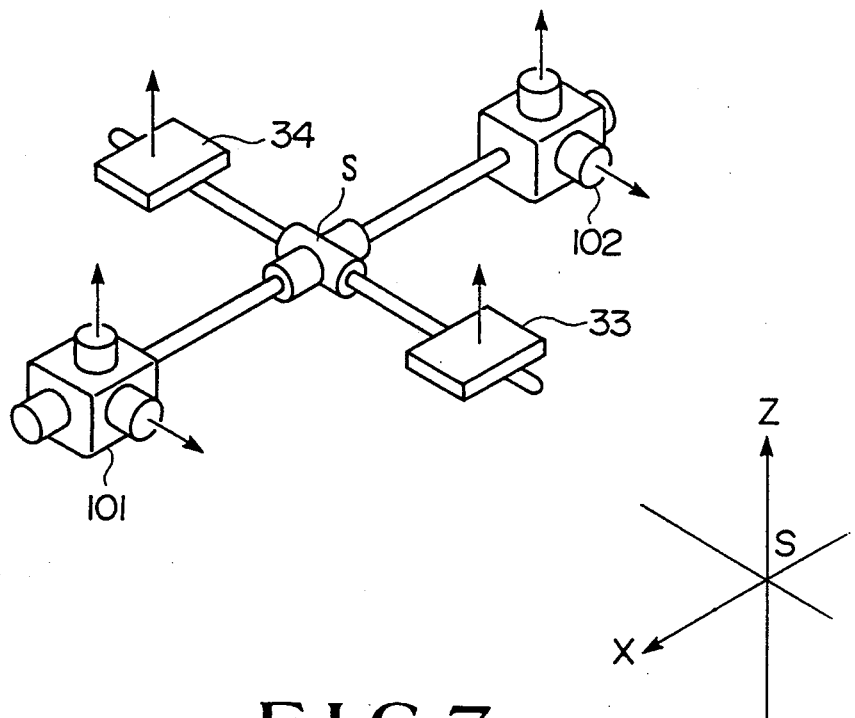
FIG. 6 is an explanatory illustration showing the third embodiment of layout of the acceleration sensors on the vehicle.

FIG. 6 shows a further arrangement of the layout of the acceleration sensors, in which the acceleration sensors 31, 32 and 35, 36 arranged on the mounting stay oriented in the x axis direction are replaced with multi-axes type acceleration sensors 101 and 102. In FIG. 6, the acceleration sensors 101 and 102 are three axes detection type acceleration sensors. However, in the shown case, the acceleration sensors directed to the y axis and the z axis are only active for use in detection of the accelerations. As can be appreciated, even in this case, there are several variations of combinations of the orientation of the mounting stays and arrangement of the acceleration sensors.

The sensor arrangement as shown in FIGS. 5 and 6 do not detect linear motion in the direction of the x-axis but detect five freedom motion. These sensor arrangements can be used for a vehicle control system wherein the linear motion in the direction of the x-axis need not be considered.

In addition, it is not always necessary to mount the sensors on the specific mounting stays as illustrated in FIGS. 4 to 6. For instance, it is possible to mount the acceleration sensors on the vehicular body along the imaginary x, y, z coordinate axes established with respect to the vehicular body.

Next, a manner or process for predicting the vehicular behavior on the basis of the detected values of the six acceleration sensors will be discussed herebelow. In the following discussion, it is assumed that the vehicle (at least the vehicle body above the suspension) is a rigid body. The following discussion will be given for the case in which the acceleration sensors are arranged in the layout illustrated in FIG. 4.

Figure 7:
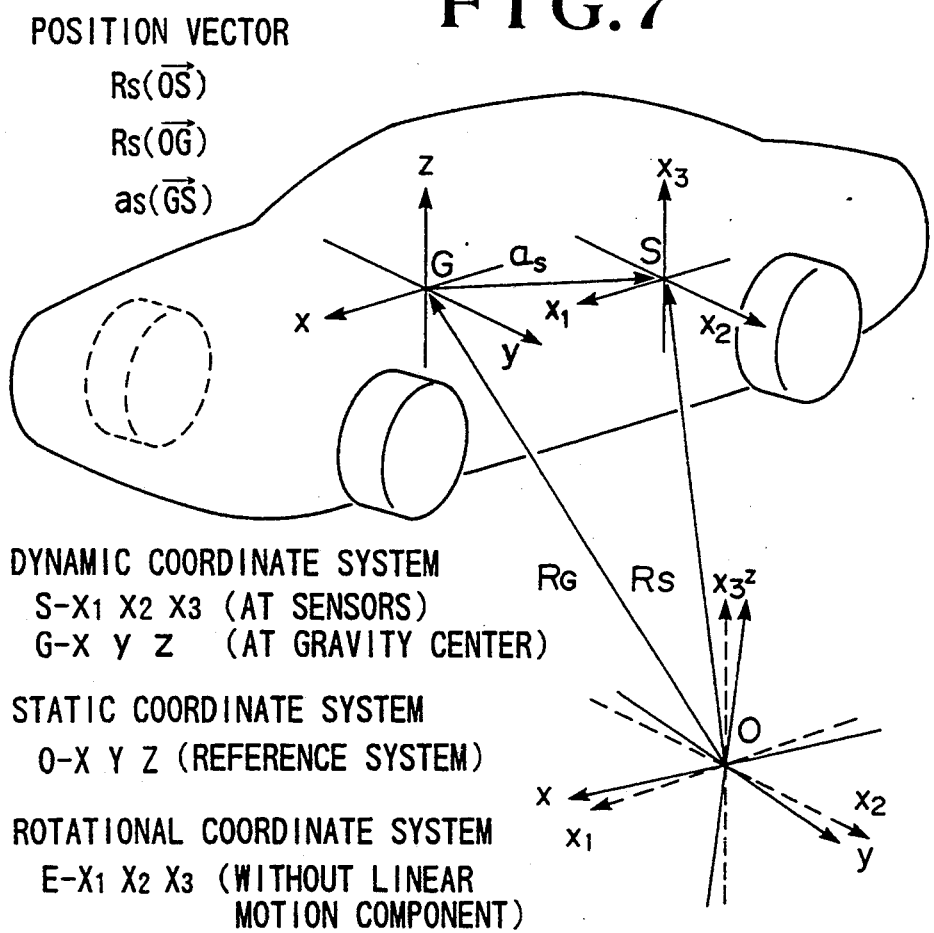
FIG. 7 is an explanatory illustration showing a dynamic coordinate system and a static coordinate system to be employed for control in the present invention.

FIG. 7 shows four kinds of three dimensional coordinate systems employed in implementation of the process of prediction of the vehicular behavior. At first, a coordinate system having the origin at the point S and axes $x_1$, $x_2$ and $x_3$ is a dynamic coordinate system which shifts together with the sensors (accordingly with the vehicular body). Similarly, a coordinate system having its origin at the gravity center G of the vehicle and three coordinate axes x, y and z, is a dynamic coordinate system having a common direction to the coordinate system having the $x_1$, $x_2$ and $x_3$ axes. A coordinate system having its origin at a point O other than the points S and G and three coordinate axes X, Y and Z is a static coordinate system stationary to the road surface. The negative direction of the Z axis is directed to the gravity center of the earth. A coordinate system having its origin at the point O and three coordinate axes $x_1$, $x_2$ and $x_3$ is a rotational coordinate system, which has an axes orientation common to the axes $x_1$, $x_2$ and $x_3$ and x, y, z. Therefore, the rotational coordinate system will have no linear motion component and will have only a rotational motion component.

Figure 8:
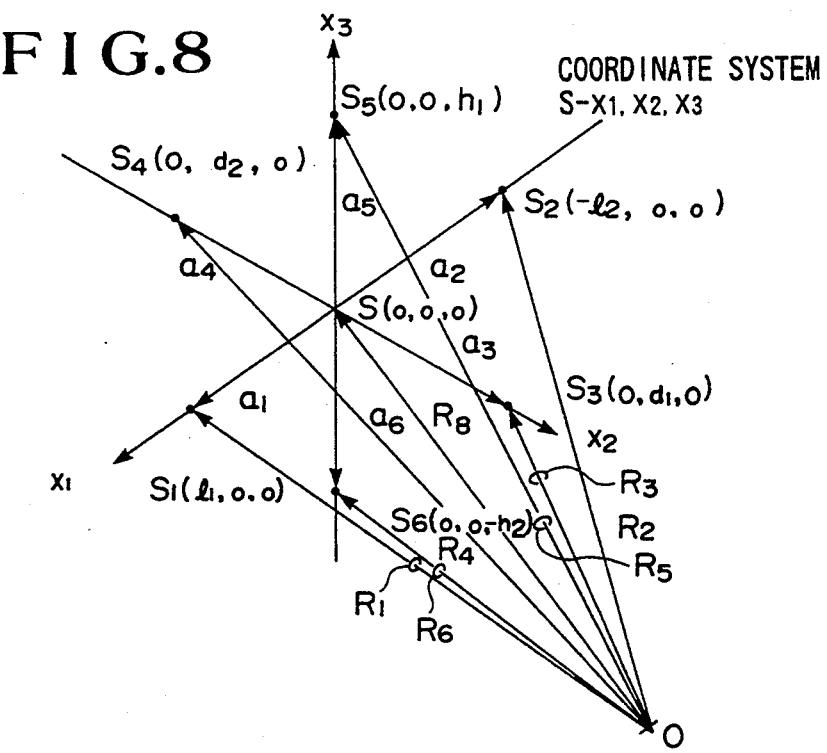
FIG. 8 is an explanatory illustration showing definition of coordinate values of the sensors and vectors.

At first, as shown in FIG. 8, it is assumed that the position vectors of the origin S of the coordinate system $x_1 x_2 x_3$ and the positions $S_1$ to $S_6$ of the sensors 21 to 26 with respect to the static coordinate system XYZ are $R_s$, $R_1$ to $R_6$ and position vectors for the positions $S_1$ to $S_6$ are $a_1$ to $a_6$. In this case, the velocity vectors $V_s$, $V_1$ to $V_6$ which are obtained based on the relationship of the position vectors and by differentiating the position vectors, can be expressed by the following equations.

$$R_1 = R_s + a_1 \quad R_2 = R_s + a_2 \quad R_3 = R_s + a_3 \tag{1}$$
$$R_4 = R_s + a_4 \quad R_5 = R_s + a_5 \quad R_6 = R_s + a_6$$

and $$V_1 = V_s + \omega_s \times a_1 \quad V_2 = V_s + \omega_s \times a_2 \quad V_3 = V_s + \omega_s \times a_3 \tag{2}$$
$$V_4 = V_s + \omega_s \times a_4 \quad V_5 = V_s + \omega_s \times a_5 \quad V_6 = V_s + \omega_s \times a_6$$

wherein $\omega$ is an angular velocity vector of the dynamic coordinate system $x_1 x_2 x_3$ with respect to the statio coordinate system XYZ. The sign X represents external product.

By further differentiating $V_1$ to $V_6$, the accelerations $A_s$, $A_1$ to $A_6$ at the points S, $S_1$ to $S_6$ can be obtained from the following equations.

$$A_1 = A_s + A\omega_s \times a_1 + \omega_s \times (\omega_s \times a_1)$$

$$A_2 = A_s + A\omega_s \times a_2 + \omega_s \times (\omega_s \times a_2)$$

$$A_3 = A_s + A\omega_s \times a_3 + \omega_s \times (\omega_s \times a_3)$$

$$A_4 = A_s + A\omega_s \times a_4 + \omega_s \times (\omega_s \times a_4)$$

$$A_5 = A_s + A\omega_s \times a_5 + \omega_s \times (\omega_s \times a_5)$$

$$A_6 = A_s + A\omega_s \times a_6 + \omega_s \times (\omega_s \times a_6) \tag{3}$$

wherein $A\omega_s$ is the angular acceleration vector of the vehicle.

In the foregoing equations (2) and (3), the components of external products appear because the points $S_1$ to $S_6$ includes rotational motion components with respect to the point S. Here, by deriving differences of $A_1$ and $A_2$, $A_3$ and $A_4$, and $A_5$ and $A_6$, the following equations can be obtained.

$$A_1 - A_2 = A\omega_s \times (a_1 - a_2) + [\omega_s \times (\omega a_1) - \omega_s \times (\omega_s \times a_2)]$$

$$A_3 - A_4 = A\omega_s \times (a_3 - a_4) + [\omega_s \times (\omega a_3) - \omega_s \times (\omega_s \times a_4)]$$

$$A_5 - A_5 = A\omega_s \times (a_5 - a_6) + [\omega_s \times (\omega a_5) - \omega_s \times (\omega_s \times a_6)] \tag{4}$$

On the other hand, by obtaining external products of $A_1$ and $a_2$, $A_2$ and $a_1$, $A_3$ and $a_4$, $A_4$ and $a_3$, $A_5$ and $a_6$, and $A_6$ and $a_5$, and by deriving differences of the pairs similar to the above, the following equations can be obtained.

$$a_2 \times A_1 - a_1 \times A_2 = -A_s \times (a_1 - a_2) + [a_2 \times \tag{5}$$

$$(A\omega_s \times a_1) - a_1 \times (A\omega_s \times a_2)] = [a_2 \times \omega_s \times$$

$$(\omega_s \times a_1) - a_1 \times \omega_s \times (\omega_s \times a_2)]$$

$$a_4 \times A_3 - a_3 \times A_4 = -A_s \times (a_3 - a_4) + [a_4 \times$$

$$(A\omega_s \times a_3) - a_3 \times (A\omega_s \times a_4)] = [a_4 \times \omega_s \times$$

$$(\omega_s \times a_3) - a_3 \times \omega_s \times (\omega_s \times a_4)]$$

$$a_6 \times A_5 - a_5 \times A_6 = -A_s \times (a_5 - a_6) + [a_6 \times$$

$$(A\omega_s \times a_5) - a_5 \times (A\omega_s \times a_6)] = [a_6 \times \omega_s \times$$

$$(\omega_s \times a_5) - a_5 \times \omega_s \times (\omega_s \times a_6)]$$

Here, the unit vector of each axis of the coordinate system $x_1 x_2 x_3$ are assumed as $\theta_1 (1,0,0)$, $\theta_2 (0,1,0)$ and $\theta_3 (0,0,1)$. Then, the following relational equations between the position vectors $a_1$ to $a_6$ can be established.

$$(a_1 - a_2) = (l_1 + l_2) e_1$$

$$(a_3 - a_4) = (l_3 + l_4) e_2$$

$$(a_5 - a_6) = (l_5 + l_6) e_3 \tag{6}$$

With the foregoing relational equations and the formulae for vector calculation, the equations (4) and (5) can be modified to establish the following equations:

$$A_1 - A_2 = (l_1 + l_2)[A\omega_s \times e_1 - \{(\omega_s \cdot e_1)\omega_s - \omega_s^2 e_1\}]$$

$$A_3 - A_4 = (d_1 + d_2)[A\omega_s \times e_2 - \{(\omega_s \cdot e_2)\omega_s - \omega_s^2 e_2\}]$$

$$A_5 - A_6 = (h_1 + h_2)[A\omega_s \times e_3 - \{(\omega_s \cdot e_3)\omega_s - \omega_s^2 e_3\}] \tag{7}$$

$$e_1 \times (l_2 A_1 + l_1 A_2) = (l_1 + l_2) e_1 \times A_s$$

$$e_2 \times (d_2 A_1 + d_1 A_2) = (d_1 + d_2) e_2 \times A_s$$

$$e_3 \times (h_2 A_1 + h_1 A_2) = (h_1 + h_2) e_3 \times A_s \tag{8}$$

wherein the sign represents internal product. Here, the acceleration vectors $A_1$ to $A_6$ at the points $S_1$ to $S_6$ are amount derived with respect to the static coordinate system XYZ. These can also be expressed by breaking into components parallel to the axes $x_1$, $x_2$ and $x_3$ of the dynamic coordinate system by the following equations:

$$A_1 = A_{11} e_1 + A_{12} e_2 + A_{13} e_3 \quad A_2 = A_{21} e_1 + A_{22} e_2 + A_{23} e_3 \tag{9}$$

$$A_3 = A_{31} e_1 + A_{32} e_2 + A_{33} e_3 \quad A_4 = A_{41} e_1 + A_{42} e_2 + A_{43} e_3$$

$$A_5 = A_{51} e_1 + A_{52} e_2 + A_{53} e_3 \quad A_6 = A_{61} e_1 + A_{62} e_2 + A_{63} e_3$$

Here, $A_{12}$, $A_{22}$, $A_{33}$, $A_{43}$, $A_{51}$ and $A_{61}$ are components monitored by the six sensors.

On the other hand, the components of $A_s$ and $A_{\omega s}$, can also be expressed by breaking into components parallel to the axes $x_1$, $x_2$ and $x_3$ of the dynamic coordinate system by the following equations.

$$A_s = A_{s1} e_1 + A_{s2} e_2 + A_{s3} e_3$$

$$A_{\omega s} = A_{\omega s1} e_2 + A_{\omega s2} e_2 + A_{\omega s3} e_3 \tag{10}$$

Accordingly, from the foregoing equations (7) to (10), respective components of acceleration vector A, and the angular vector $A_{\omega s}$ are, from $A_{12}$ and $A_{22}$, $A_{s2}$, $A_{\omega s2}$, from $A_{33}$ and $A_{43}$, $A_{s3}$ and $A_{\omega s3}$, and from $A_{51}$ and $A_{61}$, $A_{s1}$ and $A_{\omega s1}$ being obtained respectively, expressed by the following equations:

$$A_{s1} = \frac{h_2 \cdot A_{61} + h_1 A_{51}}{(h_1 + h_2)} \tag{11}$$

$$A_{s2} = \frac{h_2 \cdot A_{12} + l_1 A_{22}}{(l_1 + l_2)}$$

$$A_{s1} = \frac{d_2 \cdot A_{33} + d_1 A_{43}}{(d_1 + d_2)}$$

$$A_{\omega s1} = \frac{A_{51} - A_{61}}{(h_1 + h_2)} - \omega_{s3} \omega_2 \tag{12}$$

$$A_{\omega s2} = \frac{A_{12} - A_{22}}{(l_1 + l_2)} - \omega_{s1} \omega_{s3}$$

$$A_{\omega s3} = \frac{A_{33} - A_{43}}{(d_1 + d_2)} - \omega_{s2} \omega_{s1}$$

Here, in the equation (12), $\omega_{s1}$, $\omega_{s2}$ and $\omega_{s3}$ become necessary for deriving the angular accelerations $A_{\omega s1}$, $A_{\omega s2}$ and $A_{\omega s3}$. These values can be obtained by integrating the obtained angular accelerations from time to time.

From the foregoing, the components of the linear acceleration vector and the angular acceleration vector respectively parallel to the axes $x_1$, $x_2$ and $x_3$ of the dynamic coordinate system at the selected point S on the vehicle can be determined. In general, the rotational components (angular velocity and angular acceleration) of the rigid body are equal at any point. Therefore, assuming that the vehicle (at least the vehicle body above the suspension) is a rigid body, the components obtained as set forth above become the angular acceleration about the gravity center of the vehicle. However, the linear components are differentiated at different points on the vehicle. Therefore, as shown in FIG. 5, by establishing the dynamic coordinate system xyz having its origin at the gravity center G of the vehicle, the position vector as from the point G to the point S and the position vector $R_G$ from the origin O of the static coordinate system to the gravity center G are derived. Then, the following equation can be established.

$$R_s = R_G + a_s \qquad (13)$$

By differentiating each side, the following equation can be established.

$$V_s = V_G + \omega_s \times a_s \qquad (14)$$

Here, $V_G$ is the linear vector at the gravity center G. By further differentiation, the following equation can be obtained:

$$A_s = V_G + A\omega_s \times a_s + \omega_s \times (\omega_s \times a_s) \qquad (15)$$

Here, $A_G$ is the linear acceleration vector at the gravity center. Similarly to the process for the dynamic coordinate system $x_1x_2x_3$, by considering the equation (15) with respect to the broken components parallel to respective axes of the dynamic coordinate system xyz (also parallel to dynamic coordinate system $x_1x_2x_3$) having its origin at the gravity center G, and assuming $a_s = (x_s, y_s, z_s)$ and $A_G = (A_{Gx}, A_{Gy}, A_{Gz})$, the following equations can be established for respective components.

$$A_{Gx} = A_{s1} - (A\omega_{s2}z_s - A\omega_{s3}y_s) - [(\omega_{s1}x_s = \omega_{s2}y_s + \omega_{s3}z_s)\omega_{s1} - \omega_s^2 x_s]$$

$$A_{Gy} = A_{s2} - (A\omega_{s3}x_s - A\omega_{s1}z_s) - [(\omega_{s1}x_s = \omega_{s2}y_s + \omega_{s3}z_s)\omega_{s2} - \omega_s^2 y_s]$$

$$A_{Gz} = A_{s3} - (A\omega_{s1}y_s - A\omega_{s2}x_s) - [(\omega_{s1}x_s = \omega_{s2}y_s + \omega_{s3}z_s)\omega_{s3} - \omega_s^2 z_s] \qquad (16)$$

On the other hand, the velocity vector $V_G = (V_{Gx}, V_{Gy}, V_{Gz})$ can be obtained by integrating the equation (16).

Next, consideration is given for the problem in that, according to rotation of the vehicle, the acceleration sensors also rotate to vary the detecting directions. When yawing motion about the z axis of the vehicle is detected by establishing the z axis in the orientation in alignment with the direction of gravity, if motion about the x axis (rolling) and/or motion about the y axis (pitching) are caused simultaneously to cause inclination of the vehicle and thus to cause inclination of the detecting directions of the sensors, accurate measurement of the yawing cannot be achieved. The angular accelerations $A\omega_{s1}$, $A\omega_{s2}$ and $A\omega_{s3}$ obtained through the process set forth above are respective components in the dynamic coordinate system $x_1x_2x_3$, and linear accelerations $A_{s1}$, $A_{s2}$, $A_{s3}$, $A_{Gx}$, $A_{Gy}$, $A_{Gz}$ are respective components along the axes of the dynamic coordinate system $x_1x_2x_3$ at a moment at which the vectors $A_s$ and $A_G$, are as defined in the static coordinate system XYZ. Accordingly, for obtaining components along the axes of the static coordinate system XYZ, considering the coordinate system $x_1x_2x_3$ having the axes direction equal to the coordinate systems $x_1x_2x_3$ and xyz and origin coincides with the point O, and making values obtained through the foregoing processes corresponding to this coordinate system, accurate data should be obtained by performing conversion of the coordinate systems between $x_1x_2x_3$ and XYZ.

Figure 9:
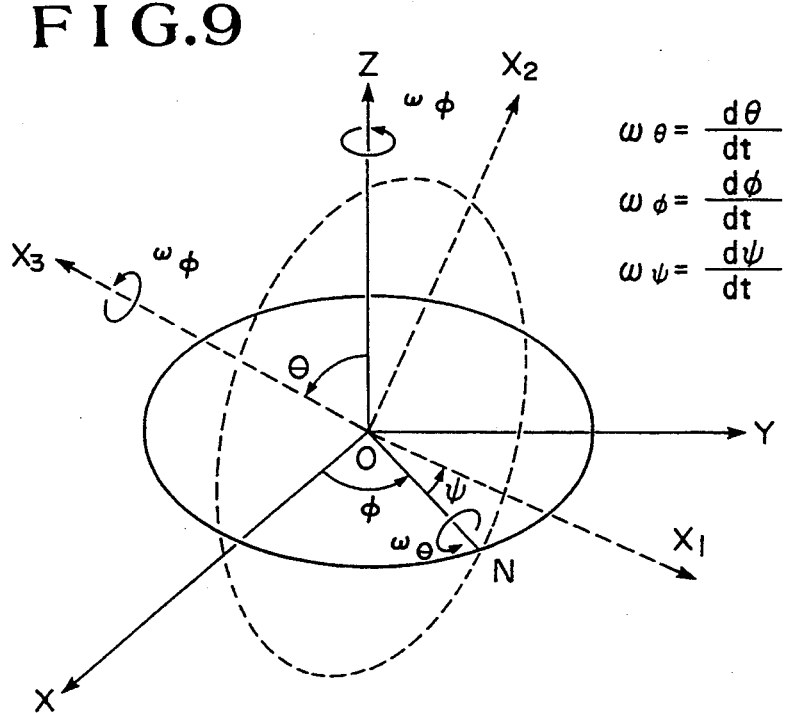
FIG. 9 is an illustration showing definition of various variables in Eular conversion.

FIG. 9 shows a process for conversion of correction of the inclination. Such conversion is generally referred to as Euler's conversion. As illustrated, assuming that the angle formed by the $X_3$ axis and the Z axis is $\theta$, taking that the intersection line between the XY plane and $X_1Y_1$ plane as ON, the angle formed by the line ON and the X axis as $\phi$, the angle formed by the line ON and the $X_1$ axis as $\psi$, the conversion from $X_1X_2X_3$ coordinate system to XYZ coordinate system can be expressed by the following equation:

$$\begin{bmatrix} A_0 \\ A\omega_0 \end{bmatrix} = \begin{bmatrix} \Omega_E & 0 \\ 0 & \Omega_E \end{bmatrix} \begin{bmatrix} AS \\ A\Omega_s \end{bmatrix} \qquad (17)$$

$$[\Omega_E] = \begin{bmatrix} \Omega_{11} & \Omega_{12} & \Omega_{13} \\ \Omega_{21} & \Omega_{22} & \Omega_{23} \\ \Omega_{31} & \Omega_{32} & \Omega_{33} \end{bmatrix}$$

wherein $$\Omega_{11} = \cos\phi\cos\psi - \cos\theta\sin\phi\sin\psi$$

$$\Omega_{12} = \cos\phi\cos\phi - \cos\theta\sin\psi\cos\phi$$

$$\Omega_{13} = \sin\theta\sin\psi$$

$$\Omega_{21} = \sin\phi\cos\psi + \cos\theta\cos\phi\sin\psi$$

$$\Omega_{22} = \sin\phi\sin\psi + \cos\theta\cos\phi\cos\psi$$

$$\Omega_{23} = \sin\theta\cos\phi$$

$$\Omega_{31} = \sin\theta\sin\psi$$

$$\Omega_{32} = -\sin\theta\cos\psi$$

$$\Omega_{33} = \cos\theta$$

the linear acceleration vector $A_O = (A_{Ox}, A_{Oy}, A_{Oz})$ and the angular acceleration vector $A\omega_O = (A\omega_{Ox}, A\omega_{Oy}, A\omega_{Oz})$ are respectively the amount with respect to the static coordinate system XYZ. Here, the angles $\theta$, $\phi$ and $\psi$ can be obtained from the following. Assuming the angular velocity components in the direction of the axes $X_1$, $X_2$ and $X_3$ are $\omega_{x1}$, $\omega_{x2}$ and $\omega_{x3}$, the following relational equations can be established:

$$\omega_{x1} = \omega\theta\cos\psi + \omega\phi\sin\theta\sin\psi$$

$$\omega_{x2} = -\omega\phi\sin\psi + \omega\phi\sin\theta\cos\psi$$

$$\omega_{x3} = \omega\psi\cos\theta + \omega\phi \qquad (18)$$

wherein $$\omega\theta = (d\theta/dt), \quad \omega\phi = (d\phi/dt), \quad \omega\psi = (d\psi/dt)$$

Solving the foregoing equation (18), the following equation can be obtained.

($\theta \neq 0$)

$$\omega\theta = \omega_{x1}\cos\psi - \omega_{x2}\sin\psi$$

$$\omega\phi = (\omega_{x1}\sin\psi + \omega_{x2}\cos\psi)/\sin\theta$$

$$\omega\phi = \omega_{x3} - \omega\phi\cos\theta \tag{19a}$$

($\theta = 0$)

$$\omega\theta = \omega_{x1}\cos\psi - \omega_{x2}\sin\psi$$

$$\omega\theta + \omega\phi = \omega_{x3} \tag{19b}$$

The angular velocities are $\omega_{x1} = \omega_{s1}$, $\omega_{x2} = \omega_{s2}$ and $\omega_{s3} = \omega_{s3}$, and the values of $\theta$, $\phi$ and $\psi$ can be obtained by integrating the equation (19a) or (19b) depending upon whether $\theta \neq 0$ or $\theta = 0$. Therefore, the linear accelerations, linear speeds and angular accelerations and angular velocities can be derived through the foregoing process.

Then, the force applied to the gravity center G and the torque about the axes will be determined. At first, with respect to the torque acting on the vehicle, Euler's equation as set out with respect to the dynamic coordinate system xyz is applicable. Therefore, it can be expressed by the following equation.

$$L = I\omega_s \tag{20}$$

$$N_G = \frac{dL}{dt} + (\omega_s \times L)$$

$$L = I_{\omega s}$$

Here, $N_G$ is the torque, L is a magnitude of angular motion of the vehicle during motion, and I is an inertia matrix $I_{ij}$ (inertia moment $I_{ii}$, inertia multiplied product $I_{ij}$ ($i \neq j$).

By breaking the equation (20) for respective components along respective axes and make the suffixes ij to correspond as 1→x, 2→y, 3→z, the torque vector $N_G$ can be expressed using the angular velocity vector $\omega_s = (\omega_{s1}, \omega_{s2}, \omega_{s3})$ and the angular acceleration vector $A\omega_s = (A\omega_{s1}, A\omega_{s2}, A\omega_{s3})$, as follows:

$$N_{Gx} = (I_{xx}A\omega_{s1} + I_{xy}A\omega_{s2} + I_{xz}\omega_{s3}) + [\omega_{s2}(I_{zx}\omega_{s1} + I_{zy}\omega_{s2} + I_{zz}\omega_{s3}) - \omega_{s3}(I_{yx}\omega_{s1} + I_{yy}\omega_{s2} + I_{yz}\omega_{s3})]$$

$$N_{Gy} = (I_{yy}A\omega_{s1} + I_{yz}A\omega_{s2} + I_{yz}\omega_{s3}) + [\omega_{s3}(I_{yx}\omega_{s1} + I_{yy}\omega_{s2} + I_{yz}\omega_{s1}) - \omega_{s3}(I_{zx}\omega_{s1} + I_{zy}\omega_{s2} + I_{zz}\omega_{s3})]$$

$$N_{Gz} = (I_{zx}A\omega_1 + I_{zy}A\omega_{s2} + I_{zz}\omega_{s3}) + [\omega_{s1}(I_{yx}\omega_{s1} + I_{yy}\omega_{s2} + I_{yz}\omega_{s3}) - \omega_{s2}(I_{xx}\omega_{s1} + I_{xy}\omega_{s2} + I_{xz}\omega_{s3})] \tag{21}$$

On the other hand, the force acting on the gravity center can be expressed by utilizing the acceleration vector $A_G = (A_{Gx}, A_{Gy}, A_{Gz})$ and the mass weight M of the vehicle at the gravity center, as follows:

$$F_{Gx} = MA_{Gx}$$

$$F_{Gy} = MA_{Gy}$$

$$F_{Gz} = MA_{Gz} \tag{22}$$

In the foregoing, a discussion has been given for a model equation for calculating and predicting each of the physical amounts associated with vehicular motion which can be calculated from the measured values of the six acceleration sensors. Here, attention should be given to the fact that the process up to the equation (22), except for the assumption that the vehicle as a moving body is rigid, requires no further assumption for formulating the foregoing process. Namely, the foregoing equations can be regarded as basic equations. The approximations necessitated due to the capacity of the arithmetic operation of the microcomputer and limitation of the motion of the vehicular motion should be regarded as essentially included in the present invention. When the dynamic coordinate system $x_1 x_2 x_3$ is set by orienting the $x_1$ axis along the longitudinal direction of the vehicle, the $x_2$ axis along the lateral direction and the $x_3$ axis along the vertical direction, and if it can be assumed that the angular velocity about the $x_1$ axis (rolling angular velocity) and the angular velocity about the $x_2$ axis (pitching velocity) are sufficiently small relative to the angular velocity about the $x_3$ axis (yawing angular velocity), the foregoing equations (12) can be approximated as follows:

$$A\omega_{s1} \approx \frac{A_{51} - A_{61}}{(h_1 + h_2)} \tag{23}$$

$$A\omega_{s2} \approx \frac{A_{12} - A_{22}}{(l_1 + l_2)}$$

$$A\omega_{s3} \approx \frac{A_{33} - A_{43}}{(d_1 + d_2)}$$

Similarly, in Euler's angular conversion of the foregoing equations (17), if the pole angle $\theta$ and the bearing angle $\psi$ are sufficiently small relative to the bearing angle $\phi$, approximations as $\cos\theta \doteq 1$, $\cos\psi \doteq 1$, $\sin\theta \doteq \theta$, $\sin\psi \doteq \psi$ can be adopted. Then, the coefficients for the conversion matrix can be expressed by the following formulae:

$$\Omega_{11} \doteq \cos\phi - \psi(\sin\phi)$$

$$\Omega_{12} \doteq 0$$

$$\Omega_{13} \doteq \theta \cdot \psi$$

$$\Omega_{21} \doteq \sin\phi + \psi(\cos\phi)$$

$$\Omega_{22} \doteq -(\sin\phi)\psi + (\cos\phi)$$

$$\Omega_{23} \doteq -\theta\cos\phi$$

$$\Omega_{31} \doteq \theta \cdot \psi$$

$$\Omega_{32} \doteq -\theta$$

$$\Omega_{33} \doteq 1 \tag{24}$$

These approximations of the model equations can be made depending upon the required precision level.

Figure 10:
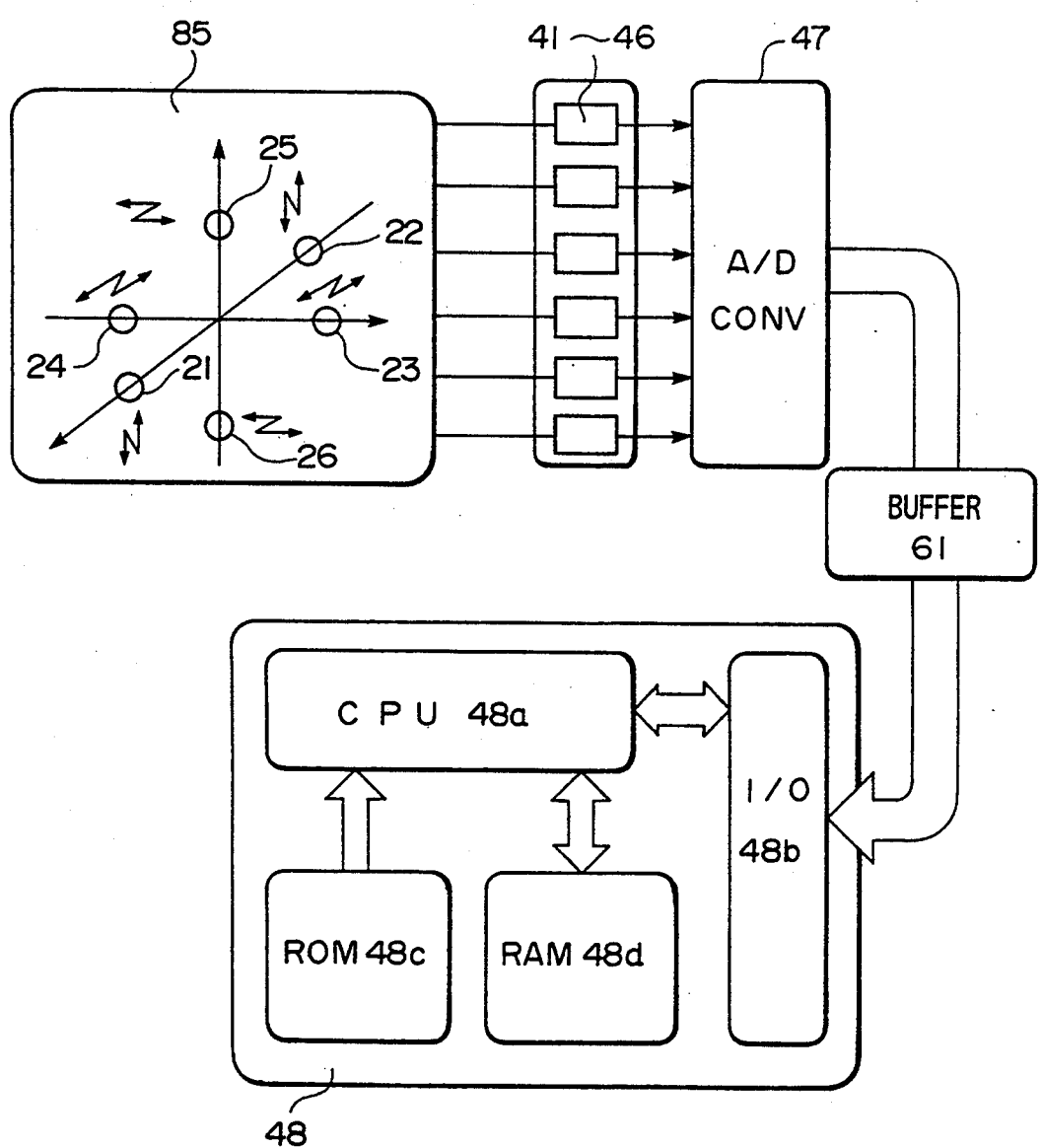
FIG. 10 is block diagram showing hardware construction of a system for predicting vehicular behavior.
Figure 11:
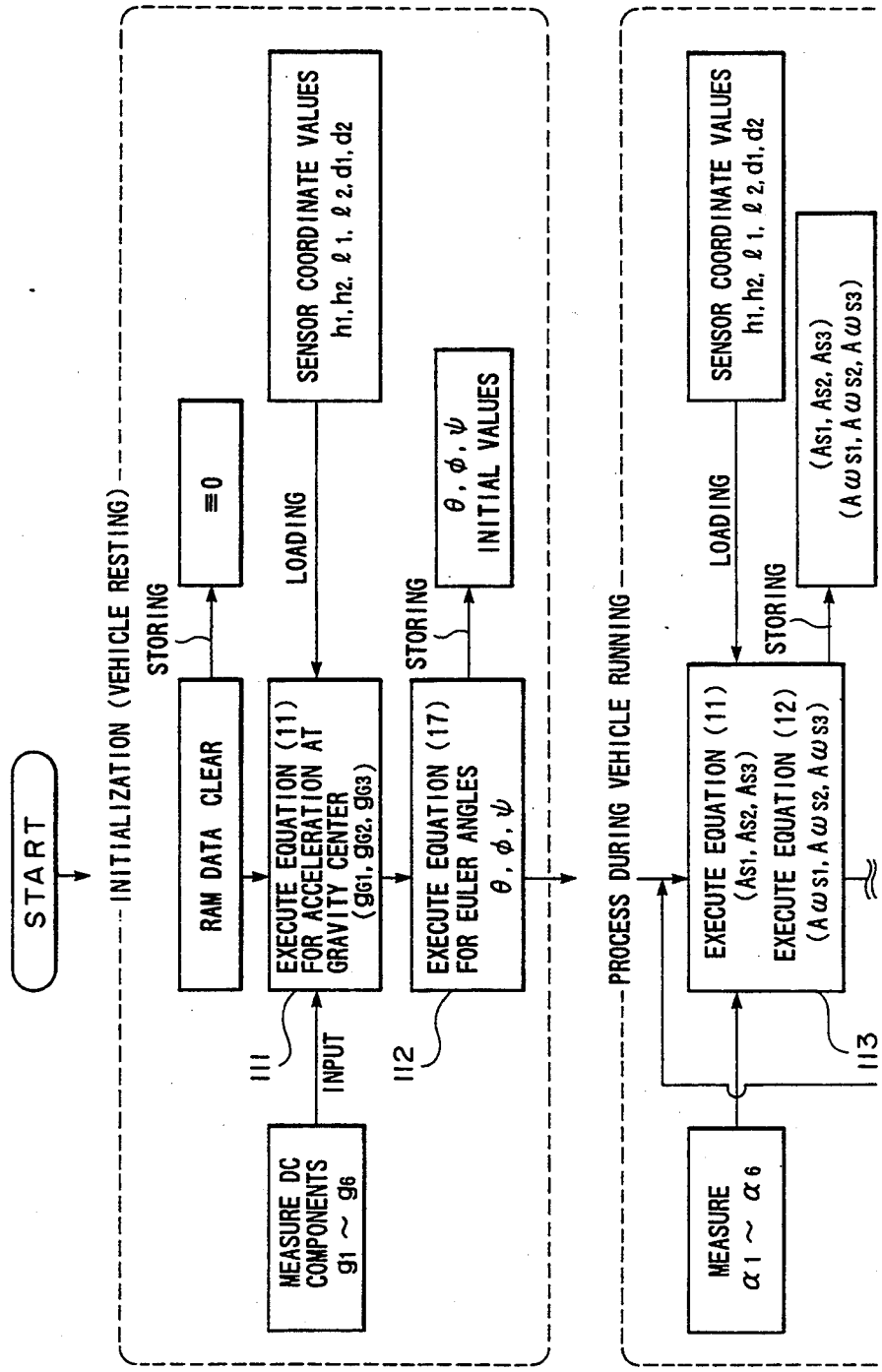
FIG. 11 is an illustration showing manner or procedure for performing arithmetic operation for predicting behavior of the vehicle to be performed by a microcomputer.
Figure 12:
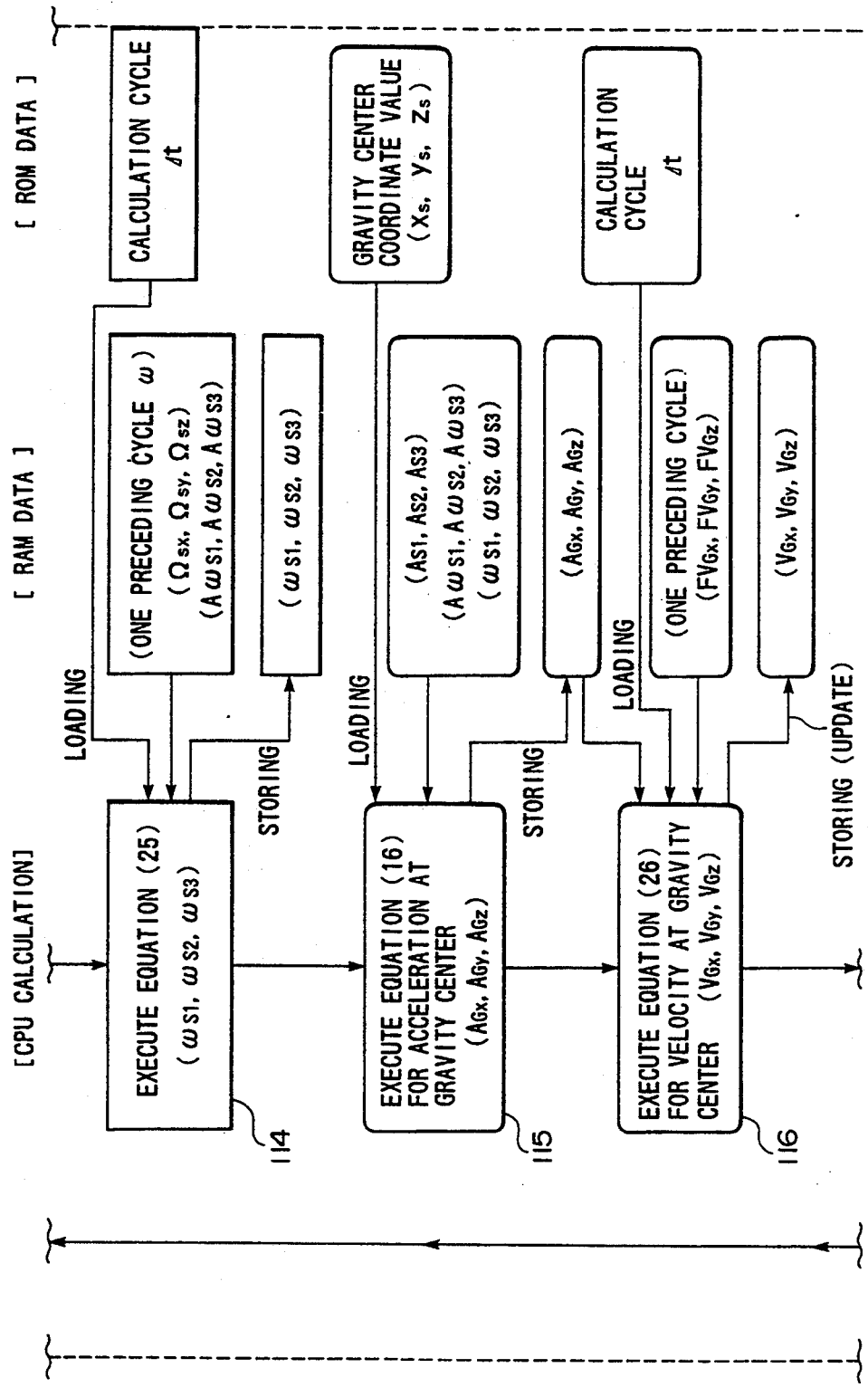
FIG. 12 is an illustration showing a process of arithmetic operation for predicting behavior of the vehicle to be performed by the microcomputer, which is in series with the process of FIG. 11.
Figure 13:
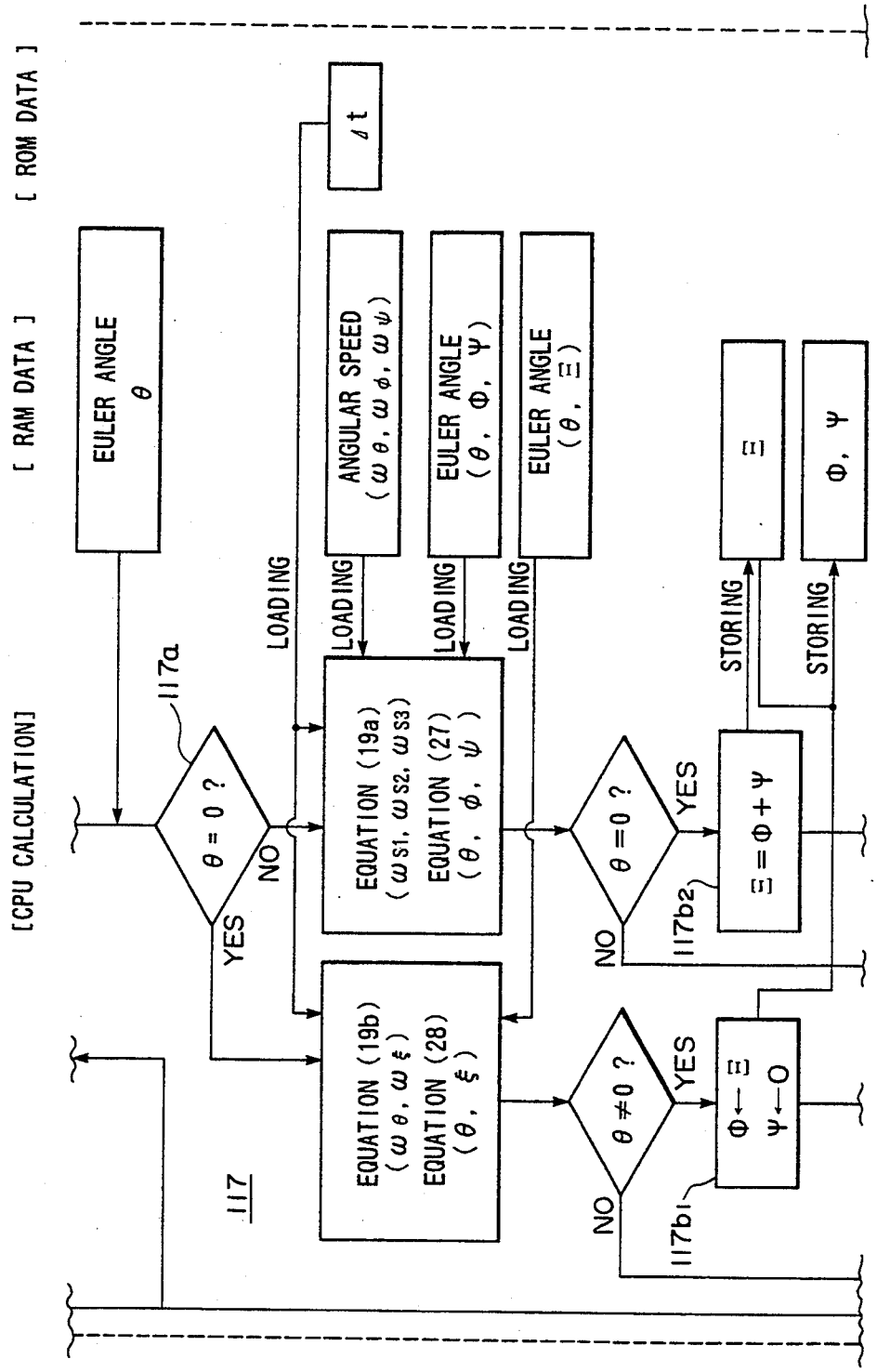
FIG. 13 is an illustration showing a process of arithmetic operation for predicting behavior of the vehicle to be performed by the microcomputer, which is in series with the process of FIGS. 11 and 12.
Figure 14:
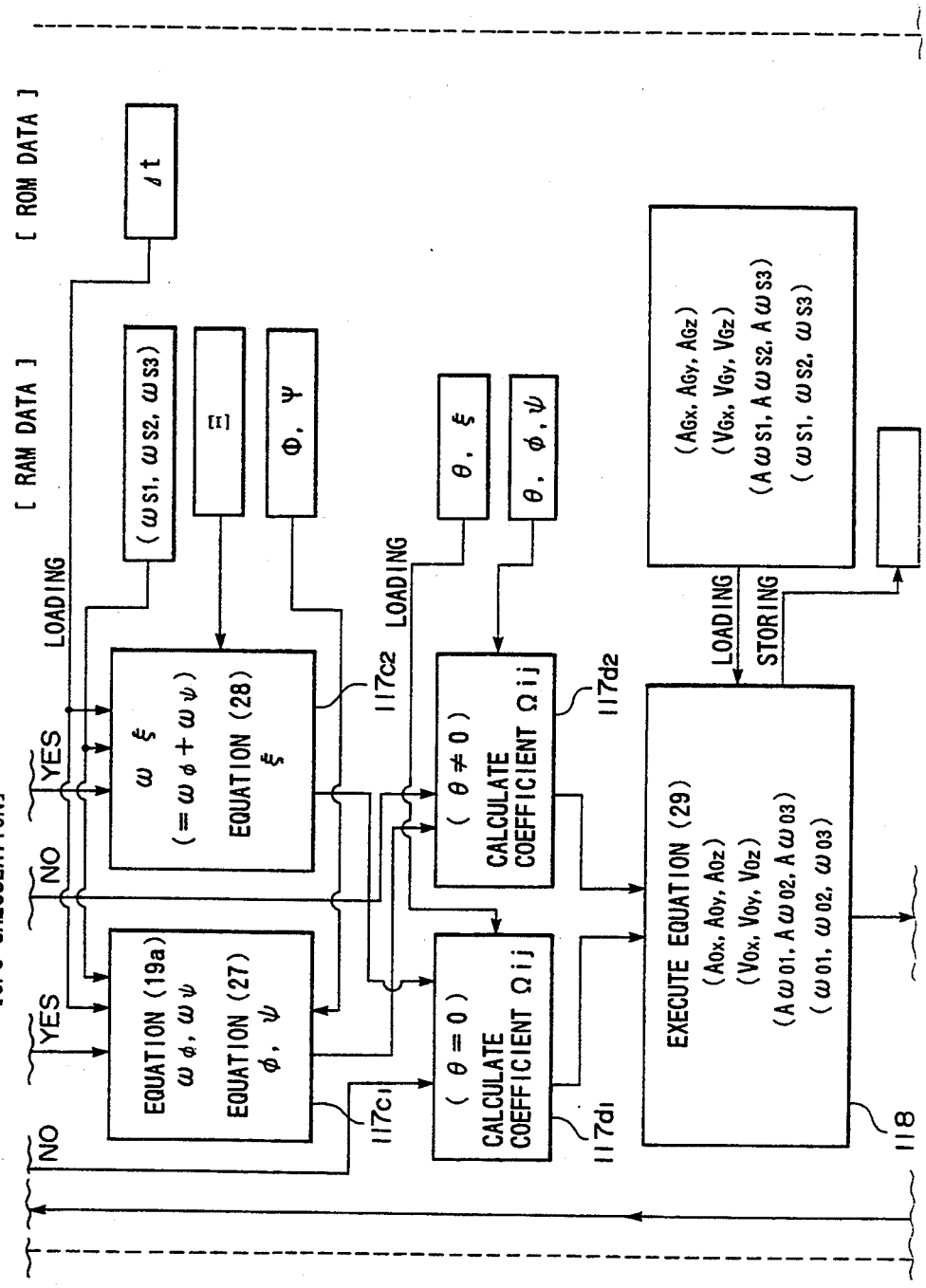
FIG. 14 is an illustration showing a process of arithmetic operation for predicting behavior of the vehicle to be performed by the microcomputer, which is in series with the process of FIGS. 11, 12 and 13.
Figure 15:
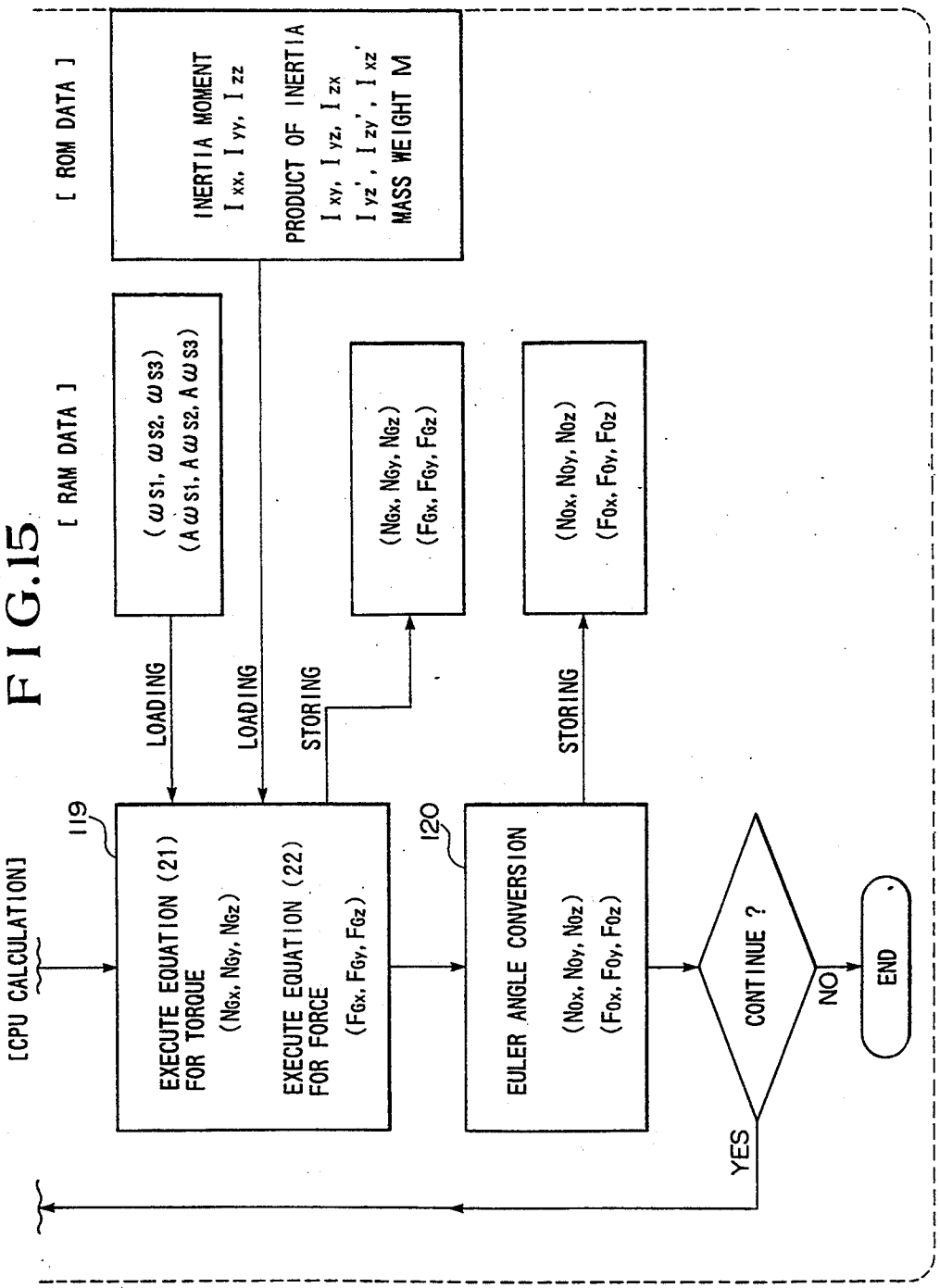
FIG. 15 is an illustration showing a process of arithmetic operation for predicting behavior of the vehicle to be performed by the microcomputer, which is in series with the process of FIGS. 11, 12, 13 and 14.

All of the foregoing arithmetic operations can be performed by software in the microcomputer. FIG. 10 shows a hardware construction of the control unit 86 for performing a prediction of the vehicular behavior, while FIGS. 11 to 15 show a series of flowcharts showing arithmetic operations performed in the microcomputer.

At first, the overall hardware construction includes the acceleration sensors 21 to 26 as arranged at points $S_1$ to $S_6$ as shown in FIG. 4 (can be arranged as shown in FIG. 5 or 6), signal amplifiers 41 to 46 for respective sensors, AD converter 47 for converting six sensor outputs (analog signals) into digital signals (which may be realized as part of the functions of the microcomputer), a buffer 61 for temporarily storing the input signals, and a microcomputer 48. The microcomputer 48 comprises one or more CPU 48a, I/O 48b, ROM 48c, RAM 48d and other peripheral LSI circuits. Depending upon required calculation speed, memory capacity, any desired hardware construction (for instance, a plurality of single chip microcomputers, digital signal processors or parallel processors which are capable of parallel processing) can be employed.

As shown in FIGS. 11 to 15, in response to the turning ON of an ignition key as a main switch for initiating driving operation, the microcomputer is reset. Then, an initialization process is performed. Namely, data stored in RAM 48d, such as linear accelerations, angular accelerations, angular velocities and so forth, are cleared to "0". Then, at the resting condition of the vehicle before starting travel, the acceleration sensors 21 to 26 capable of detecting a DC component can detect only the gravitational accelerations g of the earth. Assuming that the voltages $g_1$ to $g_6$ (analog signals) are output from the acceleration sensors 21 to 26 via the signal amplifiers 41 to 46, these voltages $g_1$ to $g_6$ are input to the microcomputer 48 through the AD converter 47 and I/O 48b and then loaded to CPU 48a with the sensor coordinate values $h_1, h_2, l_1, l_2, d_1$ and $d_2$. Then, the procedure programmed for performing arithmetic operation for the equation (11) is initiated for deriving linear accelerations $(g_{s1}, g_{s2}, g_{s3})$ (step 111). At the condition where the vehicle is resting, both of the angular accelerations and angular velocities are held at zero, the linear accelerations $(g_{s1}, g_{s2}, g_{s3})$ derived at the step 111 become the linear accelerations $(g_{Gx}, g_{Gy}, g_{Gz})$ at the gravity center. At this time, according to the calculation program based on Euler's angular conversion of the equation (17), the initial values of the Euler angles $\theta, \phi$ and $\psi$ are determined to establish a value $(0, 0, g)$ in the reference coordinate system XYZ. The initial values of the Euler angles are stored in RAM 48d (step 112).

Then, once the vehicle starts to run, the acceleration sensors 21 to 26 detect accelerations exerted on the vehicle. The signal amplifiers 41 to 46 then are responsive to the outputs of the acceleration sensors 21 to 26 to output voltages $\alpha_1$ to $\alpha_6$. These outputs are input to the microcomputer 48 through the AD converter 47 and the I/O 48b and then loaded on the CPU 48a together with the sensor coordinate values $h_1, h_2, l_1, l_2, d_1$ and $d_2$ stored in the ROM 48c. In response to this, the calculation program based on the foregoing equations (11) and (12) is executed to derive the linear accelerations $(A_{s1}, A_{s2}, A_{s3})$ and angular accelerations $(A\omega_{s1}, A\omega_{s2}, A\omega_{s3})$. The results of such calculation are stored in a selected area in the RAM 48d (step 113). Thereafter, the duration At of the first calculation cycle is loaded (stored in the ROM 48c or, in the alternative, is measured by an internal timer of the microcomputer to perform the digital calculation expressed by the following equations (step 114):

$$\omega_{s1} = \Omega_{s1} + A\omega_{s1} \cdot \Delta t$$

$$\omega_{s2} = \Omega_{s2} + A\omega_{s2} \cdot \Delta t$$

$$\omega_{s3} = \Omega_{s3} + A\omega_{s3} \cdot \Delta t \qquad (25)$$

wherein $(\omega_{s1}, \omega_{s2}, \omega_{s3})$ are angular velocities to be derived, $(\Omega_{s1}, \Omega_{s2}, \Omega_{s3})$ are angular velocities derived at one preceding calculation cycle, and $(A\omega_{s1}, A\omega_{s2}, A\omega_{s3})$ are angular accelerations in the current calculation cycle. As the initial values for these quantities, zeros are set. The angular velocity data derived in the current cycle is stored in a selected area in the RAM 48d (step 113) so that it may be loaded in the CPU 48a upon calculation of the equations (25) together with the angular accelerations $(A\omega_{s1}, A\omega_{s2}, A\omega_{s3})$.

Next, from the ROM 48c, the coordinate data $x_s$, $y_s$ and $z_s$ related to the gravity center G and the sensor position S are accessed. Also, from the RAM 48d, the linear accelerations $(A_{s1}, A_{s2}, A_{s3})$ and the angular accelerations $(A\omega_{s1}, A\omega_{s2}, A\omega_{s3})$ obtained through the steps 113 and 114 are loaded to execute the calculation program according to the equation (16) to derive the linear accelerations $(A_{Gx}, A_{Gy}, A_{Gz})$ at the gravity center. The resultant linear accelerations are stored in the selected area in the RAM 48d (step 115). Similarly to the step 114, the duration At of the calculation cycle is loaded to execute the following calculations:

$$V_{Gx} = FV_{Gx} + A_{Gx} \Delta t$$

$$V_{Gy} = FV_{Gy} + A_{Gy} \Delta t$$

$$V_{Gz} = FV_{Gz} + A_{Gz} \Delta t \qquad (26)$$

wherein $(V_{Gx}, V_{Gy}, V_{Gz})$ are linear velocities to be obtained, $(FV_{Gx}, FV_{Gy}, FV_{Gz})$ are the linear accelerations derived at one preceding calculation cycle, and $(A_{Gx}, A_{Gy}, A_{Gz})$ are linear accelerations at the current calculation cycle. The initial values of these are set zero. The linear velocity data derived in the subsequent calculation cycles are stored in the selected area of RAM 48d and updated every cycle (step 116).

Next, the Euler angles $\theta, \phi$ and $\psi$ as initially set at the step 112 and the angular velocities $(\omega_{s1}, \omega_{s2}, \omega_{s3})$ derived through the step 114 are loaded to execute a calculation program according to the equation (19) to derive the Euler angles $\theta, \phi$ and $\psi$ and the angular velocity. Equations to be used are differentiated depending upon $\theta = 0$ or $\theta \neq 0$. Particularly, when $\theta = 0$, since the intersection line ON of the XY plane of the coordinate system XYZ and the $X_1Y_1$ plane of the coordinate system $X_1Y_1Z_l$ is not established, $\phi$ and $\psi$ cannot be defined. The procedure of calculation to be used at this time is illustrated in FIG. 10. At first, with reference to the Eular angles $\Theta, \Phi$ and $\Psi$ of the one preceding cycle of the Euler angle $\theta, \phi$ and $\psi$ loaded from the RAM 48d, judgement is made whether $\Theta = 0$ (or can be approximately 0) or $\neq 0$ (step 117a). If $\Theta \neq 0$, the calculation program according to the equation (19a) is executed in terms of $\Theta, \Phi$ and $\Psi$ and the angular velocities $(\omega_{s1}, \omega_{s2}, \omega_{s3})$ to derive the angular velocities of the Euler angles $\theta, \phi, \psi$ (step 117a2), and further to derive the Eular angles $\Theta, \Phi,$ and $\Psi$ through the following equations:

$$\theta = \Theta + \omega\theta \cdot \Delta t$$

$$\phi = \Phi + \omega\phi \cdot \Delta t$$

$$\psi = \Psi + \omega_\psi \cdot \Delta t \quad (27)$$

wherein $\omega_\theta$, $\omega_\phi$, $\omega_\psi$ are angular velocities of the Euler angles, and $\Delta t$ is the calculation cycle duration (117$a_2$).

On the other hand, when $\Theta = 0$, according to the equation (19b) with taking $\phi + \psi = \xi$, the calculation program for deriving $\omega_\theta$ is executed based on the angular velocity $\omega_\xi (= \omega_\phi + \omega_\psi$ and 9 (step 117$a_1$). At this time, in place of the equation (27), the angle 8 and M are derived through the following equations:

$$\theta = \Theta + \omega\theta \cdot \Delta t$$

$$\xi = \Xi + \omega_\xi \cdot \Delta t \quad (28)$$

where $\Xi$ is the value of $\xi$ of the one preceding cycle (step 117$a_1$).

Since the value of $\theta$ varies from time to time, it can become either $=0$ and $\neq 0$. At a certain moment where $\theta$ varies from $\neq 0$ to $=0$, from the Euler angles $\Phi$ and $\Psi$ of the one preceding cycle, $\Xi = \Phi + \Psi$ is established for deriving $\Xi$ through the equation (28) (steps 117$b_2$ to 117$c_2$). Conversely, at a certain moment where e varies from $=0$ to $\neq 0$, an initial setting is made for $\Phi = \Xi$ for $\Psi = 0$ deriving the angular velocities of the Euler angles $\phi$ and $\psi$ through the equation (19a) and $\phi$ and $\psi$ through the equation (27) (steps 117$b_1$ to 117$c_1$). Then, the linear accelerations ($A_{Gx}$, $A_{Gy}$, $A_{Gz}$), the straight velocities ($V_{Gx}$, $V_{Gy}$, $V_{Gz}$), the angular accelerations ($A\omega_{s1}$, $A\omega_{s2}$, $A\omega_{s3}$), and the angular velocities ($\omega_{s1}$, $\omega_{s2}$, $\omega_{s3}$) are loaded from the RAM 48$d$ in order to execute the calculation program according to the following equations:

$$\begin{bmatrix} Y_1 \\ Y_2 \\ Y_3 \end{bmatrix} = \begin{bmatrix} \Omega_{11} & \Omega_{12} & \Omega_{13} \\ \Omega_{21} & \Omega_{22} & \Omega_{23} \\ \Omega_{31} & \Omega_{32} & \Omega_{33} \end{bmatrix} \begin{bmatrix} X_1 \\ X_2 \\ X_3 \end{bmatrix} \quad (29)$$

wherein ($X_1$, $X_2$, $X_3$) are values of components of respective vectors on the coordinate systems $x_1 x_2 x_3$ and xyz, and ($Y_1$, $Y_2$, $Y_3$) are values converted into the coordinate system XYZ. It should be noted that the coefficients in the matrix should be differentiated as follows depending upon $\theta 320$ or $\theta \neq 0$. (when $\theta \neq 0$; step 117$d_2$)

$\Omega_{11} = \cos\phi\cos\psi - \cos\theta\sin\phi\sin\psi$ $\Omega_{12} = -\cos\phi\sin\psi - \cos\theta\sin\psi\cos\phi$ $\Omega_{13} = \sin\theta\sin\psi$ $\Omega_{21} = \sin\phi\cos\psi + \cos\theta\cos\phi\sin\psi$ $\Omega_{22} = -\sin\phi\sin\psi + \cos\theta\cos\phi\cos\psi$ $\Omega_{23} = -\sin\theta\cos\phi$ $\Omega_{31} = \sin\theta\sin\psi$ $\Omega_{32} = -\sin\theta\cos\psi$ $\Omega_{33} = \cos\theta$ ($\theta = 0$:step 117$d_1$)

$\Omega_{11} - \cos\xi$ $\Omega_{12} = -\sin\xi$ $\Omega_{13} = 0$ $\Omega_{21} = \sin\xi$ $\Omega_{22} = \cos\xi$ $\Omega_{23} = 0$ $\Omega_{31} = 0$ $\Omega_{32} = 0$ $\Omega_{33} = 1$ Then, the linear accelerations $A_{Ox}$, $A_{Oy}$, $A_{Oz}$), the linear speeds ($V_{Ox}$, $V_{Oy}$, $V_{Oz}$), the angular accelerations ($A\omega_{01}$, $A\omega_{02}$, $A\omega_{03}$) and angular velocities ($\omega_{01}$, $\omega_{02}$, $\omega_{03}$) at the gravity center with respect to the coordinate system XYZ are derived in order to store in the selected area in the RAM 48$d$.

Next, the microcomputer loads the angular accelerations ($A\omega_{s1}$, $A\omega_{s2}$, $A\omega_{s3}$) and the angular velocities ($\omega_{s1}$, $\omega_{s2}$, $\omega_{s3}$) from the RAM 48$d$ in order, and further loads the inertia moments $I_{xx}$, $I_{yy}$, $I_{zz}$ and products of inertia $I_{xy}(=I_{yx})$, $I_{yz}(=I_{zy})$ and $I_{zx}(=I_{xz})$ from the ROM 48$c$ to execute a calculation program according to the first equation of the equations (21) to derive the torque $N_{Gx}$ acting about the x axis and to store the resultant value to a selected area in RAM 48$d$. Similarly, with respect to the torque, $N_{Gy}$ acting about the y axis is derived through the second equation in the equations (21), and the torque $N_{Gz}$ acting about the z axis is derived through the third equation in the equations (21). Respective values of the results of these calculations are stored in selected areas in the RAM 48$d$. On the other hand, the microcomputer 48 loads the linear accelerations ($A_{Gx}$, $A_{Gy}$, $A_{Gy}$) at the gravity center from the RAM 48$d$ and the mass weight M of the vehicle from the ROM 48$c$ to derive the forces ($F_{Gx}$, $F_{Gy}$, and $F_{Gz}$) acting along respective directions of the axes by multiplying respective linear accelerations with the mass weight to store the selected areas of the RAM 48$d$ (step 119).

Further, by repeating the calculation procedure at the step 117, the torques ($N_{Ox}$, $N_{Oy}$, $N_{Oz}$) and the forces ($F_{Ox}$, $F_{Oy}$, $F_{Oz}$) with respect to the coordinate system XYZ can be obtained. The resultant values of these calculations are stored in selected areas. Then, one calculation cycle is terminated to return to the step 111 (step 120).

The calculation process from the step 111 to the step 120 is performed by the microcomputer with one calculation cycle (duration $\Delta t$). Here, it is not necessary to perform the calculation processes of the steps 111 to the step 120 in order, but they can be carried out in parallel, if parallel processing is allowed, by providing a plurality of processors.

Figure 16:
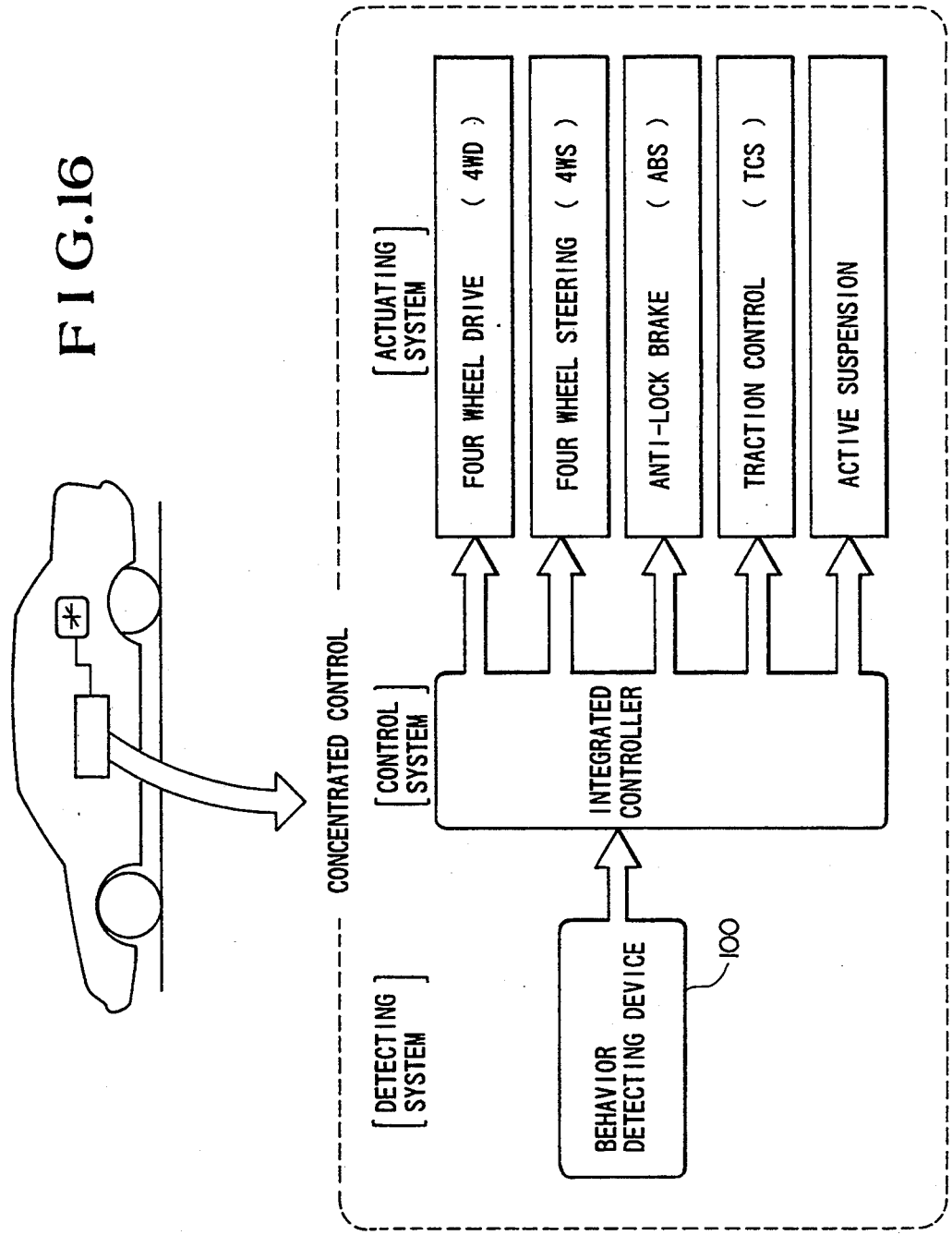
FIG. 16 is a schematic block diagram briefly showing overall construction of a control system (concentrated control) for the automotive vehicle.
Figure 17:
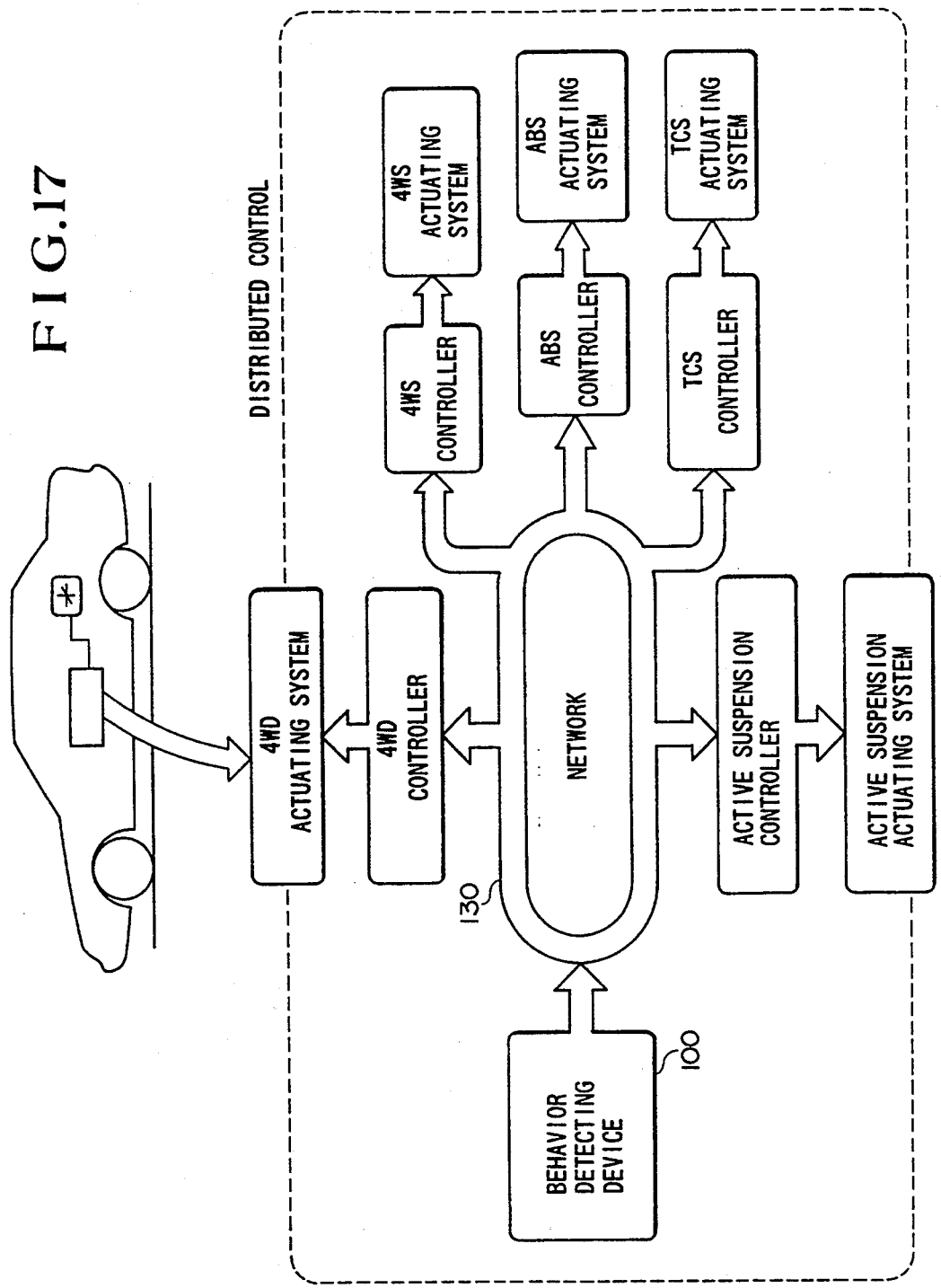
FIG. 17 is a schematic block diagram briefly showing overall construction of the control system (independent distributed control) for the automotive vehicle.

Next, FIG. 16 is a conceptual illustration of the overall construction of a vehicle control system. The shown construction includes the behavior detecting system 100 as a subsystem forming part of the control system. Namely, data at a certain timing, derived through the calculation process of FIG. 10 and stored in the RAM 48$d$, such as, angular accelerations: ($A\omega_{s1}$, $A\omega_{s2}$, $A\omega_{s3}$), ($A\omega_{01}$, $A\omega_{02}$, $A\omega_{03}$)

angular velocities: ($\omega_{s1}$, $\omega_{s2}$, $\omega_{s3}$), ($\omega_{01}$, $\omega_{02}$, $\omega_{03}$)

linear accelerations: $(A_{s1}, A_{s2}, A_{s3})$, $(A_{Gx}, A_{Gy}, A_{Gz})$ $(A_{Ox}, A_{Oy}, A_{Oz})$ linear velocities: $(V_{Gx}, V_{Gy}, V_{Gz})$ $(V_{Ox}, V_{Oy}, V_{Oz})$ torques: $(N_{Gx}, N_{Gy}, N_{Gz})$ $(N_{Ox}, N_{Oy}, N_{Oz})$ forces: $(F_{Gx}, F_{Gy}, F_{Gz})$ $(F_{Ox}, F_{Oy}, F_{Oz})$ are read as required by the upper level control system as control parameters.

FIG. 16 is illustrated as an embodiment including a single total control system for concentrically performing control operations. However, the control system can be established as an independent distributed type control system, in which a plurality of control systems established independently for mutually distinct control operations are provided. In such case, data obtained through the vehicular behavior detecting system 100 may be supplied to a network system 130 established on the vehicle. Each control system obtains control necessary to control parameters on the network system 130 in an asynchronous fashion and independently of one another.

Figure 18:
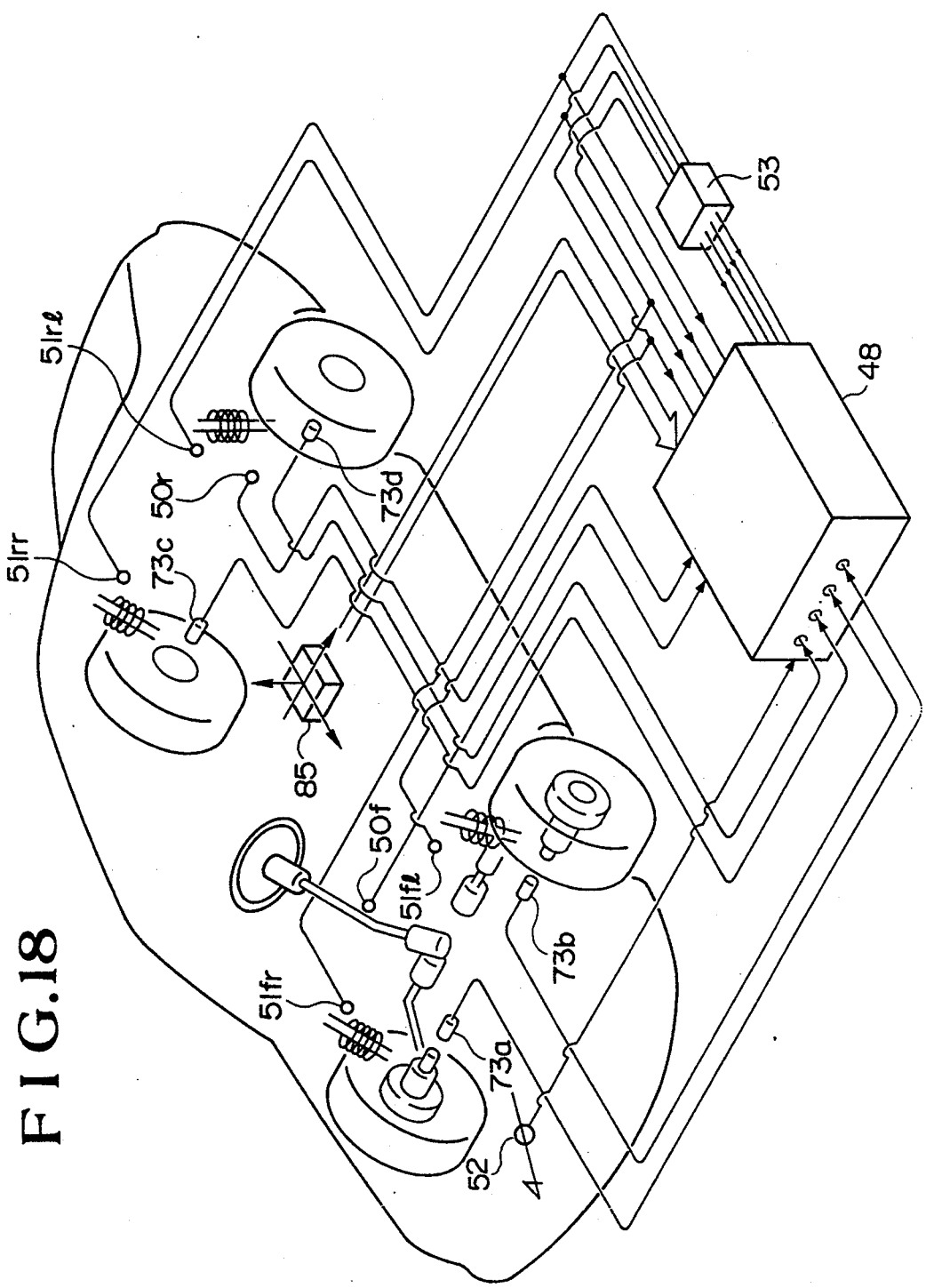
FIG. 18 is a schematic and explanatory illustration showing overall control system when various sensors are used.

The method of prediction of the vehicular behavior as set forth above solely employs acceleration sensors as the sensor. In contrast, FIG. 18 shows an embodiment employing wheel speed sensors 73a, 73b, 73c, 73d for detecting rotational speeds of respective road wheels, steering angle sensors 50f, 50r for detecting actual steering angle at the front and rear wheels (50r is provided only for a vehicle having four wheel steering system), vehicular height sensors 51fr, 51fl, 51rr, 51rl for detecting suspension strokes at respective road wheels, a bearing or magnetic declination sensor 52 for detecting the vehicular traveling direction by detecting earth or terrestrial magnetism, in addition to the 6 freedom motion sensor 85. The reference numeral 53 denotes a differentiation circuit. Respective ones of these sensors have been known and employed in conventional vehicle control systems, navigation systems and so forth. Therefore, the discussion for the constructions thereof and the principles of their operations will be neglected. However, employing such a variety of sensors in the measurement of vehicular behavior, control parameters important for performing vehicular control can be predicted.

FIG. 20 illustrates a process for predicting lateral slip angles $\beta_G, \beta_{fl}, \beta_{fr}, \beta_{rl}, \beta_{rr}$ of the gravity center G and respective road wheels (which will be hereafter distinguished by applying a suffix of fl for front left wheel, fr for front right wheel, rl for rear left wheel and rr for rear right wheel) employing the six freedom motion sensor 85, the steering angle sensors 50f and 50r, and the vehicle height sensors 51fr, 51fl, 51rr, 51rl. The lateral slip angle $\beta$ typically will affect the vehicular steering characteristics and can be derived based on the speed $V_{ad}$ along the traveling direction or longitudinal direction and the lateral speed $V_{tr}$ from the following equation:

$$\beta = \tan^{-1}\left(\frac{V_{tr}}{V_{ad}}\right) \quad (30)$$

At first, the lateral slip angle $\beta_G$ at the gravity center G can be derived through a calculation program according to the equation (30) setting $V_{ad}=V_{Gx}$ and $V_{tr}=V_{Gy}$ employing $V_{Gx}$ and $V_{Gy}$ derived through the step 116 of the process of FIGS. 11 to 15, or $V_{ad}=V_{Ox}$ and $V_{tr}=V_{Oy}$ employing $V_{Ox}$ and $V_{Oy}$ derived through the step 117, when the x axis of the coordinate system xyz is oriented in a direction coincident with the traveling direction of the vehicle. Then, for deriving the lateral slip angles at respective wheels, it becomes necessary to derive the linear speed at respective wheels. For this purpose, the following vector calculation is to be considered.

Assuming that the position vector from the gravity center G to the rotational center of one wheel is $r_T$, the linear speed vector $V_T$ of the wheel at the angular velocity vector $\omega_s$ of the entire body of the vehicle can be expressed by the following equation:

$$V_T = V_G + \omega_G \times r_T + V_h \quad (31)$$

wherein $V_h$ is relative speed vector when the unsprung mass including the wheel moves relative to the vehicle body (sprung mass - rigid body) through the suspension system. Here, as shown in FIG. 19, assuming that the motion of the suspension is strictly limited to the vertical direction (z axis direction), the influence of displacement of the suspension for the vector $r_T$ becomes only the z axis component, and the vector $V_T$ should have only the z axis component. At this time, the position vectors and the speed vectors for respective ones of the four wheels can be assumed as follows:

(front left wheel)

$$r_{Tfl} = (x_{Tfl}, y_{Tfl}, z_{Tfl} - h_{fl})$$

$$V_{Tfl} = (V_{xTfl}, V_{yTfl}, V_{zTfl} - (dh_{fl}/dt))$$

(front right wheel)

$$r_{Tfr} = (x_{Tfr}, y_{Tfr}, z_{Tfr} - h_{fr})$$

$$V_{Tfr} = (V_{xTfr}, V_{yTfr}, V_{zTfr} - (dh_{fr}/dt))$$

(rear left wheel)

$$r_{Trl} = (x_{Trl}, y_{Trl}, z_{Trl} - h_{rl})$$

$$V_{Trl} = (V_{xTrl}, V_{yTrl}, V_{zTrl} - (dh_{rl}/dt))$$

(rear right wheel)

$$r_{Trr} = (x_{Trr}, y_{Trr}, z_{Trr} - h_{rr})$$

$$V_{Trr} = (V_{xTrr}, V_{yTrr}, V_{zTrr} - (dh_{rr}/dt))$$

wherein $h_{fl}, h_{fr}, h_{rl}$ and $h_{rr}$ are displacement in suspension stroke at respective of front left, front right, rear left and rear right wheels, and $(dh_{fl}/dt)$, $(dh_{fr}/dt)$, $(dh_{rl}/dt)$, $(dh_{rr}/dt)$ are differentiated values (speed) thereof. Replacing these in the foregoing equation (31), the following group of equations can be obtained for deriving each component of the linear speed vectors $V_{Tfl}, V_{Tfr}, V_{Trl}, V_{Trr}$.

(front left wheel)

$$V_{Tfl} = (V_{Txfl}, V_{Tyfl}, V_{Tzfl})$$

$$V_{Txfl} = V_{Gx} + [\omega_{s2}(z_{Tfl} - h_{fl}) - \omega_{s3}y_{Tfl}]$$

$$V_{Tyfl} = V_{Gy} + [\omega_{s3}x_{Tfl} - \omega_{s1}(z_{Tfl} - h_{fl})]$$

$$V_{Tzfl} = V_{Gz} + [\omega_{s1}y_{Tfl} - \omega_{s2}x_{Tfl}] - (dh_{fl}/dt)$$

(front right wheel)

$$V_{Tfr} = (V_{Txfr}, V_{Tyfr}, V_{Tzfr})$$

$$V_{Txfr} = V_{Gx} + [\omega_{s2}(z_{Tfr} - h_{fr}) - \omega_{s3}y_{Tfr}]$$

$$V_{Tyfr} = V_{Gy} + [\omega_{s3}x_{Tfr} - \omega_{s1}(z_{Tfr} - h_{fr})]$$

$$V_{Tzfr} = V_{Gz} + [\omega_{s1}y_{Tfr} - \omega_{s2}x_{Tfr}] - (dh_{fr}/dt)$$

(rear left wheel)

$$V_{Trl} = (V_{Txrl}, V_{Tyrl}, V_{Tzrl})$$

$$V_{Txrl} = V_{Gx} + [\omega_{s2}(z_{Trl} - h_{rl}) - \omega_{s3}y_{Trl}]$$

$$V_{Tyrl} = V_{Gy} + [\omega_{s3}x_{Trl} - \omega_{s1}(z_{Trl} - h_{rl})]$$

$$V_{Tzrl} = V_{Gz} + [\omega_{s1}y_{Trl} - \omega_{s2}x_{Trl}] - (dh_{rl}/dt)$$

(rear right wheel)

$$V_{Trr} = (V_{Txrr}, V_{Tyrr}, V_{Tzrr})$$

$$V_{Txrr} = V_{Gx} + [\omega_{s2}(z_{Trr} - h_{rr}) - \omega_{s3}y_{Trr}]$$

$$V_{Tyrr} = V_{Gy} + [\omega_{s3}x_{Trr} - \omega_{s1}(z_{Trr} - h_{rr})]$$

$$V_{Tzrr} = V_{Gz} + [\omega_{s1}y_{Trr} - \omega_{s2}x_{Trr}] - (dh_{rr}/dt)$$

Then, if the inclination of the vehicle relative to the road surface is sufficiently small, the lateral slip angle at respective wheels can be expressed by the following equations using the linear speed components in x and y axes direction and the actual steering angles $X_f$ and $X_r$ at the front and rear wheels.

$$\beta_{fl} = \tan^{-1}\left(\frac{V_{Tyfl}}{V_{Txfl}}\right) - \lambda_f \quad (34)$$

$$\beta_{fr} = \tan^{-1}\left(\frac{V_{Tyfr}}{V_{Txfr}}\right) - \lambda_f$$

$$\beta_{rl} = \tan^{-1}\left(\frac{V_{Tyrl}}{V_{Txrl}}\right) - \lambda_r$$

$$\beta_{rr} = \tan^{-1}\left(\frac{V_{Tyrr}}{V_{Txrr}}\right) - \lambda_r$$

wherein, in the case of a vehicle having a two wheel steering system, $\lambda_r$ is always 0.

Returning FIG. 20, the algorithm for predicting lateral slip angles at respective wheels becomes as follows. At first, at a certain timing, the measured values of the six freedom motion sensor 85, the steering angle sensors 50f and 50r, and the vehicle speed sensors 51fr, 51fl, 51rr, 51rl are converted into digital signals through the AD converter 47 (FIG. 10) and input to the microcomputer through I/O 48b and are temporarily stored in the buffer 61 (step 201). Here, the outputs $h_{fl}$, $h_{fr}$, $h_{rl}$ and $h_{rr}$ are supplied to a differentiation circuit 60 of an analog circuit construction to generate outputs proportional to the differentiated values $(dh_{fl}/dt)$, $(dh_{fr}/dt)$, $(dh_{rl}/dt)$, $(dh_{rr}/dt)$. These outputs of the differentiation circuit 60 are also input to the microcomputer after digital conversion. Then, the measured value of the six freedom motion sensor 85 is read out from the buffer 61. Then, a similar procedure to the calculations of FIGS. 11 to 15 is performed for deriving the linear speeds $(V_{Gx}, V_{Gy}, V_{Gz})$, and the angular velocities $(\omega_{s1}, \omega_{s2}, \omega_{s3})$ at the gravity center of the vehicle are derived (step 202).

Then, the microcomputer 48 loads the preliminarily stored coordinate values $(x_{Tfl}, y_{Tfl}, z_{Tfl})$, $(x_{Tfr}, y_{Tfr}, z_{Tfr})$, $(x_{Trl}, y_{Trl}, z_{Trl})$, $(x_{Trr}, y_{Trr}, z_{Trr})$ from the ROM 48c, the measured values of the vehicle height sensors 51fr, 51fl, 51rr, 51rl, the differentiated values $h_{fl}$, $h_{fr}$, $h_{rl}$, $h_{rr}$ and $(dh_{fl}/dt)$, $(dh_{fr}/dt)$, $(dh_{rl}/dt)$, $(dh_{rr}/dt)$ from the buffer 61, and further loads the linear speeds $(V_{Gx}, V_{Gy}, V_{Gz})$ and the angular velocities $(\omega_{s1}, \omega_{s2}, \omega_{s3})$ from the RAM 48d in order, to execute a calculation program according to the equation (33) for deriving the linear speed values $(V_{Txfl}, V_{Tyfl}, V_{Tzfl})$, $(V_{Txfr}, V_{Tyfr}, V_{Tyfr})$, $(V_{Txrl}, V_{Tyrl}, V_{Tzrl})$, $(V_{Txrr}, V_{Tyrr}, V_{Tzrr})$. The results of these calculations are stored in a selected area of the RAM 48d (step 203). Finally, the measured values $\lambda_f$ and $\lambda_r$ are loaded from the buffer 61 and the results of calculation at the step 202 are loaded from the RAM 48d to the CPU 48a for execution of the calculation program according to the equations (34) to derive the lateral slip angles $\beta_{fl}$, $\beta_{fr}$, $\beta_{rl}$, $\beta_{rr}$ and then to store in the selected area in the RAM 48d. Thereafter, one cycle of calculation is terminated.

Figure 21:
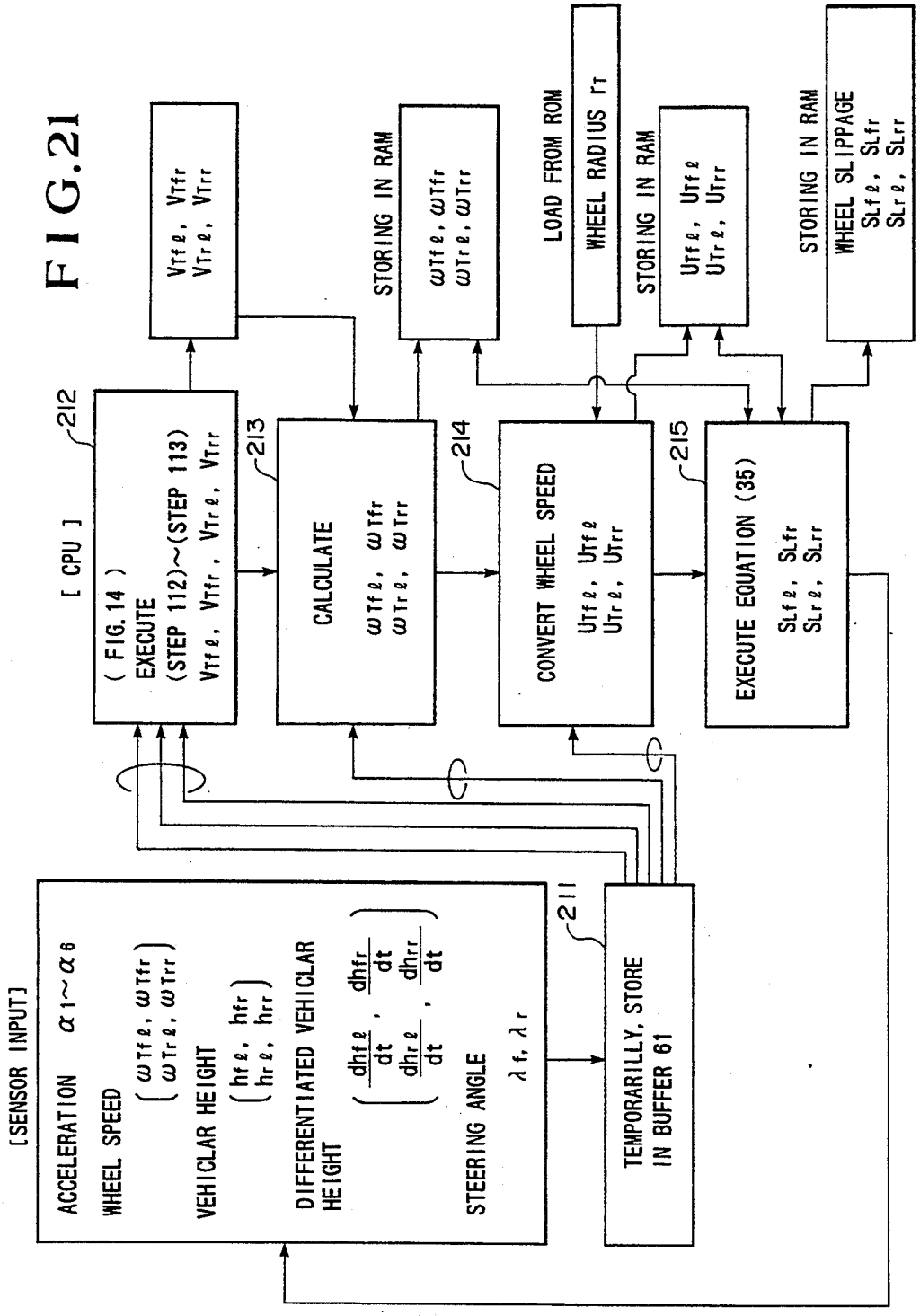
FIG. 21 is an illustration showing process for predicting wheel slippage.

FIG. 21 illustrates the process for predicting the wheel slippage at each wheel from time to time employing the wheel speed sensors 73a, 73b, 73c and 73d in addition to the six freedom motion sensor 85, the steering angle sensor 50f and 50r and the vehicle height sensors 51fr, 51fl, 51rr and 51rl. In general, the wheel slippage is given as a ratio of the linear speed of the wheel in the traveling direction and the linear speed of the vehicle body as derived through $U_T = r_T \omega_T$, assuming that the radius of the wheel is $r_T$ and the rotation speed is $\omega_T$. Similarly to the foregoing, each wheel is distinguished by a suffix. The wheel slippage values $S_{Lfl}$, $S_{Lfr}$, $S_{Lrl}$ and $S_{Lrr}$ are thus derived from $U_{Tfl}$, $U_{Tfr}$, $U_{Trl}$ and $U_{Trr}$ respectively derived from the wheel speeds as the linear speeds in the wheel traveling directions, and the actual vehicle body linear speeds $V_{Tfl}$, $V_{Tfr}$, $V_{Trl}$ and $V_{Trr}$, and can be expressed by the following equations:

$$S_{Lfl} = 1 - (U_{Tfl}/V_{Tfl})$$

$$S_{Lfr} = 1 - (U_{Tfr}/V_{Tfr})$$

$$S_{Lrl} = 1 - (U_{Trl}/V_{Trl})$$

$$S_{Lrr} = 1 - (U_{Trr}/V_{Trr}) \quad (35)$$

Here, the actual vehicle body linear speeds $V_{Tfl}$, $V_{Tfr}$, $V_{Trl}$ and $V_{Trr}$ can be expressed from the xy components of the values $(V_{Txfl}, V_{Tyfl}, V_{Tzfl})$, $(V_{Txfr}, V_{Tyfr}, V_{Tzfr})$, $(V_{Txrl}, V_{Tyrl}, V_{Tzrl})$, $(V_{Txrr}, V_{Tyrr}, V_{Tzrr})$ derived through the equation (33) and the actual steering angles $\lambda_f$ and $\lambda_r$ of the front and rear wheels by the following equations:

$$V_{Tfl} = V_{Txfl}\cos\lambda_f + V_{Tyfl}\sin\lambda_f$$

$$V_{Tfr} = V_{Txfr}\cos\lambda_f + V_{Tyfr}\sin\lambda_f$$

$$V_{Trl} = V_{Txrl}\cos\lambda_r + V_{Tyrl}\sin\lambda_r$$

$$V_{Trr} = V_{Txrr}\cos\lambda_r + V_{Tyrr}\sin\lambda_r \quad (36)$$

Returning to FIG. 20, the algorithm for predicting the wheel slippage at each wheel is as follows. At first, the measured values of the above-mentioned sensors including the six freedom motion sensor 85 are converted into digital signals through the AD converter 47 and input to I/O 48b of the microcomputer for temporary storage in the buffer 61 (step 211). Then, in a similar procedure to the steps 112 and 113 of FIG. 14, based on the measured values of the six freedom motion sensor 85, the linear speeds ($V_{Txfl}$, $V_{Tyfl}$, $V_{Tzfl}$), ($V_{Txfr}$, $V_{Tyfr}$, $V_{Tzfr}$), ($V_{Txrl}$, $V_{Tyrl}$, $V_{Tzrl}$), ($V_{Txrr}$, $V_{Tyrr}$, $V_{Tzrr}$) of respective wheels are derived (steps 212 and 213). Then, using the actual steering angles $\lambda_f$ and $\lambda_r$ of the front and rear wheels from the steering angle sensors 50f and 50r, the calculation program according to the equation (36) is executed for deriving the linear speeds $V_{Tfl}$, $V_{Tfr}$, $V_{Trl}$ and $V_{Trr}$ and for storing them in the RAM 48d (step 214). Finally, obtaining the measured values $\omega_{Tfl}$, $\omega_{Tfr}$, $\omega_{Trl}$ and $\omega_{Trr}$ of the wheel speed sensors 73a, 73b, 73c and 73d from the buffer 61, and loading the data of the radius $r_T$ of the wheel from the RAM 48d, the linear speed converted values $U_{Tfl}$, $U_{Tfr}$, $U_{Trl}$ and $U_{Trr}$ of the wheel speed are calculated by multiplying those values. Thereafter, the linear speeds $V_{Tfl}$, $V_{Tfr}$, $V_{Trl}$ and $V_{Trr}$ are again loaded for executing the calculation program according to the equation (35) to derive the wheel slippage values $S_{Lfl}$, $S_{Lfr}$, $S_{Lrl}$ and $S_{Lrr}$ and to store the resultant values in the RAM 48d. Thereafter, one calculation cycle is terminated (step 215).

Figure 22:
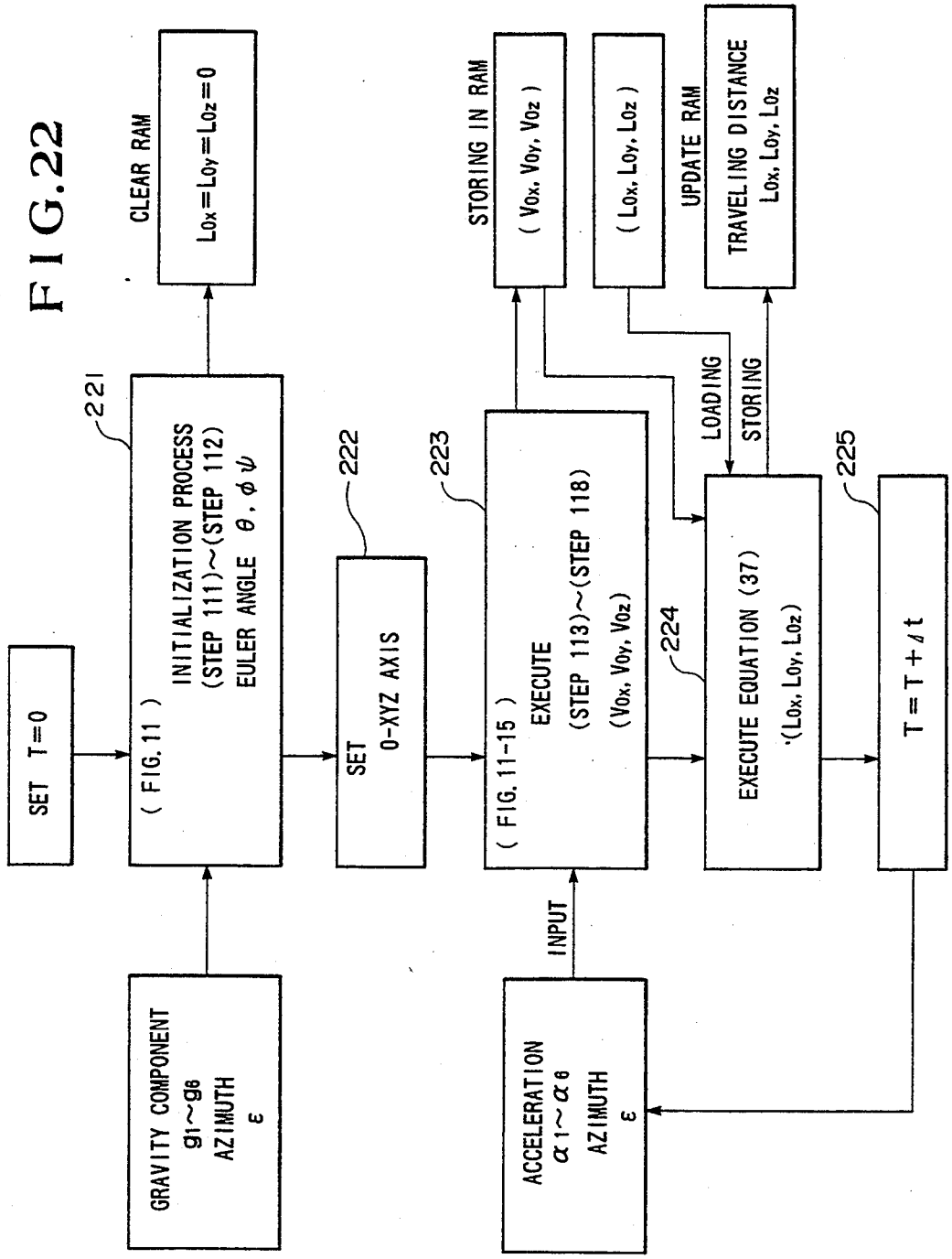
FIG. 22 is an illustration showing process for predicting traveling direction and distance from a set timing.

FIG. 22 illustrates a process for predicting the distance and direction that the vehicle has traveled, using the six freedom motion sensor 85 and the bearing sensor 52. According to the algorithm shown in FIGS. 11 to 15, the linear speeds ($V_{Ox}$, $V_{Oy}$ and $V_{Oz}$) on the reference coordinate system XYZ can be derived on the basis of the measured values of the six freedom motion sensor 85. Similarly to the process set out above, taking the duration of one calculation cycle of the microcomputer to be $\Delta t$, the traveled distances ($L_{Ox}$, $L_{Oy}$, $L_{Oz}$) can be derived by again integrating the linear speeds ($V_{Ox}$, $V_{Oy}$, $V_{Oz}$) from the initially set time T=0, as expressed by the following equations:

$$L_{Ox} = FL_{Ox} + V_{Ox}\Delta t$$

$$L_{Oy} = FL_{Oy} + V_{Oy}\Delta t$$

$$L_{Oz} = FL_{Oz} + V_{Oz}\Delta t \qquad (37)$$

wherein ($FL_{Ox}$, $FL_{Oy}$, $FL_{Oz}$) are values of the traveled distances calculated at one preceding calculation cycle, which values are initially set at 0 at T=0. Here, for example, if the z axis of the reference coordinate system XYZ is set to be oriented along the direction of the gravity of the earth, and the bearing of the terrestrial magnetic pole as detected by the bearing sensor 52 is present on the ZX plane, the traveled distance in any direction and variation of altitude from the set time to a desired time can be calculated from time to time.

The present invention has been discussed in detail hereabove. Though the present invention is intended to predict the behavior of the vehicle, the invention should not be limited to the algorithm of a behavior prediction using the measured values of the acceleration sensors. Also, the present invention may be applicable for any moving body, such as a ship, train, aircraft and so forth.

As set forth above, according to the preferred embodiment of the invention, using at least two acceleration sensors for each axis direction, and thus six acceleration sensors in total on the vehicle acting as a moving body, accelerations in the longitudinal, lateral and vertical directions of the vehicle can be determined. The microcomputer is then enabled to arithmetically determine the vehicular behavior, i.e. linear speeds (longitudinal, lateral and vertical motions), the angular acceleration about randomly set coordinate axes, and angular velocity (rolling, pitching and yawing) with the modeling equations established as internal software processes of the microcomputer. Furthermore, by additionally providing the wheel speed sensors, the vehicle height sensors, the steering angle sensors, and the bearing sensor, the important parameters for vehicular behavior, such as the lateral slip angle, the wheel slippage and so forth, can be predicted in real time. Accordingly, using a behavior detecting system including internal software implementing a behavior predicting method according to the invention as subsystem and combining the subsystem with the upper level active control system, such as an antilock brake, traction control, four wheel drive control, four wheel steering control, active suspension control and so forth, as a part of such control systems, a more accurate vehicle control system can be constructed.

Similarly, by utilizing the bearing sensor to establish a system which is capable of measuring vehicular traveling distance and/or altitude variation and connecting with an upper level system, such as a navigation system, traffic information communication system and so forth, it will become possible to establish a high level drive assist system which can perform routing of the vehicle.

Next, an embodiment of a vehicular behavior control system which achieves the third object of the present invention will be discussed. The shown embodiment of the control system is responsive to a vehicular condition beyond the normal drive control criteria, such as spinning, drifting, and under steering, to perform control equivalent to the well trained drivers according to a standard model response so that the vehicular condition can be restored within the criteria.

Figure 23:
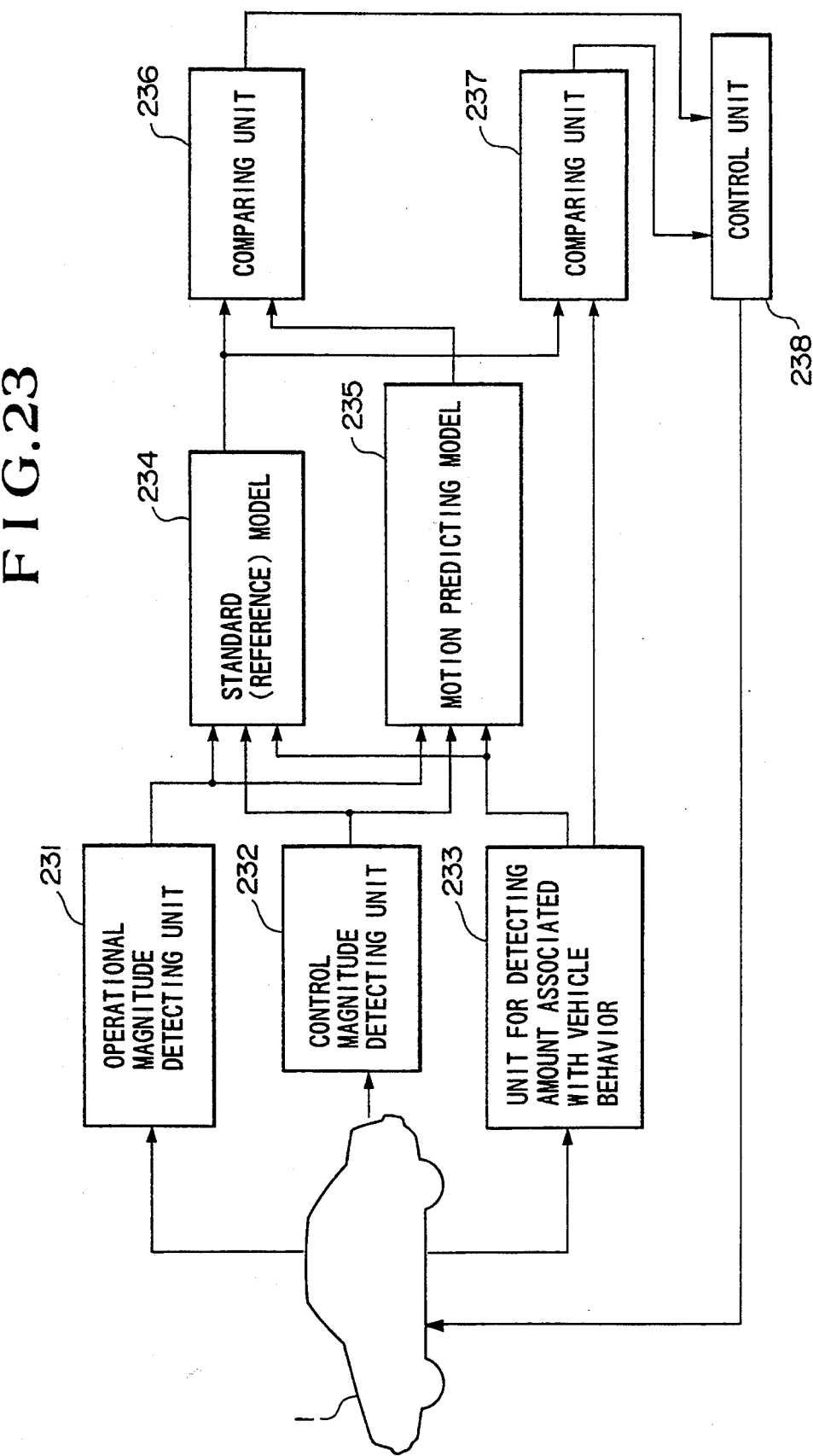
FIG. 23 is a block diagram of an embodiment of a vehicular behavior control system utilizing a reference model.

FIG. 23 is a block diagram of the embodiment of the automotive behavior control system according to the invention. In FIG. 23, the reference numeral 231 denotes a device for detecting operational magnitude for controlling the steering system, the engine, the power train and the suspension system of the automotive vehicle 1. 232 denotes a device for detecting a control magnitude of a driving device (actuator) for controlling the steering system, the engine, the power train and the suspension system of the automotive vehicle 1. 233 denotes a device for detecting amounts associated with respective directions in the three dimensional space of the automotive vehicle. 234 denotes a standard model established on a standard vehicle having reference response characteristics. 235 denotes a vehicular behavior prediction model which is established by modeling response characteristics of the actual vehicle to be controlled. 236 denotes a comparing device for comparing the value of the amount associated with the vehicular behavior predicted using the standard model 234, and the value of the predicted amount using the vehicular behavior predicting model to detect a difference of the predicted values. 237 is a comparing device for comparing the output of the device 233 for detecting the amount associated with the vehicular behavior and the predicted value of the standard model 234 for detecting the difference therebetween. 238 denotes a control unit which receives the results of comparison in the comparing devices 236 and 237 and is responsive to the difference between the predicted value of the standard model 234 and the predicted value of the behavior predicting model 237 to make a judgement that the driving condition beyond the normal drive control criteria to adjust the control magnitude of the driving device for reducing the difference between the predicted value of the standard model and the detected value representative of the amount associated with the actual vehicular behavior.

The standard model 234 and the behavior predicting model 235 both receives the detected operational magnitude, the control magnitude and the amount associated with the vehicular behavior as inputs. The standard model 234 is a kind of simulated model of the vehicle having operational characteristics and response characteristics for a particular control of well trained drivers. The standard model 234 is preliminarily stored in the memory. The standard model is not necessarily limited to a single model but can be plural so that the driver may select a desired one. The behavior predicting model 235 is also a simulated model established by preliminarily measuring the response characteristics for control of the vehicle to be actually controlled. The behavior predicting model 235 is also stored in the memory.

The device for detecting the operational magnitude may detect the steering angle of a steering wheel, a brake pressure, a throttle valve open angle of the engine, or a shift position of the power transmission.

The driving device may include a steering angle control device 81, a hydraulic brake pressure control device 83, a throttle open angle control device 82, a transmission control device 84, a differential gear control device and so forth.

The device 233 for detecting the amount associated with the vehicular behavior includes the 6 freedom motion sensor 85 and is capable of detecting the variation rate of the vehicular longitudinal acceleration, the vehicular longitudinal acceleration, the vehicular longitudinal speed, the variation rate of the lateral acceleration of the vehicle, the lateral acceleration, the lateral speed, the variation rate of the vertical acceleration of the vehicle, the vertical acceleration of the vehicle, the vertical speed of the vehicle, the variation rate of the rolling angular acceleration, the rolling angular acceleration of the vehicle, the rolling speed of the vehicle, the rolling angle of the vehicle, the variation rate of the pitching angular acceleration, the pitching angular acceleration of the vehicle, the pitching angular speed of the vehicle, the pitching angle of the vehicle, the variation rate of the yawing angular acceleration, the yawing angular acceleration of the vehicle, the yawing angular speed of the vehicle, the yawing angle of the vehicle and so forth.

The embodiment of the present invention which is applicable a the vehicle having two wheel steering for two front steerable wheels, a front engine and rear wheel drive power train layout, and an automatic transmission, will be discussed herebelow. Since the basic construction is similar to that of FIG. 2, only the portions not illustrated in FIG. 2 will be discussed herebelow.

Figure 24:
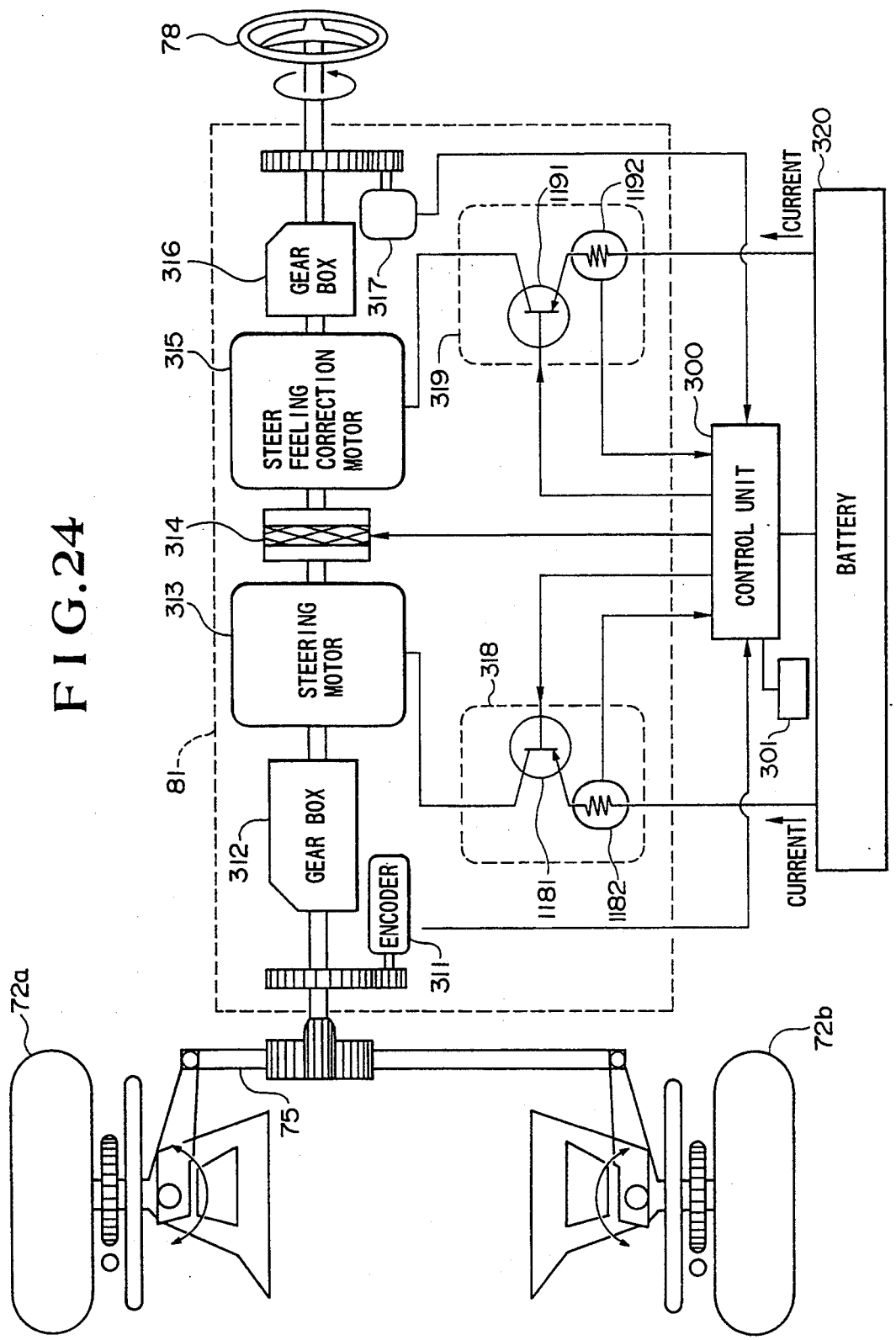
FIG. 24 is an illustration showing construction of the steering angle control section.

FIG. 24 shows the construction of the steering angle control section 81. The steering angle control section 81 comprises an actual steering angle encoder 311 for detecting actual steering angle, a gear box 312 for reducing the revolution of a steering motor, a multi-plate wet clutch 314, a gear box for reducing the revolution of a steering feel correction motor 315, a steering operational angle encoder 317 for detecting the operated steering angle by the driver, an actual steering angle control section 318, and a steering feel correcting section 319. The operation of the steering angle control section 81 will be discussed herebelow. When the driver carries out a steering operation through use of steering wheel 78, the operational magnitude of rotation of the steering wheel is detected by the steering operational angle encoder 317 and is input to a control unit 300. The control unit combines the steering operational magnitude with various information to output a steering angle command for the actual steering angle control section 318. The steering motor 313 is a kind of servo motor comprising an electric motor and operates to adjust the detected value of the actual steering angle encoder to the steering angle command of the control unit 300. The steering mechanism 75 comprises a rack-and-pinion type construction for differentiating toe angle of the front steerable wheels through rotation of the steering shaft. The actual steering angle control section 318 includes a power transistor 1181 for controlling current, and an actual steering current detecting sensor 1182. In general, the output torque of the motor (electric motor) is proportional to the input current. Here, by detecting the current input from a battery 320 to the steering motor 313 by the actual steering current detecting sensor 1182, the necessary torque for adjusting the actual steering angle coincident with the steering command, namely the reaction force on the road surface, can be detected. The control unit 300 feeds back the steering feel for the driver through the steering wheel 78 by means of the steering wheel correcting section 319, the steering wheel correction motor 315 depending upon the detected reaction force from the road surface. On the other hand, the steering angle control section 81 includes the multi-plate wet clutch 314. The clutch is responsive to failure of the respective motors for engagement to directly connect the steering shaft to the steering mechanism 75 so as to permit manual operation of the steering mechanism directly through the steering wheel 78. In view of this, the gear ratios of the gear boxes 312 and 316 are to be selected so as to allow the driver to manually perform a steering operation without requiring substantial operational force.

Figure 25:
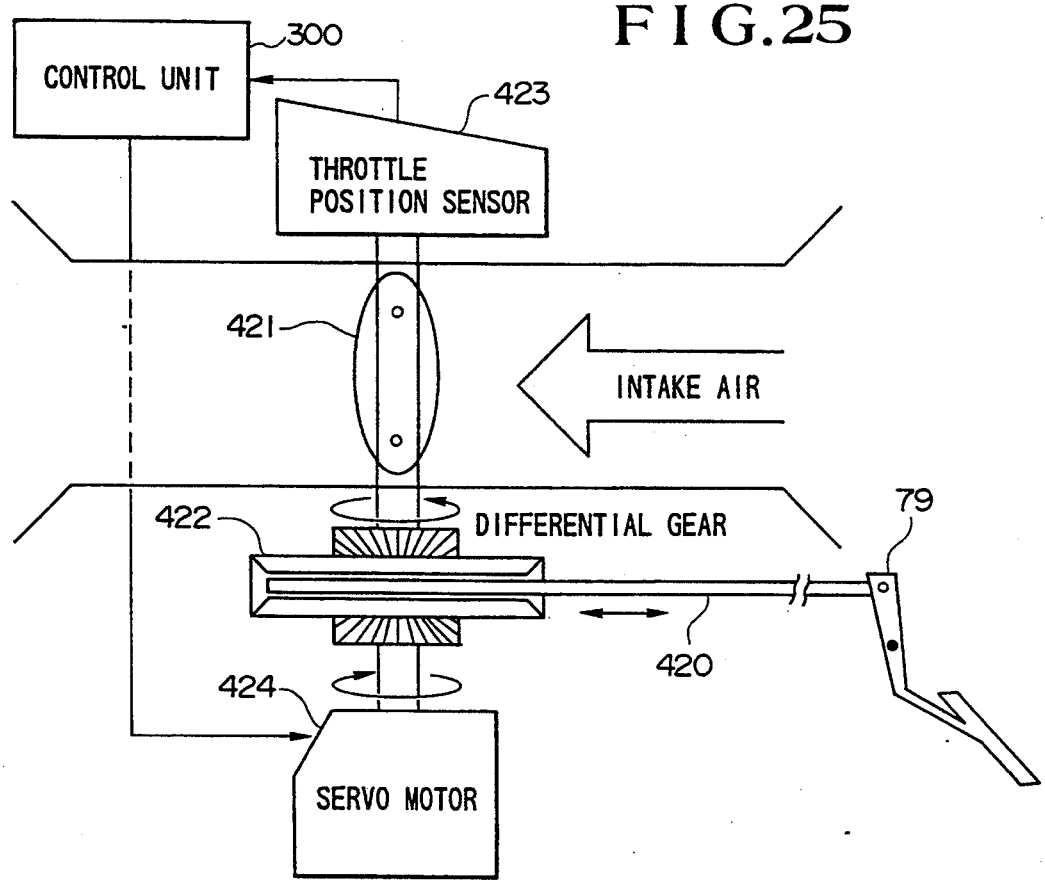
FIG. 25 is an illustration showing construction of a throttle control section.
Figure 26:
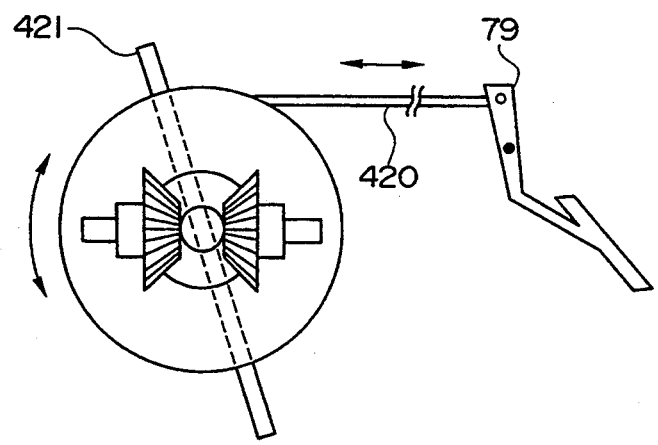
FIG. 26 is an illustration of a construction of a differential mechanism in the throttle control section.

FIG. 25 shows the throttle control section 82. FIG. 26 shows a differential mechanism employed in the construction of FIG. 25. A wire 420 connected to the accelerator pedal 9 is secured to the differential mechanism 422 as shown in FIG. 26. When the accelerator pedal 79 is depressed and if the servo motor 424 is in a resting state, the throttle valve 421 rotates together with the differential mechanism 422 to perform an action similar to that of the normal throttle valve construction. The throttle open angle is detected by means of a throttle position sensor 423 and is input to the control unit 300. Now, discussion will be given for the case in which the servo motor 424 is driven to rotate. When the accelerator pedal 421 is fixed, and the servo motor 424 is driven in the counterclockwise direction, the throttle valve 421 is driven by the differential mechanism comprising bevel gears to rotate in the clockwise direction (opposite to the motor driving direction). On the other hand, when the servo motor 424 is driven in the clockwise direction, the throttle valve 421 is driven in the counterclockwise direction. Accordingly, by controlling the rotational angle of the servo motor 424, the throttle valve open angle can be controlled irrespective of the operation of the accelerator pedal of the driver.

The control unit 300 combines the throttle valve open angle detected by the throttle position sensor 423 with various information to perform prompt control for the throttle valve open angle by means of the servo motor 424. On the other hand, when a failure of the servo motor occurs, since the throttle valve 421 can be driven by the accelerator pedal 79, normal driving operation can be maintained.

Figure 27:
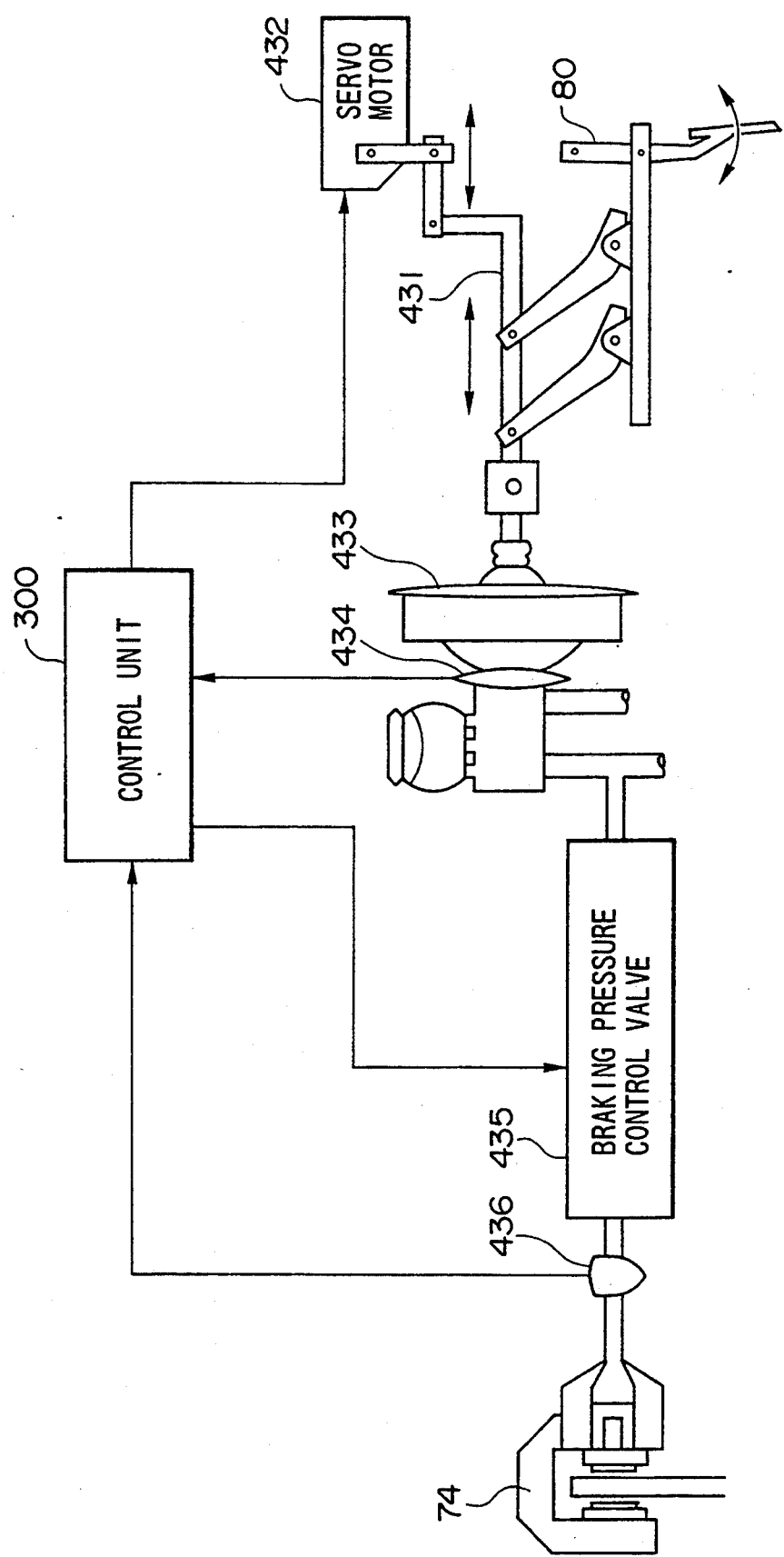
FIG. 27 is an illustration showing hydraulic pressure control section for a brake.

FIG. 27 shows the hydraulic braking pressure control section 83 for a single wheel. The hydraulic braking pressure control section 83 comprises a brake pedal 80, a servo motor 432 coupled with a link mechanism, a master cylinder 433, a master cylinder pressure sensor 434, a braking pressure control valve 435 and a wheel braking pressure sensor 436. The link mechanism 431 is so constructed as to assure transmission of the input from the brake pedal 80 and the servo motor 432 to the master cylinder but not transmit the input from the servo motor 432 to the brake pedal. The control unit 300 predicts the deceleration magnitude required by the driver on the basis of the output of the master cylinder pressure sensor 434. Though the shown embodiment is designed for predicting the deceleration demand through the hydraulic pressure generated in the master cylinder by depression of the brake pedal by the driver, it is also possible to predict the required deceleration magnitude by providing a brake pedal position sensor for the brake pedal and detecting the displacement thereof. In the control unit 300, a variety of information are combined with the deceleration demand of the driver for deriving a necessary braking pressure control command for establishing the predicted deceleration magnitude. The braking pressure control command is derived independently for each wheel. The control unit 300 then controls the braking pressure at each wheel so that the braking pressure detected by the wheel braking pressure sensor may follow this command. On the other hand, even when the driver does not depress the brake, if the control unit 300 makes a judgement that the braking force is required in such occasion that the vehicle enters into a corner at excessive speed, the servo motor 32 is operated to transmit an operational force to the master cylinder 432 through the link mechanism to situate the vehicle in the equivalent condition to that when the driver depresses the brake pedal 80.

Figure 28:
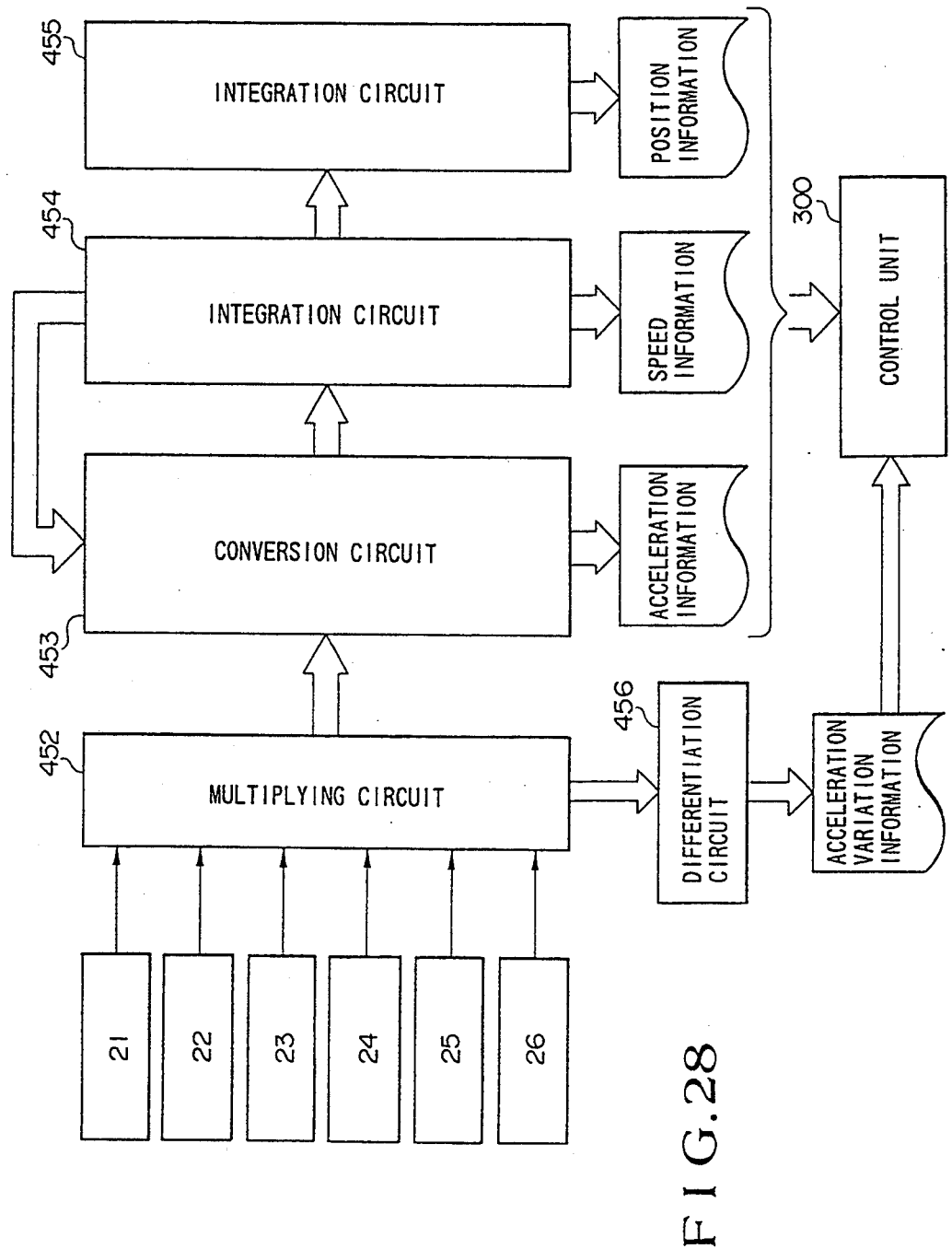
FIG. 28 is an illustration showing connections between six freedom sensors and a control section.

FIG. 28 shows the construction of the six freedom motion sensor 85. The six freedom motion sensor 85 is similar to those discussed with respect to FIGS. 4 to 6 and comprises six acceleration sensors 21 to 26 arranged as shown in FIG. 4 in a fixed vehicular coordinate system orienting the x axis in the longitudinal direction, the y axis in the lateral direction and the z axis in the vertical direction, a multiplier 452, a converter circuit 453, two stage integration circuits 454 and 455, and a differentiation circuit 456. As generally well known, the freedom in the vehicular behavior includes the rotational motion about the x axis (rolling), the rotational motion about the y axis (pitching), and the rotational motion about the z axis (yawing) in addition to linear motion in respective ones of the x, y and z axes directions. These motions occur simultaneously to cause a composite vehicular behavior. Therefore, the information practically measured by the acceleration sensors includes all the six freedom motion component. Accordingly, taking the acceleration and speed in the x axis direction as $a_x$ and $v_x$, the acceleration and speed in the y axis direction as $a_y$ and $v_y$, the acceleration and speed in the z axis direction as $a_z$ and $v_z$, the rotational angular acceleration and angular velocity about the x axis (rolling) as $\alpha_x$ and $\omega_x$, the rotational angular acceleration and angular velocity about the y axis (pitching) as $\alpha_y$ and $\omega_y$ and the rotational angular acceleration and angular velocity about the z axis as $\alpha_z$ and $\alpha_z$, and the values detected by the six acceleration sensors 21 to 26 as $G_a$, $G_b$, $G_c$, $G_d$, $G_e$ and $G_f$, the following relationships are established for the acceleration $a_x$ in the x axis direction and the rotational angular acceleration $\alpha_y$ about the y axis (pitching).

$$a_x = \frac{l_b \cdot G_a + l_a \cdot G_b}{l_a + l_b} \quad (38)$$

$$\alpha_y = \frac{G_a - G_b}{l_a + l_b} - \int \alpha_z dt \cdot \int \alpha_y dt = \frac{G_a - G_b}{l_a - l_b} - \omega_z \omega_y \quad (39)$$

In the shown construction of the six freedom motion sensor 85, the foregoing calculation is made possible with the multiplier 452, the converter circuit 453 and the integration circuit 545. The output of the integration circuit 454 becomes the speed and angular speed information. On the other hand, the output of the integration circuit 455 becomes the position information. The output of the differentiation circuit 456 represents the acceleration variation rate information. These items of information are supplied to the control unit. The control unit 300 uses these items of information to detect the vehicular behavior condition, to predict the forthcoming vehicular behavior by solving the specific motion equations for the specific vehicle while combining the detecting vehicular behavior condition with the driving operational information, such as steering angle made by the driver, the throttle valve open angle, the hydraulic braking pressure and so forth, and, also to predict the behavior of the standard vehicle by solving the specific motion equations for the targeted vehicle (standard vehicle) to follow the control thereto.

Figure 29:
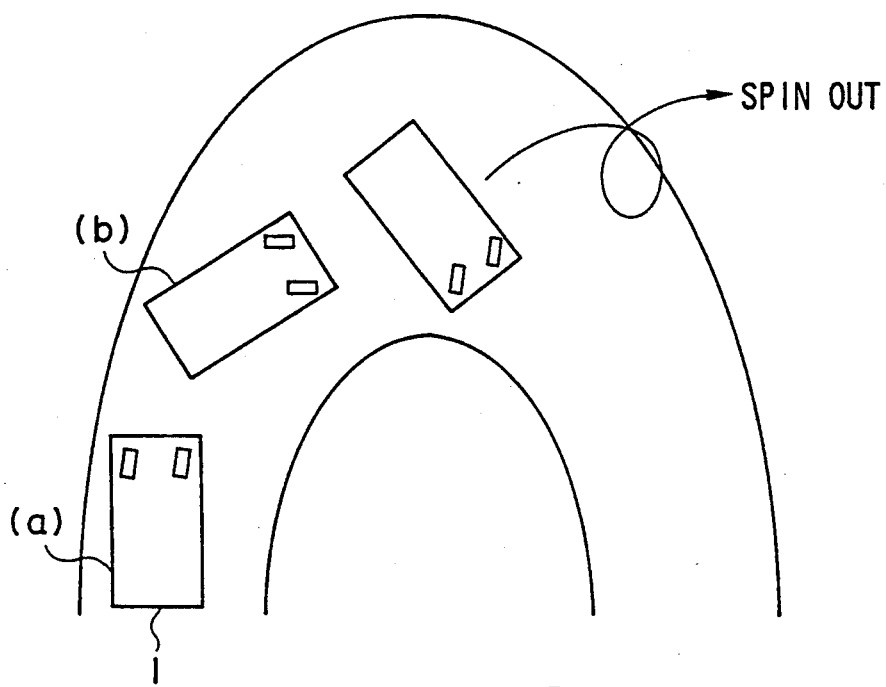
FIG. 29 is an illustration showing vehicular behavior upon occurrence of spinning.
Figure 30:
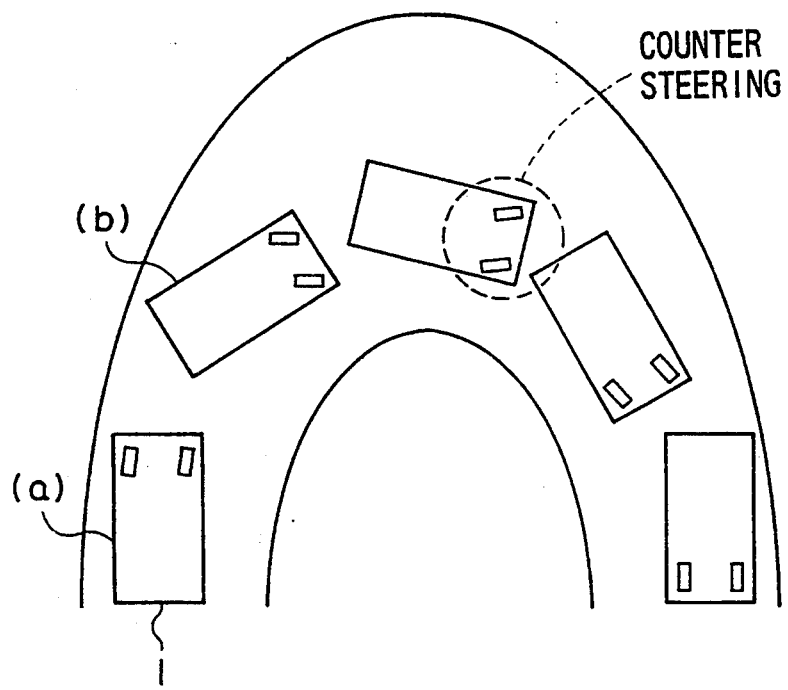
FIG. 30 is an illustration showing vehicular behavior when counter steering is applied.
Figure 32:
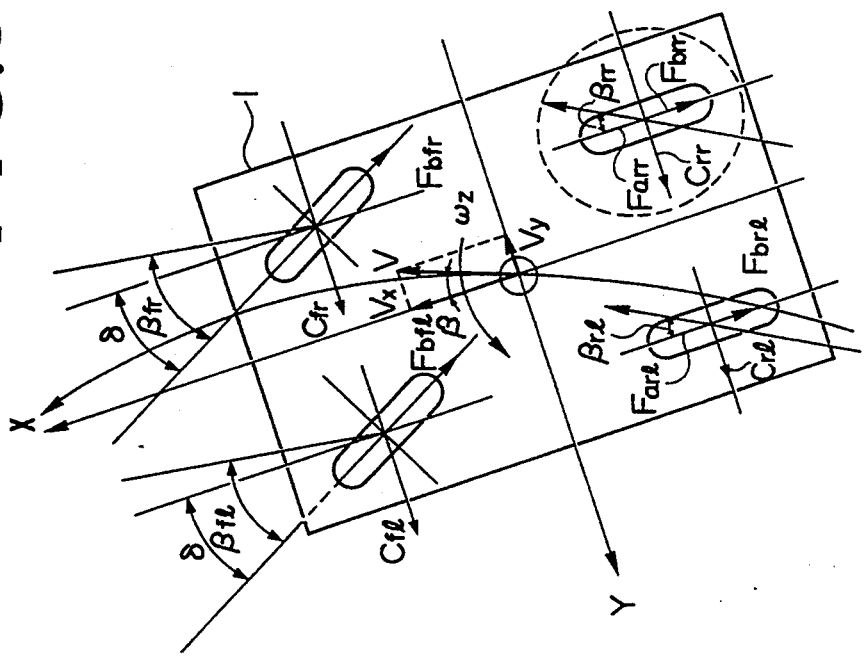
FIG. 32 shows an equilibrium of two dimensional force at the occurrence of lateral slip at the gravity center of the vehicle.
Figure 31:
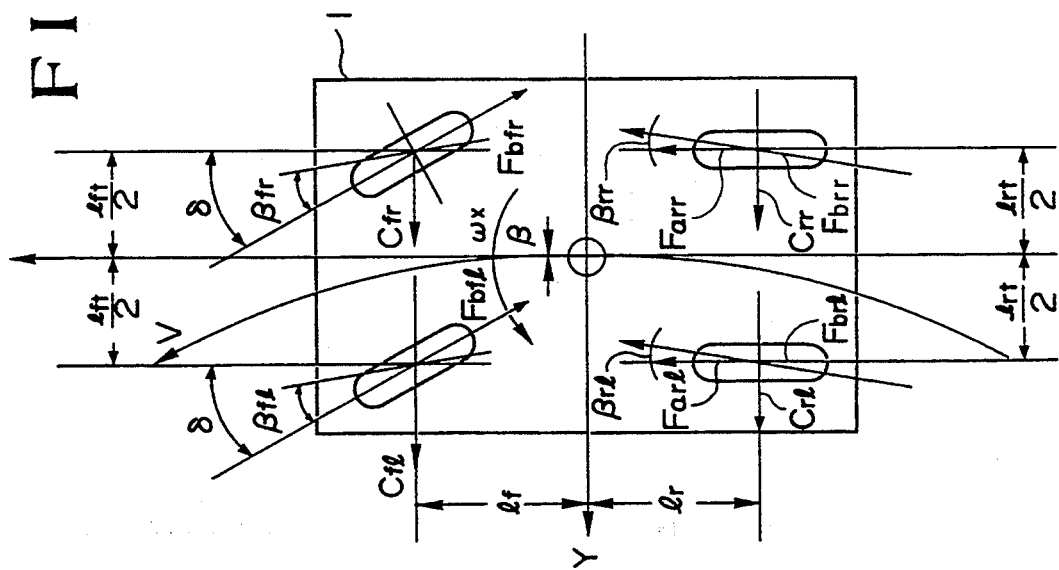
FIG. 31 shows an equilibrium of two dimensional forces on the vehicle in absence of lateral slip of the gravity center of the vehicle.
Figure 33:
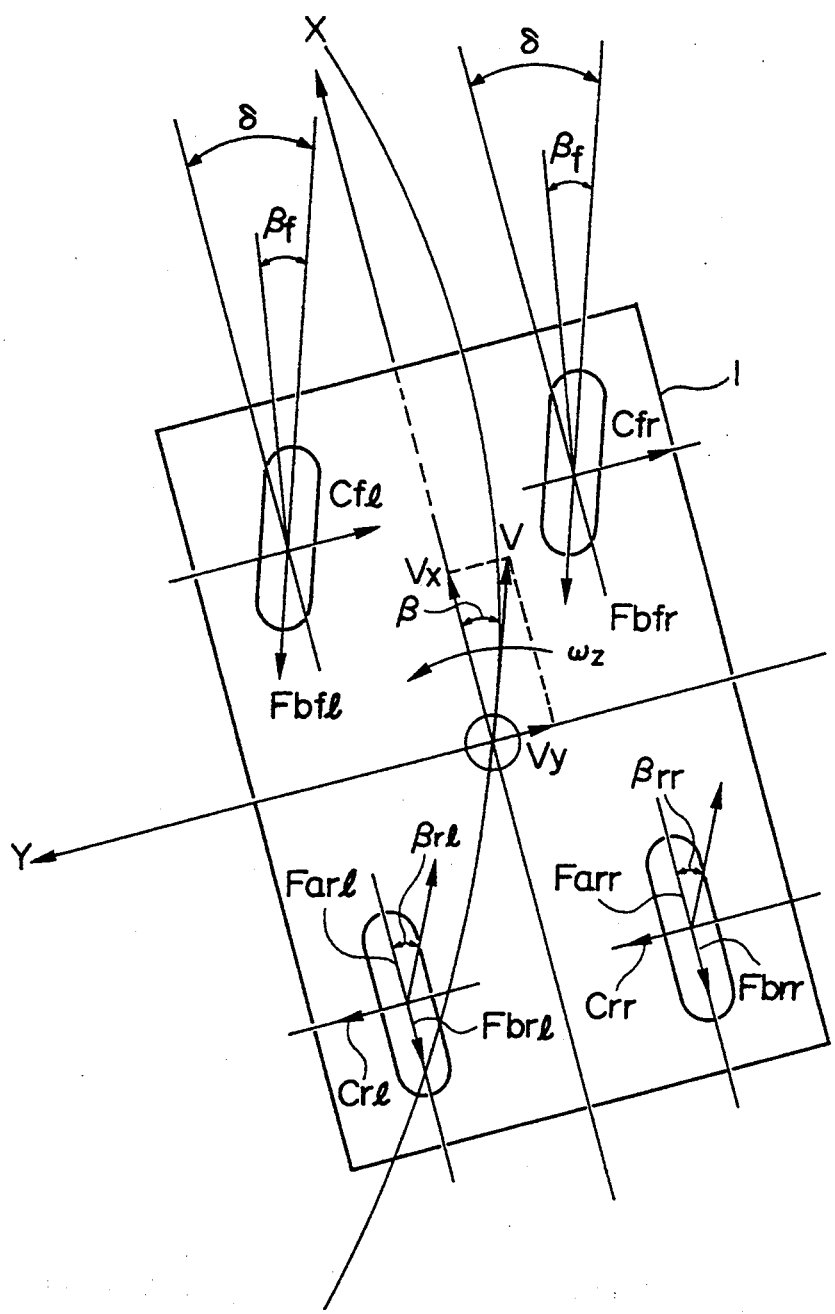
FIG. 33 shows an equilibrium of two dimensional forces upon application of counter steering for lateral slip at the gravity center of the vehicle.

FIG. 29 shows a trace and a steering angle of the vehicle which performs cornering at excessive speed to cause abrupt variation of the vehicular behavior and thus cause spinning. FIG. 30 shows the trace and the steering angle of the vehicle which performs high speed cornering through the same curve as FIG. 29 to cause abrupt variation of the behavior, but to avoid the spinning using the counter steering to pass the corner. In FIGS. 29 and 30, the condition in (a) and (b) are identical to each other. Dynamic equilibrium in two dimensional space where the vehicle is cornering without causing lateral slip is illustrated in FIG. 31, dynamic equilibrium in two dimensional space where the vehicle is cornering while causing lateral slip is illustrated in FIG. 32, and dynamic equilibrium in two dimensional space upon application of counter steering is illustrated in FIG. 33.

The vehicle 1 is subjected to cornering forces $C_{fl}$, $C_{fr}$, $C_{rl}$ and $C_{rr}$ generated on the left and right front wheels and left and right rear wheels, driving forces $F_{arl}$ and $F_{arr}$ acting on the left and right rear wheels and increasing according to increase of the throttle valve open angle, and braking forces $F_{bfl}$, $F_{bfr}$, $F_{brl}$ and $F_{brr}$ acting on the left and right front wheels and the left and right rear wheels. With these forces, a balance between the linear motion in the y axis direction and the rotational motion about the z axis is established. Assuming that the vehicle is cornering at a constant speed V, the vehicular weight is m, the inertia moment about the gravity center is I, the effective length from the gravity center of the vehicle to the front wheel is $l_f$, the effective length from the gravity center of the vehicle to the rear wheel is $l_r$, the front wheel tread is $l_{ft}$, the rear wheel tread is $l_{rt}$, the lateral slip angle at the gravity center of the vehicle as defined by $\tan\beta = V_y/V_x$ is $\beta$, and the steering angle is $\delta$, the motion under these conditions can be expressed by:

y axis direction $$mV \cdot \left[\frac{d\beta}{dt} + \omega_z\right] = C_{fl} + C_{fr} [F_{bfl} + F_{bfr}]\sin\delta + C_{rl} + C_{rr} \quad (40)$$

z axis direction $$I \cdot \frac{d\omega_z}{dt} = l_f\{[C_{fl} + C_{fr}] - [F_{bfl} + F_{bfr}]\}\sin\delta - \quad (41)$$

$$\frac{1}{2} l_{ft} \{[-F_{bfr}] - [-F_{bfl}]\}\cos\delta - l_r(C_{rl} + C_{rr}) -$$

$$\frac{1}{2} l_{ft}\{[F_{arr} - F_{bfr}] - [F_{arl} - F_{bfl}]\}$$

The cornering force is determined by the lateral slip angle with respect to the traveling direction (direction of the speed V) of the vehicle. At the front wheel, the cornering forces are adjusted by the driver through the steering angle. Assuming that the cornering power at the left and right front wheels are $K_{fl}$ and $K_{fr}$, and the cornering power at the rear wheels are $K_{rl}$ and $K_{rr}$, respective of the cornering forces can be expressed by:

$$C_{fl} = -K_{fl} \cdot \beta_{fl} \approx -K_{fl}\left[\beta + l_f \cdot \frac{\omega_z}{V} - \delta\right] \quad (42)$$

$$C_{fr} = -K_{fr} \cdot \beta_{fr} \approx -K_{fr}\left[\beta + l_f \cdot \frac{\omega_z}{V} - \delta\right] \quad (43)$$

$$C_{rl} = -K_{rl} \cdot \beta_{rl} \approx -K_{rl}\left[\beta + l_r \cdot \frac{\omega_z}{V}\right] \quad (44)$$

$$C_{rr} = -K_{rr} \cdot \beta_{rr} \approx -K_{rr}\left[\beta + l_r \cdot \frac{\omega_z}{V}\right] \quad (45)$$

wherein $\beta_{fl}$, $\beta_{fr}$, $\beta_{rl}$ and $\beta_{rr}$ are lateral slip angles at respective ones of the left and right front wheels and left and right rear wheels. Here, for the purpose of simplification of the disclosure, it is assumed that the lateral slip angles at the left and right front wheels and at the left and right rear wheels are the same.

Braking and driving force (commonly referring the braking force and driving force) are controlled by the driver through the brake pedal and the accelerator pedal. As is well known, the sum of the absolute values of the maximum cornering force to be generated by the tire at the critical traveling condition and the braking and driving force is maintained constant as long as the friction coefficient between the road surface and the tire is maintained unchanged. Now, if this constant value at the left and right front wheels are assumed to be $F_l$ and $F_r$ and at the left and right rear wheels are assumed to be $R_l$ and $R_r$, the following equations can be established at the critical traveling condition.

$$F_l^2 = C_{fl}^2 + F_{bfl}^2 \quad (46)$$

$$|C_{fl}| = \sqrt{F_l^2 - F_{bfl}^2} \quad (47)$$

$$F_r^2 = C_{fr}^2 + F_{bfr}^2 \quad (48)$$

$$|C_{fr}| = \sqrt{F_r^2 - F_{bfr}^2} \quad (49)$$

$$R_l^2 = C_{rl}^2 + (F_{arl} - F_{brl})^2 \quad (50)$$

$$|C_{rl}| = \sqrt{R_l^2 - (F_{arl} - F_{brl})^2} \quad (51)$$

$$R_r^2 = C_{rr}^2 + (F_{arr} - F_{brr})^2 \quad (52)$$

$$|C_{rr}| = \sqrt{R_r^2 - (F_{arr} - F_{brr})^2} \quad (53)$$

In FIG. 31, the traveling direction (direction of the speed V) of the vehicle and the direction of the x axis are coincident with each other. At this condition, the vehicle has no speed component $V_y$ in the y axis direction, namely the condition $\beta = 0$. Next, FIG. 32 shows the condition where $\beta < 0$. The reason why the rear wheels are thrown out of the outside of the corner, is for obtaining a wheel lateral slip angle to obtain correspondence with the centrifugal force due to absence of the steering mechanism. At this condition, if the absolute value of the braking and driving force is increased by depressing the accelerator pedal or applying the brake, the rear wheels brake beyond the critical condition. The motion equations for the linear motion along the y axis direction and the rotational motion about the z axis are given as follows:

$$mV\left(\frac{d\beta}{dt} + \omega_z\right) = -(K_{fl} + K_{fr})\left(\beta + l_f\frac{\omega_z}{V} - \delta\right) - \quad (54)$$

$$(F_{bfl} + F_{bfr})\sin\delta + \sqrt{R_l^2 - (F_{arl} - F_{brl})^2} +$$

$$\sqrt{R_r^2 - (F_{arr} - F_{brr})^2}$$

$$I\frac{d\omega_z}{dt} = -l_f(K_{fl} + K_{fr})\left(\beta + l_f\frac{\omega_z}{V} - \delta\right) - \quad (55)$$

$$l_f(F_{bfl} - F_{brr})\sin\delta - \frac{1}{2} l_{ft}[(-F_{bfr}) - (-F_{bfl})]\cos\delta -$$

$$l_r\sqrt{R_l^2 - (F_{arl} - F_{brl})^2} - l_r\sqrt{R_r^2 - (F_{arr} - F_{brr})^2} +$$

$$\frac{1}{2} l_{rt} [(F_{arr} - F_{brr}) - (F_{arl} - F_{brl})]$$

The third and sixth elements of the equation (55) represent differences of the braking and driving forces between the left and right front wheels and between the left and right rear wheels. Accordingly, as set forth above, by controlling the braking force at the left and right front wheels using the braking pressure control section 83 and by controlling the braking and driving force at the left and right rear wheels by the braking pressure control section 83 and the controlled differential gear unit 77, for directly controlling the moment about the z axis, the rotation about the z axis can be controlled in an active manner.

On the other hand, as can be appreciated from the equation (54), when the braking and driving forces $(F_{arl} - F_{brl})$ and $(F_{arr} - F_{brr})$ are increased, the third and fourth elements in the equation (54) are decreased to increase the lateral slip angle $\beta$. Furthermore, the fourth and fifth elements of the equation (55) are increased so the rotational angular acceleration $d\omega_z/dt$ about the z axis is increased to cause a spinning condition on the vehicle. Here, in order to avoid spinning, as will be apparent from the equations (54) and (55), it is effective to control the braking and driving force so as not to be excessive and to control the steering angle $\delta$ to reduce it into the negative range (opposite direction to the cornering direction, namely counter steering) to cause the rotational moment about the z axis to be reduced to zero or to a negative value with the cornering force generated by the front wheels (FIG. 33).

Figure 34:
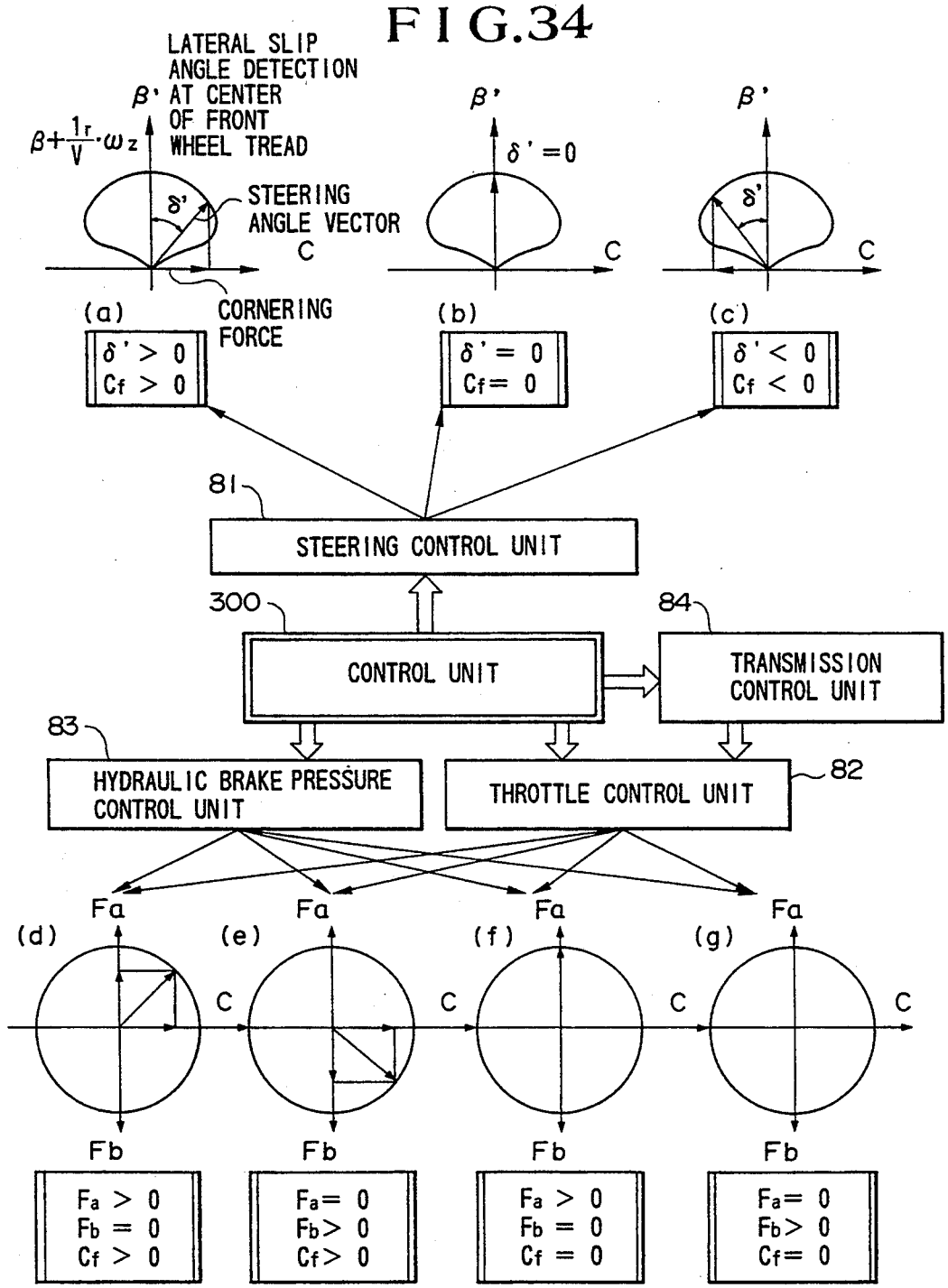
FIG. 34 is an illustration showing process of control for cornering force in the embodiment of the present invention.

In FIG. 34, the manner of implementation of the above-mentioned control is illustrated. Discussion will be given for the front wheels which have a steering function at first and then for the rear wheels. In the equations (42) and (43), $\beta + l_f \omega_z/VC$ is the lateral slip angle at the center of the tread of the front wheels, which can be detected by processing the information from the six freedom motion sensor 85 using the control unit 300. Here, by taking the lateral slip direction at the center of the front wheel tread in the vertical axis and the cornering force in the horizontal axis, and setting the angle formed between the lateral slip angle at the center of the front wheel tread and the front wheels as $\delta'$, the steering angle vector is considered. The projection of the steering vector for the axis of the cornering force is considered as actual cornering force. It should be apparent that $\delta'$ represents the steering angle for generating the actual cornering force. Now, when the steering angle $\delta'$ increases, the cornering force becomes maximum at a certain steering angle, and then decreases. Therefore, the steering vector establishes the trace as illustrated in FIG. 34. In FIG. 34, the condition (a) represents the case where normal control is performed, in which the steering angle $\delta'$ is positive and the cornering force is also positive. The conditions (b) and (c) represents the particular feature of the present invention, in which the steering angle is controlled. In the condition (b), the steering angle $\delta'$ is controlled to be zero to make the cornering force zero. Furthermore, in the condition (c), the steering angle $\delta'$ is controlled to be negative to generate a cornering force in the direction opposite to a cornering direction. This is equivalent to realization of a counter steering which is a high driving technique only possible for well trained drivers.

Next, a discussion will be given concerning the rear wheels. In the normal driving conditions (d) and (e), with an increase of the driving force F, and the braking force $F_b$, the cornering force is reduced. Furthermore, at the wheel spinning condition (f) due to excess tire driving force, and the wheel locking state (g) due to excessive tire braking force, the cornering force becomes zero. According to the present invention, such reduction of the cornering force is positively utilized so that the braking and driving force is controlled through the braking pressure control section 83 and the throttle control section 82 based on the vehicle speed and the wheel speed detected by the wheel speed sensors 73a to 73d, and thus the cornering force is controlled. The method for controlling the cornering force by controlling the braking force is naturally applicable for the front wheels which have brakes.

According to the present invention, the control unit 300 actively performs a counter steering, applying braking only for the rear brakes, excessively opening the throttle valve to causing spinning of the driving wheels and other control operations for controlling the cornering forces at respective wheels independently of each other so as to control the rotational moment about the z axis and thereby control the behavior condition of the vehicle on the basis of the vehicular behavior information from the six freedom motion sensor 85, the wheel speed from the wheel speed sensors 73a to 73d of respective wheels, the steering angle information obtained from the steering control section 81, the throttle valve open angle information obtained from the throttle control section 82, and the braking pressure information obtained from the braking pressure control section 83. Of course, the controlled differential gear unit 77 and the transmission control section 84 are used for controlling the braking and driving force on the rear wheels.

Figure 35:
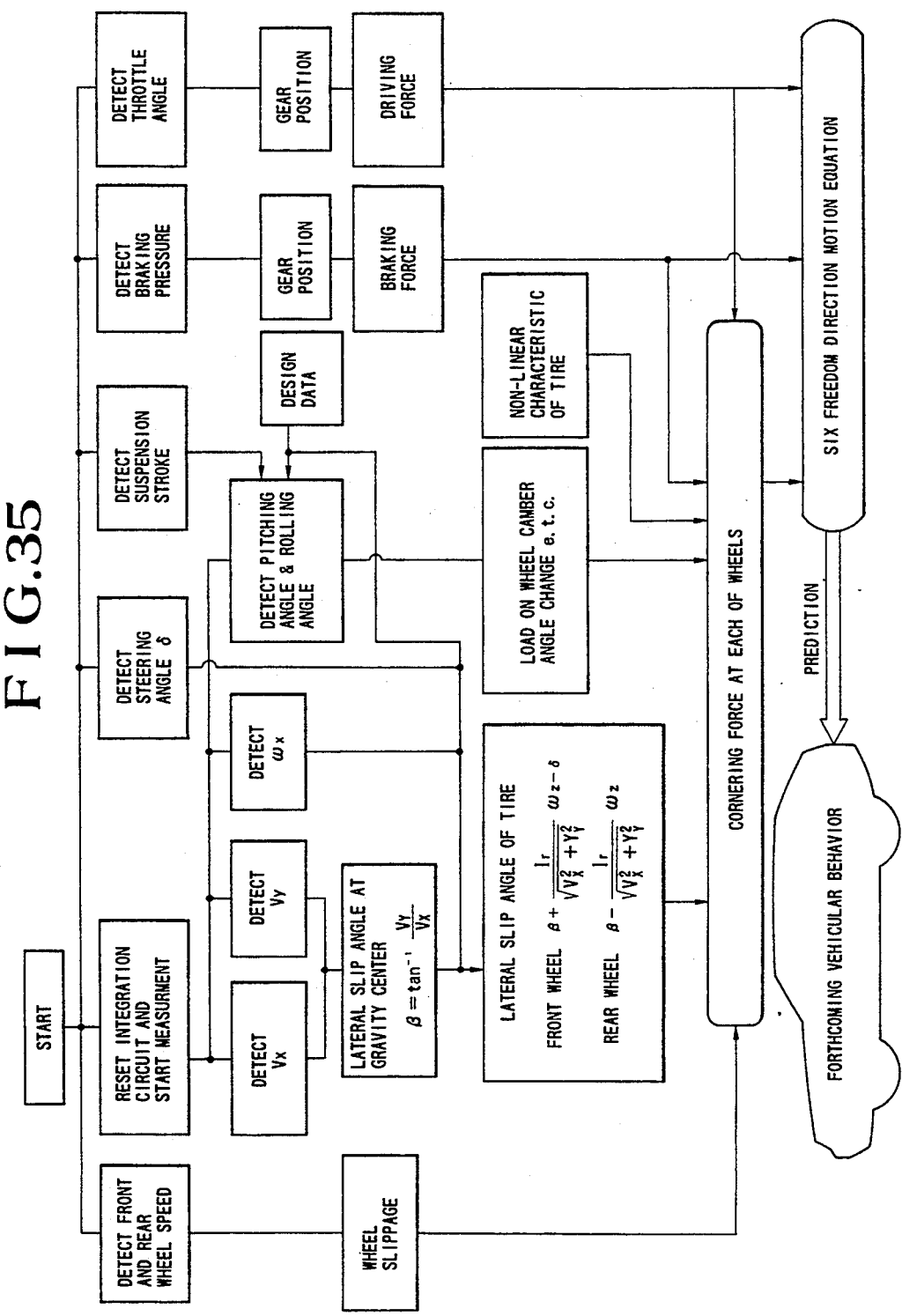
FIG. 35 is an illustration showing process of prediction of vehicular behavior in the embodiment of the invention.

With reference to FIG. 35, the prediction process of the vehicular behavior within the control unit 300 will be discussed. The control unit 300 is responsive to the rotational acceleration $\omega_z$ about the z axis from the six freedom motion sensor 85 (initiation of cornering, to reset the integration circuit of the six freedom motion sensor 85 and re-start detection. Based on the linear speeds $V_x$ and $V_y$ in the x and y axes directions, the lateral slip angle $\beta = \arctan(v_x/v_y)$ at the gravity center is derived. Furthermore, with the rotation speed $\omega_z$ around the z axis and the steering angle input by the driver through the steering wheel 78 (this is detected by the steering angle control section 81 acting as the steering angle sensor), the control unit 300 detects the lateral slip angles at respective wheels. On the other hand, the control unit 300 detects the rotation angle (rolling angle) about the x axis and the rotation angle (pitching angle) about the y axis from the outputs of the six freedom motion sensor 85 and thus detects the vehicular attitude for detecting the load on respective wheels. Furthermore, based on the information from the stroke sensors 51fr, 51fl, 51rr and 51rl of the suspension mechanisms 76a, 76b, 78c and 76d, the information representative of vehicular attitude variation is corrected. With the vehicular attitude variation thus derived and the design data of the suspension mechanism, variation of alignment, such as camber angle change and toe angle change, is detected. In conjunction with the process set forth above, the wheel speeds at respective wheels are detected by the wheel speed sensor and compared with the vehicle speed detected by the six freedom motion sensor 85, and the wheel slippage at respective wheels are derived. Together with the lateral slip angle, load, alignment variation and wheel slippage at each wheel, a predicted driving force based on the throttle valve open angle demand detected by the throttle control section 82 and the transmission gear position detected by the transmission control section 84, the maximum differential limit torque at the rear wheel from the controlled differential gear unit, and non-linear characteristics of the tire and other variety of information, are used for deriving the cornering force at each wheel. With the cornering force thus obtained, the braking force and driving force, the motion equations internally stored in the control unit 300, for the six freedom motion for the behavior characteristics of the standard vehicle as the target of control, the target of control for the behavior of the vehicle is established.

Figure 36:
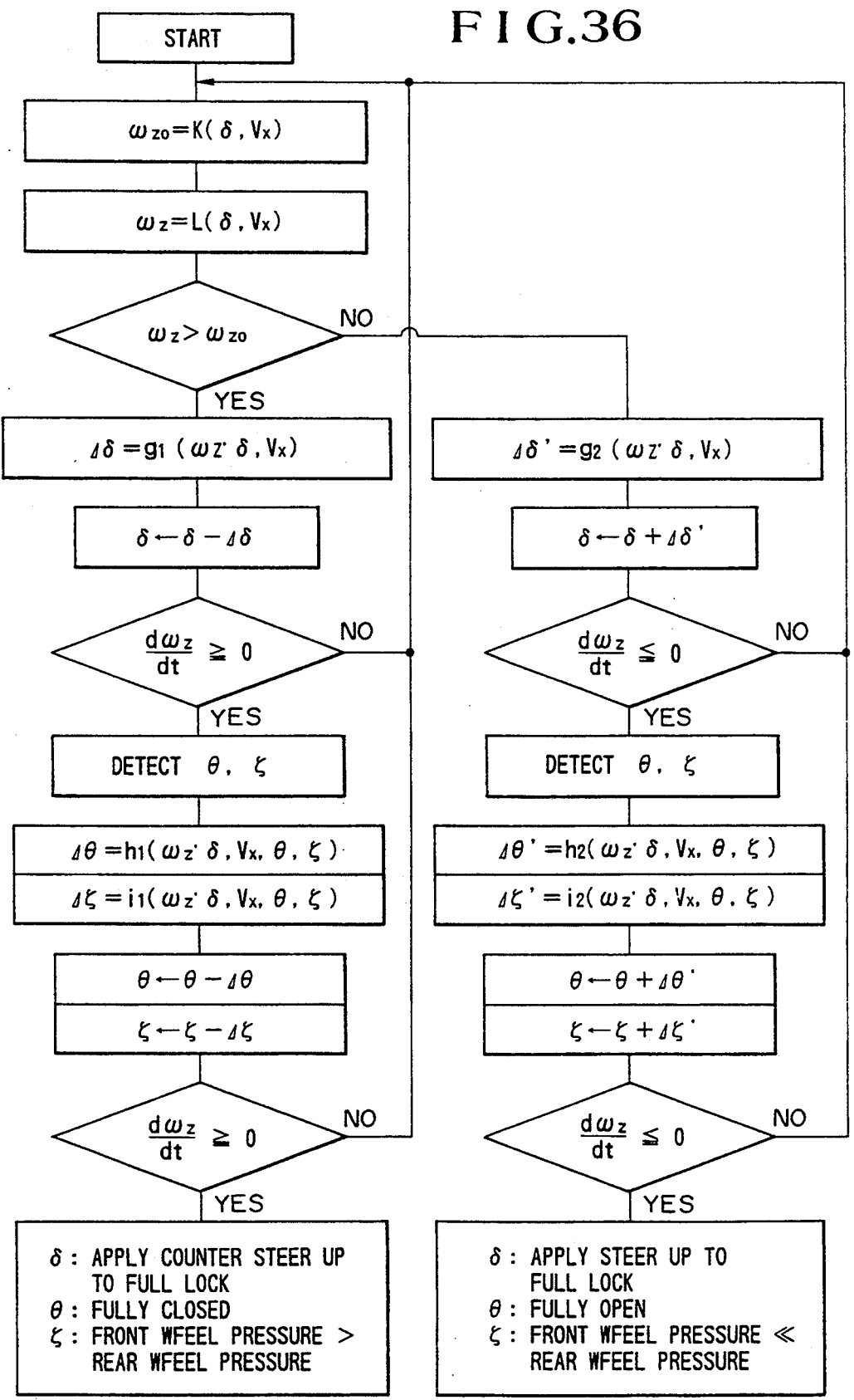
FIG. 36 is an illustration showing process of control to be performed by the embodiment of the invention.

In FIG. 36, the control process of the control unit, in which the vehicular behavior during a cornering condition at the critical speed is represented by the rotation speed about the z axis and as the standard vehicle, the neutral steering (the vehicle, behavior of which is determined solely by the steering angle and the speed) is selected. The rotation speed $\omega_{zO}$ about the z axis of the standard vehicle, which is predicted in the manner shown in FIG. 35 and the rotation speed $\omega_z$ about the z axis of the vehicle to be controlled are compared. When $\omega_z - \omega_{zO} > \xi$ ($\xi$ is a random constant satisfying $\xi > 0$), the control unit 300 may make a judgement that over steering is caused on the standard vehicle model, and may provide this information for the driver to give a caution. The control unit 300 then outputs a correction command for the steering angle control section 81 to adjust the steering angle $\delta$ to $\delta - \Delta\delta$. If the rotation speed $\omega_z$ is decreased, a correction to make $\omega_z$ to follow $\omega_{zO}$ is continued. On the other hand, when the rotation speed $\omega_z$ is not decreased despite decreasing of the steering angle for $\delta\Delta$, with continuing reduction of the steering angle, the throttle valve open angle $\theta$ and the brake line pressure $\zeta$ are reduced through the throttle control section 82 and the braking pressure control section 83 in a similar matter to the steering angle $\delta$. Furthermore, by the transmission control section 84 and the controlled differential gear unit 77, correction is performed so that the braking force at the left and right rear wheels and the driving force are properly reduced to increase the load on the front wheels and to increase the cornering force at the rear wheels to relatively reduce the rotational moment about the z axis. In addition, further correction may be performed by adjusting the steering angle to the direction opposite to the cornering direction (counter steering) to positively generate a rotational moment in the opposite direction. Through the procedure set forth above, $\omega_z$ can be controlled to follow $\omega_{zO}$. However, when $\omega_z$ cannot be reduced through all the effects set forth above, the steering operation is performed up to the full lock position in the counter steering direction and the braking pressures between the front and rear wheels are maintained in the relationship front wheel > rear wheel, the lateral slip angle $\beta$ is controlled to approach to $\pi/2$ to stop the vehicle.

Next, when $\omega_{zO} - \omega_z < \xi'$ ($\xi$ is a random constant satisfying $\xi > 0$), the control unit makes a judgement that under steering is caused in the standard model. Similarly to the above, the control unit 300 may provide this information to the driver for caution. The control unit 300 outputs a correction command to the steering angle control section 81 for adjusting the steering angle $\delta$ to $\delta + \Delta\delta$. If the rotation speed $\omega_z$ about the z axis is increased, control for making $\omega_z$ to follow $\omega_{zO}$ is maintained. However, if the rotation speed $\omega_z$ about the z axis is not increased despite increasing the steering angle for $\Delta\delta$, the cornering force at the front wheels are regarded to reach the limits and then correction control for properly adjusting braking forces and the driving forces at the left and right wheels are performed by the throttle control section 82, the braking force control section 83, the transmission control section 84 and the controlled differential gear unit 77 so that the load at the front wheels is increased to increase the cornering force at the front wheels and to reduce the cornering force at the rear wheels and thus the rotational moment about the z axis is relatively increased to make $\omega_z$ to follow $\omega_{zO}$. If $\omega_z$ is not increased despite of the all of the foregoing efforts, judgement is made that control is completely lost. In such case, it may be possible to fully close the throttle valve, to perform shifting down of the transmission gear position for effecting engine braking, and to apply braking pressure to lock the rear wheels to reduce the cornering force at the rear wheels to zero. By this, the rotational moment about the z axis is abruptly increased to initiate an action equivalent to a so-called spin-turn. Here, if excessive rotational speed about the z axis is induced, the foregoing control in response to over steering may be initiated.

In general, the steering characteristics of the vehicle are set to be light under steering. Accordingly, over steering may be typically caused on a road having a substantially low friction coefficient, such as an icy road and so forth, or when the driver intentionally applies an excessive braking force or driving force for each of the wheels (particularly for the rear wheels) to induce over steering, the control illustrated in FIG. 36 may be effective for the former case. However, for the later case, it should be understood that the driver is attempting drifting to positively increase the lateral slip angle at the gravity center for making cornering with applying counter steering. In such case, the control unit 300 controls the lateral slip angle $\beta$ following the driver's driving operation in conjunction with performing control for the rotational speed $\omega_z$ about the z axis. Namely, it is desirable to vary the behavior characteristics of the standard vehicle which serves as the target for control, according to the driver's driving operation for avoid causing a sense of incongruity.

Figure 37:
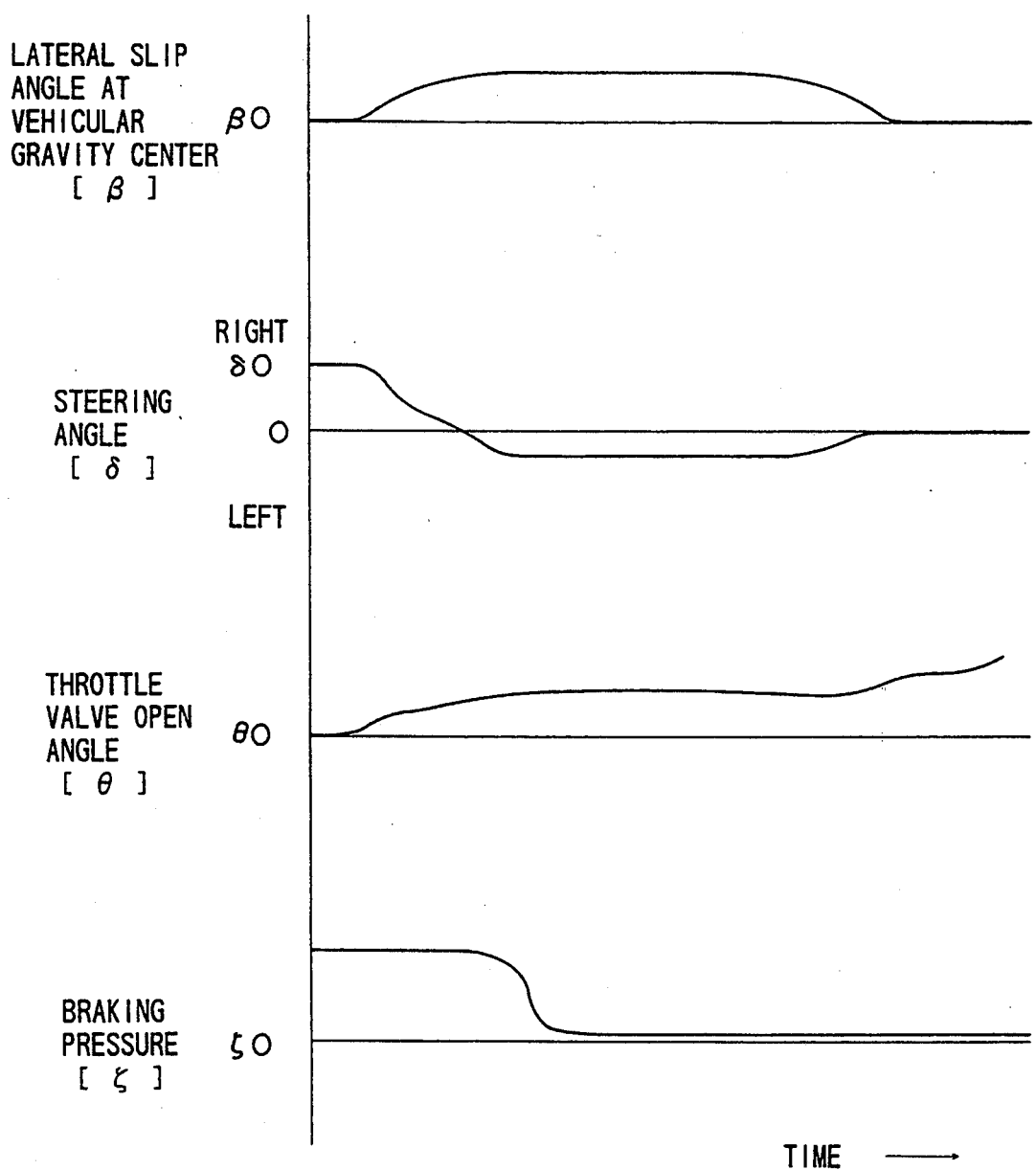
FIG. 37 is an illustration showing driving behavior of the driver for positively increasing the lateral slip angle at the gravity center in the typical vehicle.
Figure 38:
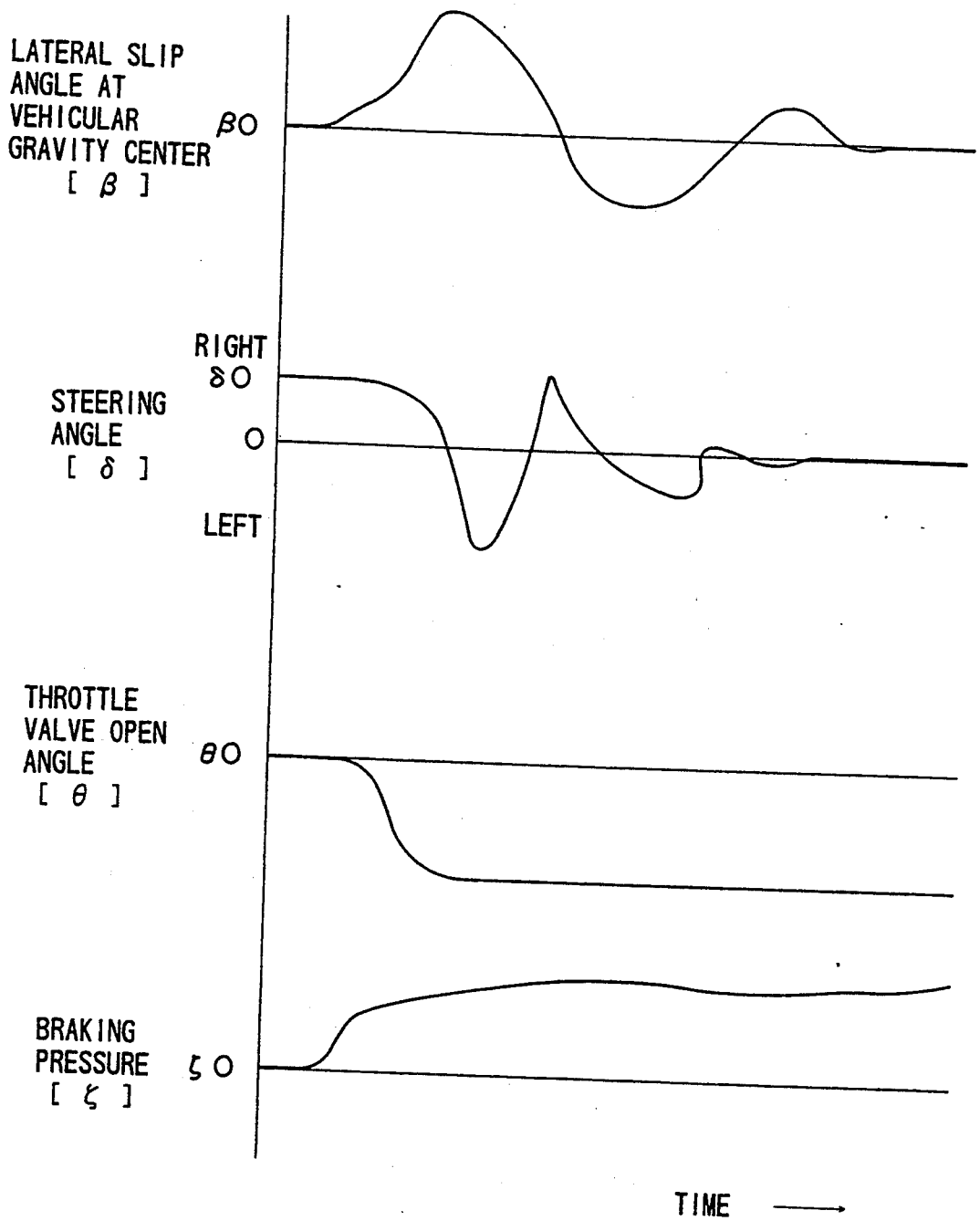
FIG. 38 is an illustration showing driving behavior of the driver for positively increasing lateral slip angle at the gravity center in the typical vehicle, during occurrence of over-steering.

FIG. 37 shows a driver's operation for attempting to positively increase the lateral slip angle at the gravity center in the typical vehicle, and FIG. 38 shows the driver's operation when not making such attempt. Here, it is assumed that the lateral slip angle is $\beta 0$, the steering angle is $\delta 0$, the throttle valve open angle is $\theta 0$ and the brake line pressure is $\zeta 0$ when over steering is detected. In FIG. 37, the reduction of the steering angle $\delta$ is proper upon occurrence of over steering, and the throttle valve open angle $\theta$ is increased in response thereto. Namely, the steering is operated in the reverse direction opposite to the cornering direction (counter steering) to attempt to positively induce the moment in the opposite direction to the current rotating direction, and at the same time to decrease the cornering force at the rear wheels by increasing the driving force at the rear wheels and thus to increase the rotational moment about the z axis, for establishing a balance by making the rotational moment about the z axis zero. In contrast to this, in FIG. 38, in response to unexpected over steering, the driver applies the brake to increase the rotational moment about the z axis and thus to increase the lateral slip angle at the gravity center of the vehicle. Furthermore, due to delay of operation timing of the steering angle $\delta$ for correction of the lateral slip angle $\beta$ at the gravity center, a so called Dutch roll is caused. As will be clear from comparison of FIGS. 37 and 38, by detecting the lateral slip angle d, the steering angle $\delta$, the throttle open angle $\theta$ and the braking pressure $\zeta$, the driver's will can be predicted with a relatively high accuracy.

Figure 39:
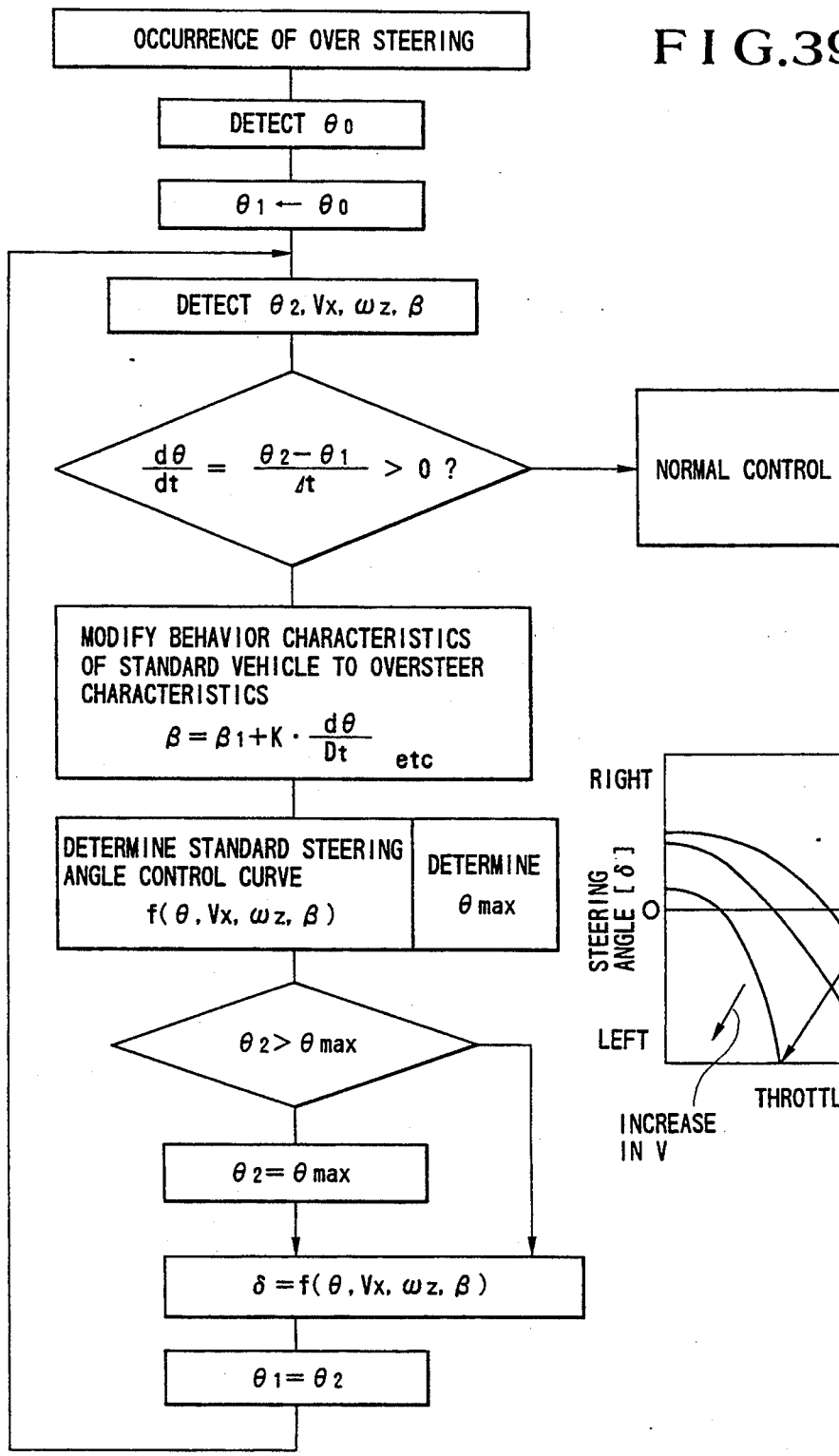
FIG. 39 is an illustration showing process for correcting characteristics of a reference vehicle model.

FIG. 39 illustrates the operation of the control unit 300 upon occurrence of over steering when the throttle valve open angle $\theta$ is evaluated as the driver's will. Initially, at the initiation of over steering, the throttle valve open angle $\theta 0$ is detected. This initial value is referred as $\theta 1$. Then, the throttle valve open angle $\theta 2$, the linear speed $v_x$, the rotation speed $\omega_z$ about the z axis, and the lateral slip angle $\beta 1$ at the gravity center are detected at a timing after elapsed time $\Delta t$. Then, $d\theta/dt$ is calculated. If $d\theta/dt > 0$, judgement can be made that the driver is intending to positively cause over steering. Then, according to the driver's will, the behavior characteristics of the standard vehicle are changed to false over steering characteristics. Practically, change is made for increasing the allowable rotation speed $\omega_z$ about the z axis, modifying the lateral slip angle $\beta$ by adding a value derived by multiplying a variation of the throttle valve open angle $d\theta/dt$ with a proper proportional constant K, to $\beta 1$ to set as $\beta = \beta 1 + K \cdot d\theta/dt$, for example. Here, the control unit 300 derives a standard steering angle control curve ($\theta$, $v_x$, $\omega_z$, $\beta$) while taking the throttle valve open angle $\theta$, the linear speed $v_z$ in the z axis direction, the rotation speed $\omega_z$ about the z axis and the lateral slip angle $\beta$ at the gravity center as parameters (here, for the purpose of illustration, FIG. 39 shows example for right turning with taking $v_z$ as sole parameter). In the standard steering angle control curve ($\theta$, $v_z$, $\omega_z$, $\beta$), the throttle valve open angle, at which the steering angle comes into the fully locked state, is assumed as $\theta$max. This throttle valve open angle $\theta$max is the maximum value to avoid spinning of the vehicle by steering angle control including a counter steering operation. Even when the driver attempts to increase the throttle valve open angle beyond this value, the control unit 300 issues the control command for the engine 1 through the throttle control section 82 with correction for $\theta 2 = \theta$max. If $\theta 2 < \theta$max, the steering angle is corrected to be $\delta = f(\theta 2, v_x, \omega_z, \beta)$. Subsequently repeating the process set forth above, the standard steering control curve is updated following the driver's will and will continue control to make the behavior of the vehicle follow this characteristic. When the rotation speed $\omega_z$ about the z axis becomes zero, a judgement is made that the vehicle is exiting from the curve and thus the correction control is terminated.

FIG. 39 shows an example for the case in which the driver is attempting a drifting of the vehicle. However, for other driving operations reflecting the driver's will, various operational magnitudes (operated steering angle, throttle valve open angle, the braking pressure and so forth) caused by the will of the driver are detected to predict the driver's will to update the standard behavior characteristics for following the driver's will and thereby to control the vehicular behavior following thereto.

While the controls set forth above are performed, the control unit 300 may display with display device 301 the correction values for the steering angle, the braking pressure and the throttle valve open angle in real time for providing information concerning a difference of operational magnitude between the operational magnitude of the driver and that required for causing the demanded behavior on the vehicle. When judgement is made that the difference of the operational magnitude or difference of timing is sufficiently small, the driver may randomly select perform or not to perform controls.

FIG. 40 shows motion equations for the six freedom motion sensors when the behavior characteristics model 235 of the actual vehicle to be controlled and the behavior characteristics model 234 of the standard model are approximated with a simpler behavior model. The values enclosed in the broken lines (having e (estimation) in the second digit of the suffix, such as Axet, Vxet, Xxet, Axem, Xxem) are predicted values for the vehicle to be controlled and the standard vehicle for at second later, based on the behavior of the vehicle to be controlled as detected by the six freedom motion sensor 85.

Hereafter, the process for prediction of the vehicle to be controlled and the standard vehicle will be discussed in order. Prediction for the behavior of the vehicle to be controlled can be performed by taking a variety of behavior information (having s (sensing) in the second digit of suffix, such as Axst, Vxst, Xxst, Axsm, Vxsm, Xxsm and so forth) as initial values and integrating those values. In contrast to this, in prediction of the behavior of the standard vehicle, initially, the force (Fcx, Fcy, Fcz) acting along the x, y and z axes and the torque about the x, y and z axes of the vehicle to be controlled, are derived on the basis of the linear accelerations in the x, y and z axes directions, the angular acceleration about the x, y and z axes as detected by the six freedom motion sensor 85 and the behavior characteristics parameters (mass weight Mt, inertia moment about each axis Ixt, Iyt, Izt and so forth) of the vehicle to be controlled. Such forces and torques include controllable components and uncontrollable components, such as the strength of the window. Then, solving the motion equations in terms of these forces, torques and the behavior characteristics parameters (mass weight Mm, the inertia moment Ixm, Iym, Izm and so forth), the linear accelerations and the angular acceleration with respect to respective axes are predicted. Utilizing these predicted accelerations and predicted angular accelerations, and taking the variety of behavior information of the six freedom motion sensor 85, the behavior at $\Delta t$ seconds later can be predicted by integration. In FIG. 40, although prediction is performed utilizing only current information, further precise control may be achieved by deriving the information by additionally using the information of $\Delta t$ seconds ahead by a center finite difference method.

In the control unit 300, the behavior of $\Delta t$ seconds later of the vehicle to be controlled and the behavior of $\Delta t$ seconds later of the standard vehicle are compared to update the variety of control commands so as to reduce the difference therebetween.

The foregoing discussion has been given for a specific vehicle having two front steerable wheels, and front engine and rear wheel drive power train layout and so forth. However, the method of detection of the behavior in six freedom motion, control of the cornering force by controlling the braking and driving forces and control for positively controlling the steering angle toward the direction opposite to the normal cornering direction and so forth are applicable to any types of vehicle, even for an electric vehicle.

As can be appreciated herefrom, the described embodiment is particularly effective in assuring safety by enabling high level driving techniques equivalent to those made by well trained drivers even when the vehicle behavior steering is driven in a condition exceeding the criteria to cause spinning, drifting, under and so forth.

What is claimed is:

1. A system for controlling the behavior of an automotive vehicle comprising:
   means for detecting operational magnitude for controlling a steering system, an engine, a power train and a suspension system of the automotive vehicle;
   means for detecting a control magnitude of actuating means for controlling the steering system, the engine, the power train and the suspension system of the automotive vehicle;

means for detecting an amount associated with behavior in each of three dimensional directions of the vehicle;

means, storing a standard behavior model, for taking said operational magnitude in a standard vehicle having predetermined reference response characteristics, and amounts associated with the current behavior of the vehicle, and outputting amounts associated with a forthcoming behavior of said standard vehicle;

first predicting means for predicting an amount associated with behavior of said standard vehicle using said standard behavior model with respect to input data of a detected current operational magnitude and amounts associated with the current behavior of the vehicle;

means, storing a behavior predicting model of the vehicle to be actually controlled, for taking said operational magnitude and amounts associated with behavior of the vehicle to be actually controlled as input data, and outputting an amount associated with forthcoming behavior of said vehicle in response to said input data;

second predicting means for predicting an amount associated with the behavior of said vehicle to be actually controlled using the behavior predicting model of said vehicle to be actually controlled based on the detected current operational magnitude and amounts associated with the behavior;

first difference detecting means for comparing values of the amounts associated with the behavior of the standard vehicle, predicted by said first predicting means, and the values of the amounts associated with the behavior of the vehicle to be actually controlled, predicted by said second predicting means, for detecting a difference between the predicted amounts;

second difference detecting means for comparing the values of amounts associated with the current behavior of the vehicle and the value of the amount of the behavior predicted by said first predicting means to derive a difference therebetween; and control means, responsive to the difference of the predicted values detected by said first difference detecting means exceeding a predetermined value, for adjusting a control magnitude of said actuating means in a direction for reducing the difference detected by said second difference detecting means.

2. A system as set forth in claim 1, which further comprises means for displaying a predicted value difference when the predicted value difference detected by said first difference detecting means exceeds a predetermined value.

3. A system as set forth in claim 1, further comprising steering feel correcting means which controls a reaction force at the steering wheel according to a reaction force from a road surface in operating of the steering system.

4. A system as set forth in claim 1, wherein said operational magnitude detecting means includes means for detecting a steering angle of the steering wheel, means for detecting a hydraulic braking pressure, means for detecting a throttle valve open angle of the engine, and means for detecting a shift position of a power transmission;

said actuating means including a steering control device, a hydraulic brake control device, a throttle valve open angle control device, a transmission control device and a differential gear control device;

said means for detecting amounts associated with behavior of the vehicle including at least one of means for detecting rotational speed of a wheel of the vehicle, means for detecting a variation rate of longitudinal acceleration of the vehicle, means for detecting longitudinal acceleration of the vehicle, means for detecting longitudinal speed of the vehicle, means for detecting variation of lateral acceleration of the vehicle, means for detecting lateral acceleration of the vehicle, means for detecting speed in the lateral direction of the vehicle, means for detecting a variation rate of vertical acceleration of the vehicle, means for detecting vertical acceleration of the vehicle, means for detecting vertical speed of the vehicle, means for detecting variation rate of rolling angular acceleration of the vehicle, means for detecting rolling angular acceleration, means for detecting rolling angular velocity, means for detecting rolling angle, means for detecting variation rate of pitching angular acceleration of the vehicle, means for detecting pitching angular acceleration, means for detecting pitching angular velocity, means for detecting pitching angle, means for detecting variation rate of yawing angular acceleration of the vehicle, means for detecting yawing angular acceleration, means for detecting yawing angular velocity and means for detecting yawing angle.

5. A system as set forth in claim 4, wherein said means for detecting amounts associated with the behavior of the vehicle comprises:

acceleration sensors disposed on at least two longitudinal axes of the vehicle, the vertical axis of the vehicle and the lateral axis of the vehicle, a plurality of said acceleration sensors being disposed on each of said axes;

means for establishing conversion equation for determining acceleration values of linear motion at an arbitrary point of the vehicle in the direction of each axis of an arbitrary coordinate system and acceleration values of rotational motion with respect to each axis of the coordinate system while simultaneously using acceleration values detected by said acceleration sensors disposed on at least two of the vehicular longitudinal axes, the vertical axis and the lateral axis;

means for calculating said conversion equation to obtain the acceleration values of linear motion at an arbitrary point of the vehicle in the direction of each axis of the arbitrary coordinate system and acceleration values of rotational motion with respect to each axis of the coordinate system;

means for establishing a motion equation expressing a plurality of freedom motions; and means for calculating said motion equation with the acceleration values of linear motion at an arbitrary point of the vehicle in the direction of each axis of the arbitrary axis of the arbitrary coordinate system and acceleration values of rotational motion with respect to each axis of the coordinate system to obtain a physical amount associated with the behavior of said vehicle.

6. A system as set forth in claim 4, wherein said control means generates an additional control magnitude to be provided for said steering control device in an opposite direction to a cornering direction with reference to a speed vector at a center of a line extending between left and right steerable wheels of the vehicle detected by said means for detecting an amount associated with behavior, when a negative cornering force is generated with respect to the cornering direction of the vehicle, and said control means generates an additional control magnitude to be provided for said steering control device in the cornering direction with reference to a speed vector at the center of the line extending between left and right steerable wheels detected by said means for detecting amount associated with behavior, when positive cornering force is generated with respect to the cornering direction of the vehicle.

7. A system as set forth in claim 4, which further comprises means for varying input and output characteristics of said standard behavior model according to a predetermined condition when one of said steering angle, braking pressure and throttle valve open angle satisfies a predetermined condition.

8. A system as set forth in claim 4, which further comprises means for displaying the difference of said operational magnitude and said control magnitude.

9. A system as set forth in claim 4, which further comprises means for selectively activating and deactivating said control means in response to a command of the driver.

10. A system as set forth in claim 4, wherein said hydraulic brake control device controls braking pressure for each wheel independently of the other.

11. A system as set forth in claim 10, wherein said hydraulic brake control device includes a control system for controlling braking pressure for each wheel independently between a locking state and a non-locking state of the wheel.

12. A system as set forth in claim 11, wherein
when a yawing moment does not increase even if the steering angle is controlled to be increased, said hydraulic brake control device controls the braking pressure for rear wheels to make the rear wheels of a locking state, and
when the yawing moment does not decrease even if the steering angle is controlled to be decreased, said hydraulic brake control device controls the braking pressure for front wheels to make the front wheels of a locking state.

13. A system as set forth in claim 11, wherein
when a yawing moment does not increase even if the steering angle is controlled to be increased, said transmission control device and said differential gear control device controls a gear ratio to make the rear wheels of a locking state, and
when the yawing moment does not decrease even if the steering angle is controlled to be decreased, said transmission control device and said differential gear control device controls the gear ratio to make the front wheels of a wheel spin state.

14. A system as set forth in claim 11, wherein
when a yawing moment does not increase even if the steering angle is controlled to be increased, said transmission control device, said differential gear control device and said throttle valve open angle control device controls a driving torque to make the rear wheels of a locking state, and
when a yawing moment does not decrease even if the steering angle is controlled to be decreased, said transmission control device and said differential gear control device controls the driving torque to make the front wheels of a wheel spin state.

* * * * *